United States Patent
Gellens et al.

(10) Patent No.: US 10,111,078 B2
(45) Date of Patent: *Oct. 23, 2018

(54) TECHNIQUES TO SUPPORT EMERGENCY CALLS WITH OVER-THE-TOP SERVICE PROVIDER

(71) Applicant: QUALCOMM Incorporated, San Diego, CA (US)

(72) Inventors: Randall Coleman Gellens, San Diego, CA (US); Stephen William Edge, San Diego, CA (US); David Hugh Williams, San Diego, CA (US); Zhimin Du, San Diego, CA (US); Yan Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/526,819

(22) PCT Filed: Dec. 11, 2015

(86) PCT No.: PCT/CN2015/097076
§ 371 (c)(1),
(2) Date: May 15, 2017

(87) PCT Pub. No.: WO2016/095753
PCT Pub. Date: Jun. 23, 2016

(65) Prior Publication Data
US 2017/0374538 A1    Dec. 28, 2017

Related U.S. Application Data

(60) Provisional application No. 62/093,954, filed on Dec. 18, 2014.

(30) Foreign Application Priority Data

Jun. 29, 2015    (WO) ................ PCT/CN2015/082697

(51) Int. Cl.
*H04W 4/90*    (2018.01)
*H04W 76/50*   (2018.01)
(Continued)

(52) U.S. Cl.
CPC ........... *H04W 4/90* (2018.02); *H04L 61/1511* (2013.01); *H04L 61/1541* (2013.01);
(Continued)

(58) Field of Classification Search
CPC ........... H04M 3/5116; H04M 2207/18; H04M 2242/04; H04M 3/00; H04W 4/22;
(Continued)

(56) References Cited

U.S. PATENT DOCUMENTS 9,521,526 B2    12/2016 Gellens et al.
2004/0203569 A1  10/2004 Jijina et al.
(Continued)

FOREIGN PATENT DOCUMENTS

WO    WO 2009/124131 A2    10/2009

OTHER PUBLICATIONS

ISA/CN, International Search Report and Written Opinion of the International Searching Authority, Int'l App. No. PCT/CN2015/082697, dated Jun. 29, 2015, State Intellectual Property Office of the P.R. China, Beijing, CN, 102 pgs.
(Continued)

*Primary Examiner* — Nizar Sivji
(74) *Attorney, Agent, or Firm* — Holland & Hart LLP

(57) ABSTRACT

Methods, systems, and devices are described for wireless communication. A wireless device such as an in-vehicle system (IVS) may transmit an emergency call (eCall) mes-
(Continued)

sage to a third party eCall server using a communication session which may be packet based or circuit based. The eCall message may include session information and telematics data. The third party eCall server may relay the session information and telematics data to a public safety answering point (PSAP). For example, the third party eCall server may generate an automatic text-to-speech message that is transmitted to the PSAP over a public communications network. In some cases, the third party eCall server may transmit a response to the wireless device including metadata based on the telematics data transmitted in the eCall message. The eCall message may also include a call-back number, and the PSAP may contact the wireless device directly using the call-back number.

30 Claims, 29 Drawing Sheets

(51) Int. Cl.
 *H04M 3/00* (2006.01)
 *H04L 29/12* (2006.01)
 *H04M 3/51* (2006.01)
 *H04W 4/04* (2009.01)
(52) U.S. Cl.
 CPC ...... *H04L 61/1588* (2013.01); *H04L 61/2007* (2013.01); *H04M 3/00* (2013.01); *H04M 3/5116* (2013.01); *H04W 4/04* (2013.01); *H04W 76/50* (2018.02); *H04W 4/046* (2013.01)
(58) Field of Classification Search
 CPC ... H04W 76/007; H04W 24/04; H04W 40/02; H04W 76/025; H04W 4/046; H04W 4/04; H04W 4/90; H04L 65/608; H04L 65/4007; H04L 61/1511; H04L 61/1541; H04L 61/1588; H04L 61/2007
 See application file for complete search history.

(56) References Cited

U.S. PATENT DOCUMENTS

| | | | |
|---|---|---|---|
| 2006/0009190 A1 | 1/2006 | Laliberte | |
| 2010/0202368 A1* | 8/2010 | Hans | H04M 3/5116 370/329 |
| 2012/0129482 A1* | 5/2012 | Li | H04M 3/42195 455/404.1 |
| 2013/0040599 A1* | 2/2013 | Berg | H04W 4/22 455/404.2 |
| 2013/0143516 A1 | 6/2013 | Winterbottom et al. | |
| 2014/0232571 A1* | 8/2014 | Hansen | H04W 4/22 340/989 |
| 2015/0213708 A1* | 7/2015 | Barzangi | H04W 4/028 455/404.2 |
| 2016/0029197 A1* | 1/2016 | Gellens | G05D 1/0011 455/404.1 |
| 2017/0215056 A1* | 7/2017 | Edge | H04W 4/22 |

OTHER PUBLICATIONS

ISA/CN, International Search Report and Written Opinion of the International Searching Authority, Int'l. App. No. PCT/CN2015/097076, dated Jun. 23, 2016, State Intellectual Property Office of the P.R. China, Beijing, CN, 116 pgs.
Supplementary European Search Report—EP15869261—Search Authority—The Hague—dated Jun. 1, 2018.

* cited by examiner

TECHNIQUES TO SUPPORT EMERGENCY CALLS WITH OVER-THE-TOP SERVICE PROVIDER

CROSS REFERENCES

The present Application for Patent is a 371 national phase of International Patent Application No. PCT/CN2015/097076 by Qualcomm Incorporated et al., entitled "TECHNIQUES TO SUPPORT EMERGENCY CALLS WITH OVER-THE-TOP SERVICE PROVIDER," filed Dec. 11, 2015; which claims priority to International Patent Application No. PCT/CN2015/082697 by Qualcomm Incorporated et al., entitled "Techniques to Support Emergency Calls With an Over-the-Top Service Provider," filed Jun. 29, 2015; and U.S. Provisional Patent Application No. 62/093,954 by Gellens et al., entitled "Techniques to Support ECall With An Over-The-Top Service Provider," filed Dec. 18, 2014; each of which is assigned to the assignee hereof, and expressly incorporated by reference herein.

BACKGROUND

Field of Disclosure

The following relates generally to wireless communication, and more specifically to deployment of Next Generation (NG) emergency calls using an Over-the-Top (OTT) service provider.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiplexing (FDM) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UE). A base station may communicate with the communication devices on downlink channels (e.g., for transmissions from a base station to a UE) and uplink channels (e.g., for transmissions from a UE to a base station).

Some UEs, such as in-vehicle systems (IVS), may include emergency reporting capabilities that collect and transmit telematics data in the event of an accident or other emergency situation involving a vehicle. Some networks, third-party service providers (SPs), and public safety answering points (PSAP) are capable of automatically receiving and processing emergency calls from these UEs. However, in some cases, an IVS may be located in a system where the PSAP is not capable of receiving an automated emergency call or is not capable of processing telematics data included in such calls. This may result in a delayed emergency response. Further, an IVS may be connected to a network where packet switched (PS) voice calls, or PS emergency calls are not deployed or not enabled (e.g., a network where Internet Protocol Multimedia Systems (IMS) has not been deployed, or where IMS emergency calling has not been deployed).

SUMMARY

Systems, methods, and apparatuses for emergency calls Over-the-Top are described. A wireless device, such as an in-vehicle system (IVS), may transmit an emergency call message to a third party emergency call server using a communication session. The emergency call may include session information and/or telematics data. The third party emergency call server may then relay the emergency call to a public safety answering point (PSAP). For example, the third party emergency call server may generate an automatic text-to-speech message that is transmitted to the PSAP over a public communications network. In some cases, the third party emergency call server may transmit a response to the wireless device and may include metadata based on the telematics data transmitted in the emergency call. The emergency call may also include a call-back number, and the third party emergency call server or PSAP may contact the wireless device directly using the call-back number (CBN). In some cases, the emergency call may be initiated over a packet-switched (PS) connection between the wireless device and third party emergency call server. In some cases, the emergency call may be initiated (or continued) over a circuit-switched (CS) connection between the wireless device and third party emergency call server.

A method of communication at a wireless device is described. The method may include transmitting a first signaling message to a third party emergency call server using a communication session, the first signaling message including a set of session information related to a communication session and a set of telematics data for the wireless device, and receiving a second signaling message using the communication session, the second signaling message including metadata based at least in part on a reception status or a content of the set of telematics data transmitted in the first signaling message.

An apparatus for communication at a wireless device is described. The apparatus may include means for transmitting a first signaling message to a third party emergency call server using a communication session, the first signaling message including a set of session information related to a communication session and a set of telematics data for the wireless device, and means for receiving a second signaling message using the communication session, the second signaling message including metadata based at least in part on a reception status or a content of the set of telematics data transmitted in the first signaling message.

A further apparatus for communication at a wireless device is described. The apparatus may include a processor, memory in electronic communication with the processor, and instructions stored in the memory, wherein the instructions are executable by the processor to transmit a first signaling message to a third party emergency call server using a communication session, the first signaling message including a set of session information related to a communication session and a set of telematics data for the wireless device, and receive a second signaling message using the communication session, the second signaling message including metadata based at least in part on a reception status or a content of the set of telematics data transmitted in the first signaling message.

A non-transitory computer-readable medium storing code for communication at a wireless device is described. The code may include instructions executable to transmit a first signaling message to a third party emergency call server using a communication session, the first signaling message including a set of session information related to a communication session and a set of telematics data for the wireless device, and receive a second signaling message using the communication session, the second signaling message including metadata based at least in part on a reception status or a content of the set of telematics data transmitted in the first signaling message.

Some examples of the method, apparatuses, or non-transitory computer-readable medium described above may further include processes, features, means, or instructions for identifying an address of the third party emergency call server or a home network call server associated with the third party emergency call server based at least in part on a discovery process. Additionally or alternatively, in some examples the discovery process is based at least in part on a domain name system (DNS) query.

In some examples of the method, apparatuses, or non-transitory computer-readable medium described above, the discovery process is based at least in part on a location-to-service translation (LoST) query. Additionally or alternatively, in some examples the discovery process is based at least in part on data configured in the wireless device.

Some examples of the method, apparatuses, or non-transitory computer-readable medium described above may further include processes, features, means, or instructions for determining that a media path between the wireless device and the third party emergency call server cannot be established or does not support at least one of: a threshold bandwidth, or a threshold quality of service (QoS), or a threshold packet loss, or a threshold latency. Additionally or alternatively, some examples may include processes, features, means, or instructions for receiving a CS voice call-back from the third party emergency call server or a public safety answering point (PSAP).

In some examples of the method, apparatuses, or non-transitory computer-readable medium described above, the first signaling message includes a call-back number for the wireless device and wherein the CS voice call-back is based at least in part on the call-back number. Additionally or alternatively, in some examples the CS voice call-back is based at least in part on a call-back number stored with the third party emergency call server.

Some examples of the method, apparatuses, or non-transitory computer-readable medium described above may further include processes, features, means, or instructions for establishing a CS connection for voice or media data based at least in part on the determination that the media path between the wireless device and the third party emergency call server cannot be established or does not support a threshold bandwidth, threshold QoS, threshold packet loss, or threshold latency. Additionally or alternatively, some examples may include processes, features, means, or instructions for establishing an internet protocol (IP) connection to or association with a call server, wherein transmitting the first signaling message is based at least in part on the IP connection.

In some examples of the method, apparatuses, or non-transitory computer-readable medium described above, the call server is the third party emergency call server. Additionally or alternatively, in some examples the call server is different than the third party emergency call server.

In some examples of the method, apparatuses, or non-transitory computer-readable medium described above, the call server is a Session Initiation Protocol (SIP) Proxy. Additionally or alternatively, in some examples the call server is managed by a home network operator for the wireless device.

In some examples of the method, apparatuses, or non-transitory computer-readable medium described above, the call server is part of a home network operator Internet protocol (IP) multimedia subsystem (IMS) subsystem. Additionally or alternatively, in some examples the IP connection or association is based at least in part on at least one of an IP, a transmission control protocol (TCP), a user datagram protocol (UDP), a transport layer security (TLS) protocol or an Internet protocol security (IPsec) protocol.

Some examples of the method, apparatuses, or non-transitory computer-readable medium described above may further include processes, features, means, or instructions for transferring an identity of the wireless device to the call server, and authenticating the identity to the call server. Additionally or alternatively, some examples may include processes, features, means, or instructions for establishing a media path from the wireless device to the third party emergency call server based at least in part on the IP connection or association.

In some examples of the method, apparatuses, or non-transitory computer-readable medium described above, the first signaling message includes a request for voice or other media, a callback number and a standardized set of data. Additionally or alternatively, some examples may include processes, features, means, or instructions for receiving an authentication request from the third party emergency call server, and transmitting an authentication response to the third party emergency call server.

In some examples of the method, apparatuses, or non-transitory computer-readable medium described above, the wireless device is an in-vehicle system (IVS). Additionally or alternatively, in some examples the third party emergency call server is configured to relay communication from the wireless device to a public safety answering point (PSAP).

In some examples of the method, apparatuses, or non-transitory computer-readable medium described above, receiving the second signaling message over the communication session includes receiving an indication of whether the set of telematics data was received or satisfactorily received at the third party emergency call server, the indication including the metadata based at least in part on the reception status or the content of the set of telematics data. Additionally or alternatively, in some examples receiving the second signaling message over the communication session further includes receiving a request with respect to the set of telematics data, the request including the metadata based at least in part on the reception status or the content of the set of telematics data.

In some examples of the method, apparatuses, or non-transitory computer-readable medium described above, the request includes at least one of a request to retransmit the set of telematics data, a request to transmit an updated set of telematics data, or a request to transmit a different set of telematics data. Additionally or alternatively, in some examples the second signaling message includes a second set of session information related to the communication session.

Some examples of the method, apparatuses, or non-transitory computer-readable medium described above may further include processes, features, means, or instructions for determining from a header of the second signaling message that a portion of a body of the second signaling message includes the metadata. Additionally or alternatively, in some examples the set of session information includes at least one of a request to initiate the communication session or information associated with the communication session.

Some examples of the method, apparatuses, or non-transitory computer-readable medium described above may further include processes, features, means, or instructions for transmitting a third signaling message from the wireless device to the third party emergency call server over the communication session, the third signaling message including a response to the request received with respect to the set of telematics data. Additionally or alternatively, in some examples receiving the second signaling message over the communication session further includes receiving an instruction to take at least one action based at least in part on the reception status or the content of the set of telematics data, the instruction including the metadata based at least in part on the reception status or the content of the set of telematics data.

In some examples of the method, apparatuses, or non-transitory computer-readable medium described above, the at least one action includes at least one of gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking or unlocking a door, activating a horn of a vehicle, activating an externally audible sound, activating lights of a vehicle, activating flashers of a vehicle, actuating a power window, playing a recorded message, rendering media, or displaying a text message. Additionally or alternatively, some examples may include processes, features, means, or instructions for generating a header for the first signaling message based at least in part on the communication session, the header including an indication that a portion of a body of the first signaling message includes the set of telematics data.

In some examples of the method, apparatuses, or non-transitory computer-readable medium described above, the communication session includes at least one of Session Initiation Protocol (SIP), Extensible Messaging and Presence Protocol (XMPP), web real-time communication (WebRTC), Google Talk, or Skype. Additionally or alternatively, in some examples the communication session includes a Voice over Internet Protocol (VoIP) call.

In some examples of the method, apparatuses, or non-transitory computer-readable medium described above, the communication session carries one or more of voice, character-at-a-time text, message-at-a-time text, video, and text messaging using at least one of streaming or non-streaming media. In some examples, the communication session comprises a signaling session or a signaling channel. In some examples, the communication session comprises a media session or a media channel A method of communication at a call service node is described. The method may include receiving a first signaling message from a wireless device using a communication session, the first signaling message including a set of session information related to a communication session and a set of telematics data for the wireless device, relaying at least a portion of the first signaling message to a public safety answering point (PSAP), and transmitting a second signaling message to the wireless device using the communication session, the second signaling message including metadata based at least in part on a reception status or a content of the set of telematics data transmitted in the first signaling message.

An apparatus for communication at a call service node is described. The apparatus may include means for receiving a first signaling message from a wireless device using a communication session, the first signaling message including a set of session information related to a communication session and a set of telematics data for the wireless device, means for relaying at least a portion of the first signaling message to a public safety answering point (PSAP), and means for transmitting a second signaling message to the wireless device using the communication session, the second signaling message including metadata based at least in part on a reception status or a content of the set of telematics data transmitted in the first signaling message.

A further apparatus for communication at a call service node is described. The apparatus may include a processor, memory in electronic communication with the processor, and instructions stored in the memory, wherein the instructions are executable by the processor to receive a first signaling message from a wireless device using a communication session, the first signaling message including a set of session information related to a communication session and a set of telematics data for the wireless device, relay a portion of the first signaling message to a public safety answering point (PSAP), and transmit a second signaling message to the wireless device using the communication session, the second signaling message including metadata based at least in part on a reception status or a content of the set of telematics data transmitted in the first signaling message.

A non-transitory computer-readable medium storing code for communication at a call service node is described. The code may include instructions executable to receive a first signaling message from a wireless device using a communication session, the first signaling message including a set of session information related to a communication session and a set of telematics data for the wireless device, relay a portion of the first signaling message to a public safety answering point (PSAP), and transmit a second signaling message to the wireless device using the communication session, the second signaling message including metadata based at least in part on a reception status or a content of the set of telematics data transmitted in the first signaling message.

Some examples of the method, apparatuses, or non-transitory computer-readable medium described above may further include processes, features, means, or instructions for generating a verbal message based at least in part on the first signaling message, and relaying at least a portion of the first signaling message to the PSAP includes sending the verbal message to the PSAP. Additionally or alternatively, some examples may include processes, features, means, or instructions for receiving a response from the PSAP, and relaying the response to the wireless device.

Some examples of the method, apparatuses, or non-transitory computer-readable medium described above may further include processes, features, means, or instructions for authenticating the wireless device. Additionally or alternatively, some examples may include processes, features, means, or instructions for sending an authentication indication to the PSAP.

In some examples of the method, apparatuses, or non-transitory computer-readable medium described above, the third party emergency call server is a Session Initiation Protocol (SIP) proxy.

A method of communication at a wireless device is described. The method may include transmitting a first signaling message to a third party emergency call server using a communication session over at least one of an Internet Protocol Multimedia Systems (IMS) service and an internet protocol (IP) connection. The first signaling message may include at least a set of session information related to a communication session and a set of telematics data for the wireless device.

An apparatus for communication at a wireless device is described. The apparatus may include means for transmitting a first signaling message to a third party emergency call server using a communication session over at least one of an IMS service and an IP connection. The first signaling message may include at least a set of session information related to a communication session and a set of telematics data for the wireless device.

A further apparatus for communication at a wireless device is described. The apparatus may include a processor, memory in electronic communication with the processor, and instructions stored in the memory. The instructions may be executable by the processor to transmit a first signaling message to a third party emergency call server using a communication session over at least one of an IMS service and an IP connection. The first signaling message may include at least a set of session information related to a communication session and a set of telematics data for the wireless device.

A non-transitory computer-readable medium storing computer-executable code for wireless communication is described. The code may be executable by a processor to transmit a first signaling message to a third party emergency call server using a communication session over at least one of an IMS service and an IP connection. The first signaling message may include at least a set of session information related to a communication session and a set of telematics data for the wireless device.

Some examples of the method, apparatuses, or non-transitory computer-readable medium described above may further include processes, features, means, or instructions for initiating a PS call (connection), with or without one or more media (such as Voice over IP (VoIP), text, video) components, to the third party emergency call server based on the communication session. In some examples, the method, apparatuses, or non-transitory computer-readable medium described above may further include processes, features, means, or instructions for receiving a voice call-back over a CS connection from the third party emergency call server or a PSAP when the PS call fails, the PS call is initiated with no media or the one or more media components lack sufficient quality. In some examples, the voice call-back may be based at least in part on a CBN selected from the group consisting of provided by the wireless device, stored with the third party emergency call server, stored in a database accessible to the third party emergency call server, and stored with the PSAP. In some examples, the first signaling message may include a CBN for the wireless device and a set of data, such as a minimum set of data (MSD). In some examples, the method, apparatuses, or non-transitory computer-readable medium described above may further include processes, features, means, or instructions for transmitting the MSD over the CS connection when a transfer of the MSD via the first signaling message fails. In some examples, transmitting the MSD may be performed using signaling selected from the group consisting of single tone, multi-tone, dual-tone multi-frequency (DTMF), and varying tone.

Some examples of the method, apparatuses, or non-transitory computer-readable medium described above may further include processes, features, means, or instructions for determining at least one of a lack of suitable quality or a lack of suitable bandwidth for a VoIP call, where the first signaling message may be transmitted without initiating a VoIP call based on the determination. In some examples, the method, apparatuses, or non-transitory computer-readable medium described above may further include processes, features, means, or instructions for receiving a voice call-back over a CS connection from the third party emergency call server or a PSAP. In some examples, the voice call-back may be based at least in part on a CBN selected from the group consisting of provided by the wireless device, stored with the third party emergency call server, stored in a database accessible to the third party server, and stored with the PSAP. In some examples, the first signaling message may include a CBN for the wireless device and a MSD. In some examples of the method, apparatuses, or non-transitory computer-readable medium described above may further include processes, features, means, or instructions for sending the MSD over the CS connection when a transfer of the MSD via the first signaling message fails. In some examples, sending the MSD may be performed using signaling selected from the group consisting of single tone, multi-tone, DTMF, and varying tone.

In some examples of the method, apparatuses, or non-transitory computer-readable medium described above, the third party emergency call server may be configured to relay communication from the wireless device to a PSAP.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
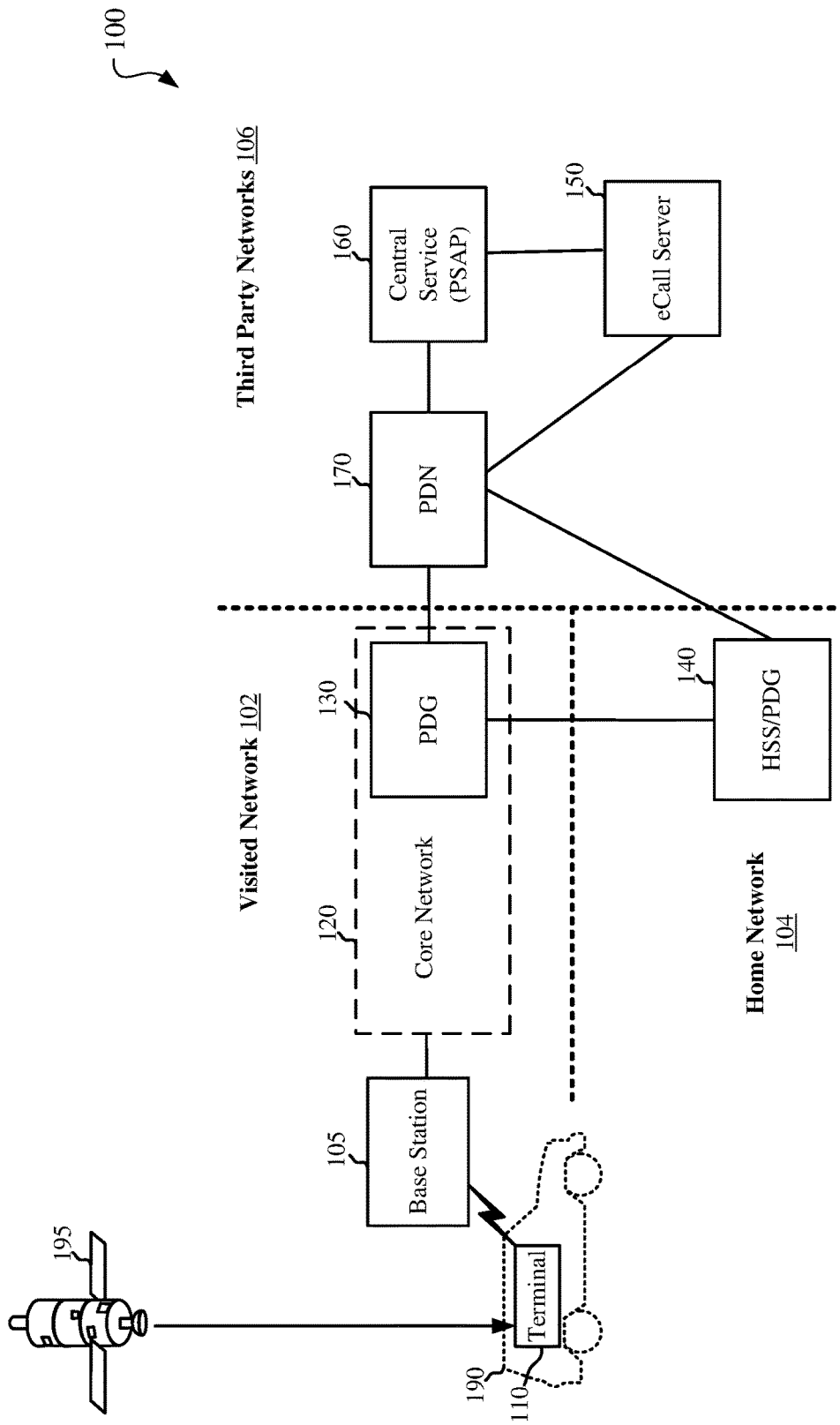
FIG. 1 illustrates an example of a wireless communications system for emergency call Over-the-Top (OTT) in accordance with various aspects of the present disclosure.

The described features generally relate to improved systems, methods, or apparatuses for emergency call calls using an Over-the-Top (OTT) service provider (SP). In some cases, a telematics wireless communication system may be used to place emergency vehicle calls (eCalls) (e.g., when a vehicle experiences a crash). For instance, an in-vehicle system (IVS) may be used to send telematics data to a public safety answering point (PSAP), such as a dispatch responder. During an emergency call, a single connection between an IVS and a PSAP may carry both voice and data related to a crash. According to the present disclosure, in some communication environments, the emergency call may be relayed by a third party (e.g., a national automotive club such as the China Automobile Association (CAA) in China), which may act as an intermediary between the IVS and the PSAP. The format of the data and contents conveyed by an emergency call may be standardized such that an IVS may place a recognized emergency call and transmit within that call a set of crash related (or other emergency related) data, a location, or the like, in a format recognizable by a PSAP or the third party server. Some emergency call systems may implement enhanced functionality, such as the ability to negotiate language and media (e.g., text or sign language), and the ability for the PSAP or the third party server to request that the vehicle send data or perform an action. In addition to being implemented in motor vehicles, a telematics wireless communication system may be adapted to support automatic emergency calls and conveyance of emergency related telematics data from other types of machinery and devices (e.g., bicycles, motorcycles, wheelchairs, medical devices, phones, etc.). An emergency call system may be designed to avoid problems (e.g., incompatible data, faulty call recognition, etc.) which may retard the exchange of information and inhibit emergency response times.

There may be various types of emergency call systems that can support automatic or manually initiated emergency calls from a vehicle or other device or piece of machinery together with the conveyance of telematics related data concerning the emergency situation, the user of the device, vehicle or piece of machinery from which the emergency call is being initiated and/or the device, vehicle or piece of machinery. One emergency call system being deployed in the European Union (EU) makes use of circuit switched emergency calls initiated by a wireless capable IVS via a network supporting Global System For Mobile Communications (GSM) or Universal Mobile Telecommunications System (UMTS) and is standardized by the $3^{rd}$ Generation Partnership Project (3GPP). This EU emergency call system, referred to here as the "EU in-band eCall system" supports conveyance of telematics data, referred to as a "Minimum Set of Data" (MSD), using an in-band modem which interrupts the voice path of the emergency call for a short period (e.g. 5 to 20 seconds) to transmit the data from the IVS to a PSAP. Another emergency call system, referred to here as Next Generation (NG) eCall, would establish an emergency call from an IVS to a PSAP via a network supporting Long Term Evolution (LTE), LTE-Advanced (LTE-A), or the High Speed Packet Access (HSPA) enhancement of UMTS. With NG eCall, an emergency call may be established from an IVS to a PSAP via an IP Multimedia System (IMS) in a serving LTE/LTE-A or HSPA wireless network. The emergency call may be packet based and may use (i) the Internet Protocol (IP) to transport signaling, data and voice, (ii) the Session initiation Protocol (SIP) for call establishment, (iii) Voice over IP (IP) to support voice communication, and (iv) SIP signaling or a separate data path to transfer the MSD.

For both the EU in-band eCall system and NG eCall, an IVS establishes an emergency call to a PSAP and transfers telematics data (e.g. the MSD) to the PSAP in association with the emergency call. The emergency call may be triggered automatically (e.g. when sensors in a vehicle detect sudden and violent acceleration or deceleration, a significant rise in temperature such as caused by a fire, deployment of an airbag or some other emergency associated condition) or may be initiated manually (e.g. by a driver or passenger in a vehicle). The telematics data that is transferred may include sensor information (e.g. indicating conditions that triggered the emergency call) as well as information about the vehicle (e.g. current geographic location in terms of latitude and longitude, vehicle type and identification, current number of occupants of the vehicle, status of seatbelts and airbags). The emergency call may provide a two way voice communication path that may allow an occupant in the vehicle to speak to a PSAP operator and a PSAP operator to hear sound from the vehicle. In an NG eCall system, other communication media may be supported such as two way video (e.g. allowing use of sign language and a PSAP operator to see the inside or outside of the vehicle). Further, an NG eCall system may enable a PSAP operator to send instructions to a vehicle to perform certain actions such turning off an engine, unlocking doors, flashing lights, and sounding a horn.

In some cases, an NG eCall system may be preferred to an in-band emergency call system (e.g., the EU in-band eCall system) for a number of reasons including: (i) supporting migration of wireless networks away from circuit switched technologies such as GSM and UMTS and towards more wirelessly efficient IP based technologies such as LTE/LTE-A and HSPA, (ii) avoiding temporary interruption of a voice path to transfer telematics data (e.g. the MSD), (iii) enabling faster transfer of telematics data and transfer of a greater amount of telematics data, and/or (iv) enabling more flexible interaction between an IVS and PSAP including a PSAP ability to convey instructions to an IVS as noted earlier. However, an NG eCall system may be limited to use where both an IVS and PSAP support the NG eCall system and where a wireless serving network for an IVS (e.g. an LTE/LTE-A or HSPA network) supports establishment of NG eCall via support of IMS. Where one or more of these conditions are not fulfilled, an NG eCall as normally defined may not be possible. The techniques and solutions defined herein may enable this limitation to be overcome by defining a method to support an NG eCall using an Over-The-Top (OTT) service provider using what is referred to herein as an "eCall Over-The-Top" or "eCall OTT" system. These techniques and solutions are described in more detail herein and rely on use of an emergency call server from an OTT service provider. The OTT service provider may be any communications network operator or any provider of other services to users (e.g., such an auto club, medical provider, security provider) who owns or operates an emergency call server to assist the establishment and/or support of emergency related calls from UEs. An emergency call supported by an emergency call OTT system may be similar to or the same as an emergency call supported by an NG eCall system from the perspective of an OTT emergency call server and/or an IVS. Therefore, implementation impacts to an IVS and an emergency call server to add support for an emergency call OTT system after an NG eCall system is already supported, or vice-versa, may be small compared to the implementation impacts needed to support an NG eCall system (or emergency call OTT system) initially, thereby allowing both types of system to be efficiently supported in a multi-mode configuration or an efficient migration from one of these emergency call systems to the other.

An automatic or manually initiated emergency related call from an IVS or other device or machinery that enables a voice or other type (e.g. video or text) of communications path to be established and telematics data to be transferred in association with the call will be referred to herein as (i) an "eCall" when no particular eCall system is assumed or required, (ii) an "in-band eCall" when the call is set up by circuit switched means with telematics data transfer using an in-band (e.g. voice) communications path, (iii) an 'EU in-band eCall" when the EU in-band eCall system is used, (iv) an "NG eCall" when the emergency call is set up from an IVS to a PSAP using SIP signaling and using IMS in a serving wireless network, and (v) an "OTT eCall" when an eCall OTT system is used as described herein.

An eCall system may support a base-level set of telematics data (e.g. the minimum data set (MSD)) that carries emergency-related and/or vehicle-related information along with a call. Such a capability may be extensible in the case of an NG eCall system or eCall OTT system, e.g., new multi-purpose internet mail extension (MIME) types may be utilized for new data sets carrying additional telematics data transmitted in a call. In some instances, an NG eCall or OTT eCall may enable conveyance of metadata and control, such as acknowledgments of an MSD transfer, retransmission of an MSD, requests for an MSD transfer or other actions, or the like. In other instances, an NG eCall or OTT eCall may enable conveyance of a comprehensive set of vehicle and crash data (e.g., a vehicle emergency data set (VEDS)). A VEDS format may include more fields than an MSD format. The VEDS or MSD may be modified according to the country or region in which a vehicle is deployed (e.g., a vehicle in China may implement a different MSD or different VEDS than a vehicle in Europe or North America).

An NG eCall or OTT eCall may function according to a particular protocol. For example, a client may send emergency telematics data using an augmented "additional-data" mechanism in which additional data sets may be included in association with new registry entries (e.g., new registry entities for the Internet Assigned Numbers Authority (IANA)). During a call, a PSAP or a third party server may indicate the receipt of data (or metadata) by sending an acknowledgment with a telematics call acceptance or rejection or in a response to the data or in another message. A PSAP or third party server may request an IVS to send/resend data either during a call (e.g., if the initial telematics call is accepted) or during call-back (e.g., if the initial telematics call is rejected). A request for a re-transmission may indicate the same or different data according to the original request. In a similar fashion, a PSAP or third party server may request a vehicle to perform a function either during a call or in a call-back, depending on the reception status of the call.

In some cases, an IVS may use an IMS (e.g., an IMS in a serving wireless network for the IVS) to communicate crash data to a PSAP—e.g. when an NG eCall is established. However, in environments in which IMS is not deployed (e.g. by a serving wireless network), the eCall OTT system (also referred to herein simply as an eCall server) may be employed in which a serving wireless network functions as an IP bearer instead of a service (e.g., a serving wireless network may provide an air interface which provides IP connectivity to an IVS but no IMS functionality). An IVS supporting an eCall OTT system may use the session initiation protocol (SIP) to facilitate a telematics emergency call. There may be some differences between an NG eCall using IMS (e.g., in a serving wireless network) and an OTT eCall that an IVS may need to account for. Using IMS may, for example, include functionality such as: (i) authentication and authorization of an IVS to place calls; (ii) location determination of an IVS and transmission of the IVS location (e.g., to a PSAP); (iii) media reservation; (iv) support of emergency functionality by IMS entities such as a mobile network operator (MNO) provided SIP proxy call session control function (P-CSCF) and emergency call session control function (E-CSCF); (v) call routing; and/or (vi) handover to circuit-switched (CS) mode. An OTT eCall operation may not include all of these functions though may include voice-over-internet-protocol (VoIP) for voice path, a mechanism to identify and authenticate the IVS, and a mechanism to call back the IVS (e.g., CS voice callback). In some cases of OTT eCall operation, the MNO may provide only IP support and media bearers with suitable bandwidth, quality of service (QoS), packet loss, or latency. In some cases, the MNO may provide IP communication without media bearers of suitable bandwidth, QoS, packet loss, or latency to sustain VoIP sessions. Nonetheless, in various examples, an IVS may utilize either for an eCall.

An eCall OTT system may employ one or several mechanisms to route a telematics emergency call. For example, in an eCall OTT system, an IVS may send a call directly to an OTT SIP server (e.g., the IVS may send a call to a third party OTT entity, such as the China Automobile Association (CAA) auto rescue platform in the case of an OTT eCall in China). In another example, the IVS may send the call to a SIP Proxy server in a serving wireless network or to a third party SIP proxy server for onward routing to an OTT eCall server. The IVS may transmit emergency data (e.g. MSD) to the OTT SIP server (e.g., CCA), either during (e.g., as part of) the OTT eCall establishment between the IVS and an OTT eCall server, or after the remainder of the OTT eCall establishment has occurred (e.g., according to the SIP protocol). The OTT eCall server may then verbally relay (e.g., via a person or a text-to-speech automated system) the information to a PSAP. The use of a SIP proxy server to route an OTT eCall to an OTT eCall server may enable more flexible routing by taking into account factors such as load sharing, geographic-based routing, and changes in the OTT service provider. In some cases, the IVS may be configured with, or may dynamically discover, the address (e.g., a fully-qualified domain name (FQDN) or IP address) of either a SIP proxy server, when this is used for routing an OTT eCall to an OTT eCall server, or the OTT eCall server when OTT eCall establishment occurs directly from an IVS to the OTT eCall server without the use of a SIP proxy server. For example, an address of a SIP Proxy server or OTT eCall server may be configured into the IVS, the IVS subscriber identity module (SIM), or the IVS universal SIM (USIM). Alternatively, the address may be discovered by the IVS via a domain name system (DNS) query (e.g., via a service record (SRV) query; or via a Dynamic Delegation Discovery Service (DDDS) of DNS, which uses Naming Authority Pointer (NAPTR) records). In yet another example, the IVS may discover the address via a location-to-service translation (LoST) query. The LoST server may be provided by a serving wireless network, the provider for the SIP proxy server (when used) or OTT eCall server or by some other entity.

The following description provides examples of an eCall OTT system and of support of an OTT eCall, and is not limiting in scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

As used in the present description and claims, the term "telematics data" refers broadly to data generated, collected, or stored at a wireless device (e.g. IVS) for transmission to a central service (e.g. PSAP or OTT eCall server) for processing. Telematics data may include, but is not limited to, vehicle diagnostics data (e.g., location data, airbag deployment data, collision or impact sensor data, engine sensor data, and the like). In some embodiments, the recipient of telematics data may be another device (e.g. a PC, laptop, mobile phone, cooperative intermediate device or server) rather than a central server or central service and the recipient may then store the telematics data, process it in some way or forward the data at the time of receipt or at a later time to another entity such as a central server. As an example of forwarding, a source of telematics data that is unable to establish a session with a central server may establish a session with some intermediate device that is able to reach the central server. The terms server, central server and central service as used herein are thus to be understood in these broad terms.

As used in the present description and claims, the term "telematics metadata" refers broadly to control or other data associated with telematics data (e.g., MSD or VEDS) transmitted between a mobile device (e.g. IVS) and a central service (e.g. PSAP or OTT eCall server). For example, telematics metadata may include, but is not limited to, an acknowledgement of whether the telematics data was received at the central service, a request to retransmit the telematics data, a request to transmit different telematics data, a request to take some other action, auxiliary data describing actions taken by the central service, and the like. While telematics metadata may often be transmitted from the central service to the mobile device in response to or to request an attempt by the mobile device to transmit telematics data, telematics metadata may also be transmitted by the mobile device (e.g., to indicate the capabilities of the mobile device, to acknowledge receipt of a request, to indicate whether the mobile device carried out a request, etc.).

As used in the present description and claims, the term "communication session" or "session" refers broadly to a temporary or semi-permanent interactive information exchange between the endpoints or participants (e.g., a mobile device or IVS and a central server), generally for the purpose of streaming audio, video, or other media content between the endpoints or participants. In some cases, the session may not attempt to or may be unable to stream media, but may transmit telematics data or metadata, or indicate a need to establish alternative (e.g., CS fallback) media communication.

FIG. 1 illustrates an example of a wireless communications system 100 for an eCall Over-the-Top (eCall OTT) system in accordance with various aspects of the present disclosure. Wireless communications system 100 may be used to exchange telematics data and related metadata between a terminal 110 (e.g., an IVS) and a central service 160 (e.g., a Public Safety Answering Point (PSAP)) through an eCall server 150 using signaling messages transmitted over a communication session.

Wireless communications system 100 may include a visited network 102 for the terminal 110, a home network 104 for the terminal 110, and third party networks 106. Visited network 102 may also be referred to as a Visited Public Land Mobile Network (V-PLMN), a serving network, etc. Home network 104 may also be referred to as a Home PLMN (H-PLMN). Visited network 102 may be a serving network for a terminal 110, which may be roaming from its home network 104, as assumed in much of the description below. However, the present disclosure also applies to circumstances when the terminal 110 is located within a home network 104. That is, visited network 102 and home network 104 may be the same network if terminal 110 is not roaming.

Visited network 102 may include a base station 105, which may be part of an access network (not shown). Base station 105 may connect to terminal 110 via a physical layer wireless connection. Visited network 102 may also include a core network 120, which may be associated with a Packet Data Network Gateway (PDG) 130 and/or other network entities not shown in FIG. 1 for simplicity. Core network 120 may be a Global System for Mobile Communications (GSM) network, a Wideband Code Division Multiple Access (WCDMA) network, an HSPA network, a General Packet Radio Service (GPRS) access network, a Long Term Evolution (LTE) network, a CDMA2000 1× network, a High Rate Packet Data (HRPD) network, or an Ultra Mobile Broadband (UMB) network, etc. WCDMA, HSPA and GPRS are part of Universal Mobile Telecommunication System (UMTS). GSM, WCDMA, HSPA, GPRS, and LTE/LTE-A are described in documents from an organization named "3rd Generation Partnership Project" (3GPP). CDMA2000 1× and HRPD are part of cdma2000, and cdma2000 and UMB are described in documents from an organization named "3rd Generation Partnership Project 2" (3GPP2). PDG 130 may perform IP address assignment and IP packet routing functions for packet switched services including transfer of data and establishment of VoIP calls and IP based data sessions and may also route Short Message Service (SMS) messages.

Home network 104 may include one or more servers which may include the functions of a Home Subscriber Server (HSS)/PDG 140 and other network entities not shown in FIG. 1 for simplicity. An HSS may store subscription information for terminals (e.g., terminal 110) that have service subscription with home network 104. In some cases there may be no home network 104 if terminal 110 is not subscribed to normal communications services—e.g. is restricted to making emergency calls only.

A Packet Data Network (PDN) may connect a terminal 110 to external networks (e.g., through the internet). An access point name (APN) may be the name of a gateway between a wireless network and an external network. A terminal 110 making a data connection (as opposed to, e.g., a circuit switched voice connection) may be configured with an APN, which it conveys upon accessing the network. A server of the core network 120 may then examine the APN to determine what type of network connection should be created (e.g., what IP address should be assigned or what security methods should be used). In other words, the APN may identify the PDN that terminal 110 wants to communicate with. In addition to identifying a PDN, an APN may also be used to define a service type (e.g., a wireless application protocol (WAP) server or multimedia messaging service (MMS)) that is provided by the PDN.

Third party networks 106 may include an eCall server 150, a central service 160 (e.g., PSAP), a PDN 170, and possibly other network entities not shown in FIG. 1. The eCall server 150 may receive emergency calls such as eCalls (e.g. NG eCalls and/or OTT eCalls) instigated by terminals served by Visited Network 102 (e.g. terminal 110) and/or Home Network 104 and transfer information and/or communication related to these emergency calls to Central Service 160. Central service 160 may be responsible for answering emergency calls and may also be referred to as an Emergency Center (EC) or a public safety answering point (PSAP). Central service 160 may be operated or owned by or on behalf of a government agency, e.g., a county or city. PDN 170 may provide data connectivity including transfer and routing of IP packets and may have access to the Internet or comprise part of the Internet. For example, transfer of voice, data and signaling between PDN 170 in FIG. 1 and other entities (e.g., PDG 130, HSS/PDG 140, eCall Server 150 and Central Service 160) may be via the Internet. In some cases, eCall server 150 may be a private service operated by or affiliated with an automobile manufacturer, association, or other organization. In certain examples, eCall server 150 may receive some or all emergency calls (e.g., NG eCalls and/or OTT eCalls) from terminal 110 and forward data or calls to PSAP central service 160 when appropriate.

FIG. 1 shows only some of the network entities that may be present in visited network 102 and home network 104. For example, visited network 102 may include network entities supporting circuit-switched calls and other services as well as a location server to assist in obtaining terminal location.

Terminal 110 may be stationary or mobile and may also be referred to as a mobile station (MS) for GSM and CDMA2000 1×, a user equipment (UE) for WCDMA and LTE, an access terminal (AT) for HRPD, a SUPL enabled terminal (SET) for Secure User Plane Location (SUPL), a subscriber unit, a station, etc. Terminal 110 may be a device such as a cellular phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals.

Terminal 110 may also include one or more devices which communicate with a personal navigation device (PND), such as by short-range wireless (e.g., Bluetooth®), infrared, wireline connection, or other connection, and may enable terminal positioning functions such as satellite signal reception, position-related assistance data reception, and/or position-related processing to occur at a device or at the PND. Also, terminal 110 is intended to include all devices, including wireless communication devices, computers, laptops, etc., which are capable of communication with a server, such as via the Internet, Wi-Fi, or other network, and regardless of whether satellite signal reception, position-related assistance data reception, and/or position-related processing occurs at the device, at a server, or at another device associated with the network. Any operable combination of the above are also included.

Terminal 110 may also be a dedicated IVS, which may be permanently attached to (and possibly part of) a vehicle 190. Terminal 110 may then be capable of initiating an eCall (e.g., NG eCall and/or OTT eCall). Terminal 110 may be associated with one or more other devices not shown in FIG. 1 such as sensors attached to a vehicle or a control unit for sensors attached to a vehicle or some other source of telematics data that is able to send telematics data to terminal 110 (e.g. via wireless means) and possibly instigate a session from terminal 110 to a central server.

Terminal 110 may have a service subscription with home network 104 and may be roaming in visited network 102, as shown in FIG. 1. Terminal 110 may receive signals from Core network 120 in visited network 102 or may communicate with base station 105 to obtain wireless communication services. Terminal 110 may also communicate with home network 104 for communication services when not roaming (not shown in FIG. 1). In some embodiments, terminal 110 may monitor signals from core network 120 (e.g., as transmitted by base station 105) but not communicate with base station 105 or with core network 120 until such time as a session may be needed with eCall server 150 or with central service 160. Such embodiments may be advantageous to reduce signaling load on visited network 102 and avoid or minimize subscription charges to the user of terminal 110.

Terminal 110 may also receive signals from one or more satellites 195, which may be part of a satellite positioning system (SPS). An SPS may include a system of space vehicles (SVs) in known Earth orbits to enable entities to determine their location on or above the Earth based, at least in part, on signals received from the SVs. Such an SV may transmit a signal marked with a repeating pseudo-random noise (PN) code of a set number of chips or some other easily acquired known signal sequence. Examples of an SPS include the US Global Positioning System (GPS), the European Galileo system, the Russian GLONASS system and the Chinese Beidou system. In some cases, SV like signals that enable positioning of a terminal 110 may be transmitted by ground based control stations known as pseudolites. An SPS may be referred to as a Global Navigation Satellite System (GNSS) and SVs may transmit a signal marked with a PN code that is distinguishable from PN codes transmitted by other SVs in the same GNSS constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, etc., and/or various augmentation systems (e.g., an Satellite Based Augmentation System (SBAS)) that may be associated with or otherwise enabled for use with one or more global and/or regional navigation satellite systems.

By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global or regional navigation satellite systems or augmentation systems, and SPS signals may include SPS, SPS-like, or other signals associated with such one or more SPS. Terminal 110 may measure signals from satellites 195 and obtain pseudo-range measurements for the satellites. Terminal 110 may also measure signals from base stations in Core network 120 (e.g., base station 105) and obtain signal timing, signal strength and/or signal quality measurements for the base stations. The pseudo-range measurements, timing measurements, signal strength and/or signal quality measurements may be used to derive a position estimate for terminal 110—e.g., by terminal 110 or by a separate entity such as a location server in or reachable from visited network 102 or home network 104 and to which the measurements may be sent by terminal 110. A position estimate may also be referred to as a location estimate, a position fix, etc.

Terminal 110 may have an International Mobile Equipment Identity (IMEI), which is a unique number assigned to the terminal. Terminal 110 may be used for a service subscription of a user—e.g., service subscription with home network 104. The service subscription may be associated with an International Mobile Subscriber Identity (IMSI), which is a unique number assigned to a subscription for cellular wireless networks such as GSM, WCDMA, LTE/LTE-A and CDMA2000. The service subscription may also be associated with a Mobile Station International Subscriber Directory Number (MSISDN), which is a telephone number for the service subscription. The IMSI may be used as a key for the service subscription in a subscriber database in HSS/PDG 140. The MSISDN may be dialed by other users to connect calls to terminal 110. The IMSI, the MSISDN, and other subscription information may be stored in a Subscriber Identity Module (SIM) or a Universal Subscriber Identity Module (USIM), which may be inserted into terminal 110. Terminal 110 may also have no SIM/USIM, in which case terminal 110 may have only an IMEI but no IMSI or MSISDN.

Wireless networks may support different types of emergency calls. One type may include "normal" emergency calls originated by users dialing well-known emergency numbers such as 911 in North America and 112 in Europe. Another type may include eCalls, which are emergency calls that may have the characteristics described above and may include the transfer of telematics data to a central service as well as supporting voice or other media communication between the user of terminal 110 and the central service. Certain systems may be configured to support emergency calls according to requirements of the European Union or other world regions or countries. An eCall may be different from a normal emergency call in the manner in which the call is placed and the additional emergency related data that may be sent to establish the eCall and used to process the eCall. For example, the additional data may indicate how the eCall was initiated (e.g. whether manually by a user or automatically in response to sensor data or a sensor trigger), a vehicle type and vehicle identification number (VIN), a timestamp, a position estimate and position confidence flag, a direction of travel, a number of passengers (e.g., from seat occupancy sensors), other passenger data (e.g., fastened seatbelts), a service provider for terminal 110 (if any), a trigger type (e.g., deployed airbags, bumper sensors, fire indicators, rollover, or other situation detection, etc.), and possibly other information. The additional data may also enable an accurate or estimated geographic location of the terminal to be provided to the central service 160. An eCall may be different from a normal emergency call in the manner in which the call is handled or routed.

In certain examples, terminal 110 may be configured to initiate an emergency call (or eCall) to the central service 160 (e.g., PSAP). The emergency call may be initiated in response to manual input from a user or in response to one or more detected conditions (e.g., deployed airbags, collision sensors, fire indicators, rollover, or other situation detection, etc.). To initiate the emergency call, the terminal 110 may use a communication session which may employ the Session Initiation Protocol (SIP), Extensible Messaging and Presence Protocol (XMPP), web real-time communication (WebRTC), Google Talk, Skype, OSCAR, or Microsoft Messenger Service, or another communication protocol or service, to establish a packet-based call (e.g., voice call, packet based data call involving text, IM or video communication, and the like) with the central service 160 or a third-party central service (not shown in FIG. 1). The terminal 110 may transmit a set of telematics data in a first signaling message over the communication session, and the central service 160 or third-party central service may respond via a second signaling message over the communication session with metadata for the set of telematics data, such as an acknowledgement of whether the telematics data was received at the central service, a request to retransmit the telematics data, a request to transmit different telematics data, a request to take some other action, auxiliary data describing actions taken by the central service, and/or other relevant telematics metadata. In this way, the transmission of telematics data and related telematics metadata may occur separately from voice or other media (e.g., Instant Message (IM), text, video, etc.) communications and need not therefore disrupt the media stream (e.g., media channel) and may be transmitted more quickly without the setup time needed for a media channel.

Moreover, telematics data and related telematics metadata may be exchanged between the terminal 110 and central service much more efficiently and quickly than may be possible with voice channel modulation (e.g., as supported for in-band eCall). Further, the telematics data and related telematics metadata may be associated or coordinated with the session and/or the voice channel (e.g., the telematics data and related telematics metadata may be exchanged with the same PSAP that is handling the voice channel).

If visited network 102 is an LTE/LTE-A network, base station 105 may be connected by an Si interface to the core network 120. The core network 120 may be an evolved packet core (EPC), which may include at least one mobility management entity (MME), at least one serving gateway (S-GW), and at least one PDG such as PDG 130. The MME may be the control node that processes the signaling between the terminal 110 and the evolved packet core (EPC). All user IP packets may be transferred through the S-GW, which itself may be connected to the PDG. The PDG may be connected to the network operator's IP services. The operator's IP services may include the Internet, an intranet, an IP Multimedia Subsystem (IMS), and a Packet-Switched (PS) Streaming Service (PSS).

In some cases, LTE/LTE-A networks may be designed for transfer of data packets, and may use a circuit switched fall back for voice communications. However, an LTE/LTE-A network may also be used for voice communications using a packet based system similar to voice over Internet protocol (VoIP) applications such as Skype. This may be accomplished using voice over Long Term Evolution (VoLTE) technology. There may be several key differences between VoLTE and VoIP. For example, VoLTE service may include an explicit quality of service (QoS) target. To achieve the QoS threshold in poor radio conditions, VoLTE packets may utilize IMS and other network features to ensure low latency and improved error correction.

According to the present disclosure, terminal 110 (such as an IVS) may transmit an eCall message (e.g. a SIP INVITE message) to eCall server 150 using a communication session (e.g. SIP). The eCall message may include session information and/or telematics data. Following transmission of the eCall message, the terminal 110 and eCall server 150 may interact using the communication session to establish an emergency related call (e.g. a VoIP call). The eCall server 150 may then relay information or communication concerning this call (e.g. received from terminal 110) to a central service 160 (e.g., a PSAP). For example, eCall server 150 may generate an automatic text-to-speech message that is transmitted to the central service 160 over a Public Switched Telephone Network (PTSN) (not shown in FIG. 1). In some cases, eCall server 150 may transmit a response to terminal 110 including metadata based on the telematics data transmitted in the eCall message. The eCall message may also include a call-back number (e.g. the MSISDN for terminal 110), and the central service 160 may contact the wireless device directly using the call-back number over a PTSN. In some cases, terminal 110 may transmit more than one eCall message to eCall server 150 that may include session information, telematics data and/or telematics metadata. The one or more eCall messages may include a SIP INVITE message, a SIP INFO message, a SIP 200 OK message and/or some other SIP message or non-SIP message.

Figure 2A:
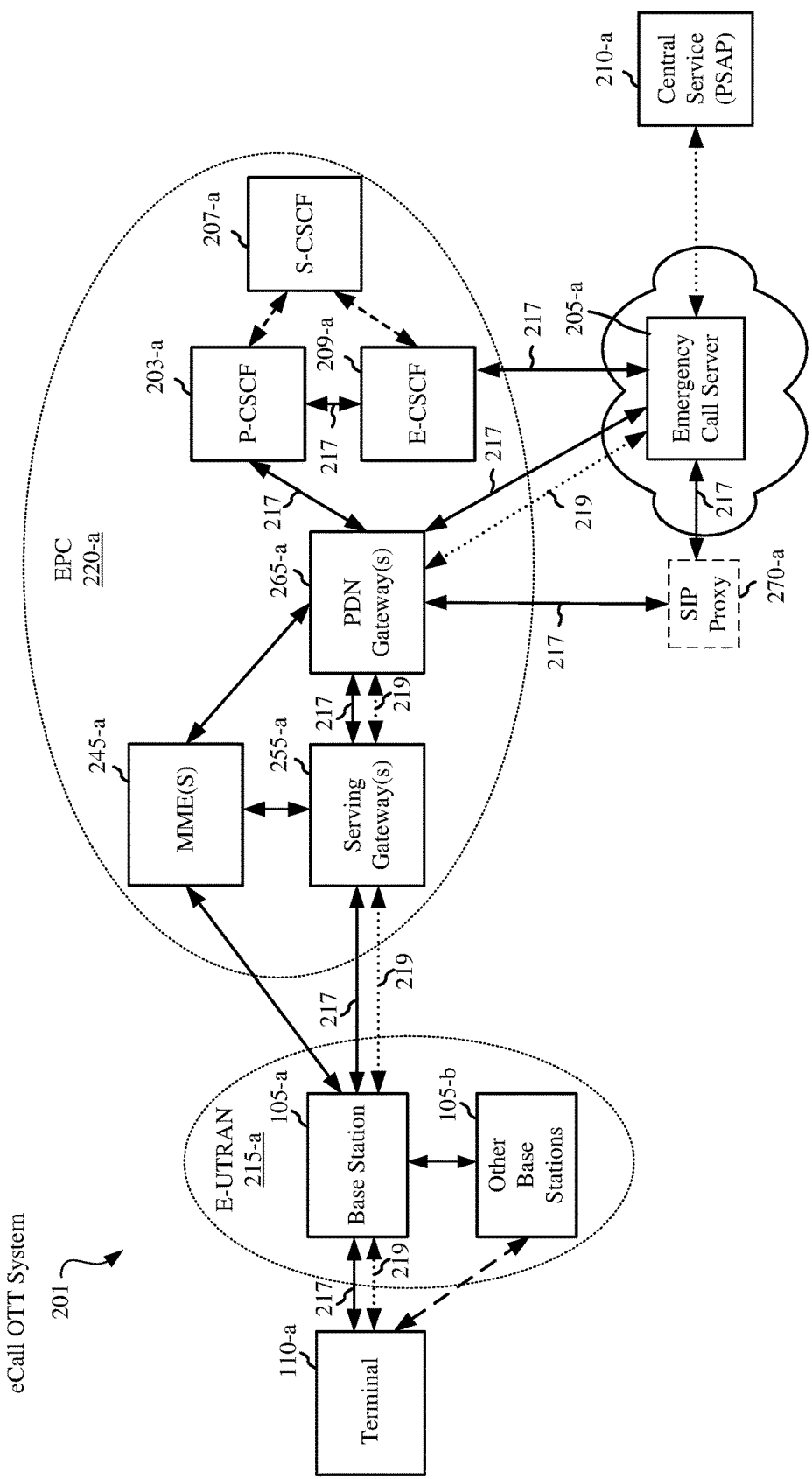
FIG. 2A illustrates an LTE/LTE-Advanced network architecture for emergency call Over-the-Top in accordance with various aspects of the present disclosure.

FIG. 2A is a diagram illustrating an LTE/LTE-Advanced network architecture for eCall Over-the-Top in accordance with various aspects of the present disclosure. FIG. 2A exemplifies support of eCall OTT by the serving network for a terminal (i.e., not by the home network unless a terminal is served by its home network). The LTE/LTE-A network architecture may be a component of an eCall OTT system 201. The eCall OTT system 201 may include one or more terminals 110-*a* (e.g., UEs or IVSs), an Evolved UMTS Terrestrial Radio Access Network (E-UTRAN) 215-*a*, and an Evolved Packet Core (EPC) 220-*a*, and may connect to other IP services and networks. The eCall OTT system 201 may interconnect with other access networks, but for simplicity, those entities/interfaces are not shown. As shown, the eCall OTT system 201 provides packet-switched services; however, as those skilled in the art will readily appreciate, the various concepts presented throughout this disclosure may be extended to networks providing circuit-switched services.

The E-UTRAN 215-*a* may include a base station 105-*a* (e.g., Evolved Node B (eNB)) and other base stations 105-*b*. The base station 105-*a* may provide user and control plane protocol terminations toward the terminal 110-*a*. The terminal 110-*a* may be an example of the terminal 110 of FIG. 1. The base station 105-*a* may be connected to the other base stations 105-*b* via an X2 interface (e.g., backhaul). The base station 105-*a* may provide an access point to the EPC 220-*a* for the terminal 110-*a*. The base station 105-*a* may be connected by an Si interface to the EPC 220-*a*. The EPC 220-*a* may include one or more Mobility Management Entities (MMEs) 245-*a*, one or more Serving Gateways 255-*a*, and one or more Packet Data Network (PDN) Gateways 265-*a*. The MME 245-*a* may be the control node that processes the signaling between the terminal 110-*a* and the EPC 220-*a*. Generally, the MME 245-*a* may provide bearer and connection management and manage mobility for terminals, such as terminal 110-*a*. User IP packets may be transferred through the Serving Gateway 255-*a*, which itself may be connected to the PDN Gateway 265-*a*. The PDN Gateway 265-*a* may provide terminal IP address allocation as well as other functions. The PDN Gateway 265-*a* may be connected to the other IP Services and networks including IP services owned and operated by the operator for EPC 220-*a*. The other IP Services and networks may include the Internet, an Intranet, an IP Multimedia Subsystem (IMS), and a Packet-Switched (PS) Streaming Service (PSS). The other IP Services and networks may also include (or connect to) a third party emergency call server (eCall server) 205-*a*, which may receive emergency related calls (e.g. OTT emergency calls) initiated by terminals 110-*a* and transfer information or communication associated with these emergency related calls (e.g. information or communication received from terminals 110-*a*) to a central service 210-*a* e.g. via establishing emergency calls to central service 210-*a*. In some cases, emergency calls may be routed from eCall server 205-*a* to central service 210-*a* through an Emergency Services IP network (ESInet) (not shown in FIG. 2A), which may be owned or operated by or on behalf of a public safety organization.

The PDN Gateway 265-*a* may also be connected to a Proxy-Call Session Control Function (P-CSCF) 203-*a*. The P-CSCF 203-*a* may be connected to an Emergency-Call Session Control Function (E-CSCF) 209-*a*. In certain examples (enterprise networks, for instance), the P-CSCF 203-*a* may be connected to the E-CSCF 209-*a* through a Serving-Call Session Control Function (S-CSCF) 207-*a*. P-CSCF 203-*a*, E-CSCF 209-*a*, and S-CSCF 207-*a* may be part of an IMS for EPC 220-*a*. In the case where the terminal 110-*a* is an IMS device, it may send a SIP INVITE to its cellular carrier's network (e.g., to the P-CSCF 203 which may forward the SIP INVITE to the E-CSCF 209-*a*, which may forward it to the third party eCall server 205-*a*). In some examples, central service 210-*a* may be connected to an Emergency Services Routing Proxy (ESRP) (not shown in FIG. 2A). The ESRP may be connected to an Emergency Call Routing Function (ECRF) (not shown in FIG. 2A). In some examples, PDN Gateway 265-*a* may relay information to a Session Initiation Protocol (SIP) Proxy 270-*a*, which may in turn communicate with eCall server 205-*a*.

The terminal 110-*a* may be configured to collaboratively communicate with multiple base stations 105 through, for example, Multiple Input Multiple Output (MIMO), Coordinated Multi-Point (CoMP), or other schemes. MIMO techniques use multiple antennas on the base stations or multiple antennas on the terminal, or both, to take advantage of multipath environments to transmit multiple data streams. CoMP includes techniques for dynamic coordination of transmission and reception by a number of base stations to improve overall transmission quality for terminal as well as increasing network and spectrum utilization.

In certain examples, terminal 110-*a* may be configured to initiate an emergency related call (e.g., an NG eCall or OTT eCall) to the eCall server 205-*a*. The emergency related call may be initiated in response to manual input from a user or in response to one or more detected conditions (e.g., deployed airbags, collision sensors, fire indicators, rollover, or other situation detection, etc.). The emergency related call may include a first set of signaling 217 related to a communication session (e.g., SIP) (that may include telematics information, for example) and a second set of signaling/data 219 related to controlling communication media (e.g., voice/data) and containing the media data itself (e.g., speech, video and/or text). The base station 105-*a* may route the first set of signaling 217 and the second set of signaling/data 219 to the serving gateway 255-*a*. The serving gateway 255-*a* may route the first set of signaling 217 and the second set of signaling/data 219 to the PDN gateway 265-*a*. The PDN gateway 265-*a* may route the second set of signaling/data 219 to the eCall server 205-*a* irrespective of how the first set of signaling 217 is routed. The first set of signaling 217 may be routed from the PDN Gateway 265-*a* to the eCall server 205-*a* according to three different embodiments. In a first embodiment, the PDN Gateway 265-*a* may route the first set of signaling 217 directly to the eCall server 205-*a* or possibly via a PDN or the Internet to the eCall server 205-*a*. In a second embodiment, the PDN Gateway 265-*a* may route the first set of signaling 217 directly (or via a PDN or the Internet) to a SIP Proxy Server 270-*a* which may route the first set of Signaling 217 to the eCall server 205*a* (e.g. directly or via a PDN or the Internet). In a third embodiment, the PDN Gateway 265-*a* may route the first set of signaling 217 directly to P-CSCF 203-*a* which may then route the first set of signaling 217 to the E-CSCF 209-*a*. In some cases (in enterprise networks, for example), the P-CSCF 203-*a* may route the first set of signaling 217 to the E-CSCF 209-*a* via the S-CSCF 207-*a*. The E-CSCF 209-*a* may then route the first set of signaling 217 to the third party eCall server 205-*a* (e.g. directly or via a PDN or the Internet). For each of the three embodiments, eCall server 205-*a* may relay information or communication received in the first set of signaling 217 and/or in the second set of signaling/data 219 to the central service 210-*a*. For example, any telematics data received in the first set of signaling 217 and any information received via voice or data in the second set of signaling/data 219 may be relayed to the central service 210-*a*. Telematics data and related telematics metadata may be associated or coordinated with the session and/or the media stream(s)—e.g., the telematics data and related telematics metadata may be exchanged using the first set of signaling 217 and/or the second set of signaling/data 219. The media stream(s) that form all or part of the second set of signaling/data 219 may include any streaming media, including voice, message-at-a-time text (e.g., IM), character-at-a-time text (e.g., streaming text, real-time text), audio, video, and/or any non-streaming media such as text messages. In some cases, the media exchanged in what may be referred to as a media stream may carry only non-streaming media. The eCall server 205-*a* may relay media streams to the central service 210-*a* directly, on in some cases, a circuit switched connection (not shown) may be established between central service 210-*a* and terminal 110-*a*.

In some embodiments, terminal 110, base station 105, core network 120, PDG 130, eCall server 150 and/or central service 160 in FIG. 1 may correspond, respectively, to terminal 110-*a*, base station 105-*a*, EPC 220-*a*, a PDN Gateway 265-*a*, emergency call server 205-*a* and/or central service 210-*a* in FIG. 2A.

Figure 2B:
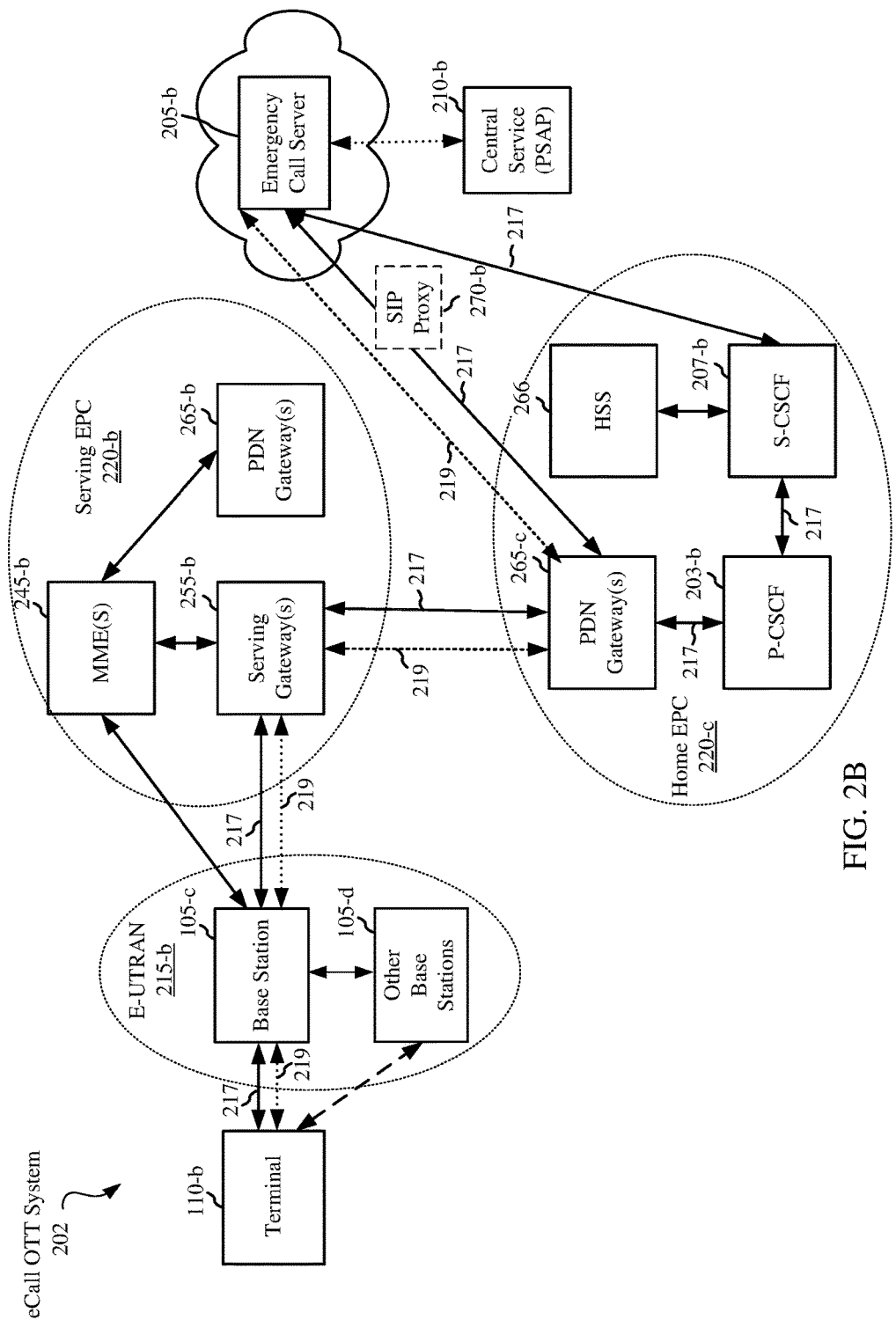
FIG. 2B illustrates a visited LTE/LTE-Advanced network architecture for emergency call Over-the-Top in accordance with various aspects of the present disclosure.

FIG. 2B is a diagram illustrating a visited LTE/LTE-Advanced network architecture for eCall Over-the-Top in accordance with various aspects of the present disclosure. FIG. 2B exemplifies support of eCall OTT by the home network for a terminal that is roaming in a serving network different to the home network. The LTE/LTE-A network architecture may be a component of an eCall OTT system 202. The eCall OTT system 202 may include one or more terminals 110-*b*, an E-UTRAN 215-*b*, and an EPC 220-*b*, and may connect to other IP services and networks. As shown, the eCall OTT system 202 provides packet-switched services; however, as those skilled in the art will readily appreciate, the various concepts presented throughout this disclosure may be extended to networks providing circuit-switched services. The LTE/LTE-A network architecture of eCall OTT system 202 may include aspects of The LTE/LTE-A network architecture of eCall OTT system 201.

The E-UTRAN 215-b may include a base station 105-c and other base stations 105-d. The base station 105-c may provide user and control plane protocol terminations toward the terminal 110-b. The terminal 110-b may be an example of the terminal 110 of FIG. 1. The base station 105-c may be connected to the other base stations 105-d via an X2 interface. The base station 105-c may provide an access point to the EPC 220-b for the terminal 110-a. The serving EPC 220-b may include one or more MMEs 245-b, one or more Serving Gateways 255-b, and one or more PDN Gateways 265-b. The home EPC 220-c may include one or more PDN Gateways 265-c, a P-CSCF 203-b, an S-CSCF 207-b and an HSS 266.

In a visited network, emergency calls (e.g. an OTT eCall) may be routed from serving gateway 255-b to PDN Gateway 265-c of the home network EPC 220-c. In different examples, PDN Gateway 265-c may communicate with eCall server 205-b directly or through SIP Proxy 270-b. In some cases, emergency calls may be routed through an ESInet (not shown in FIG. 2B), which may be owned or operated by or on behalf of a public safety organization.

The PDN Gateway 265-c may also be connected to a P-CSCF 203-b. The P-CSCF 203-b may be connected to an S-CSCF 207-b, which may be connected to a home subscriber service 266. P-CSCF 203-b and S-CSCF 207-b may be part of an IMS for Home EPC 220-c. In the case where the terminal 110-b is an IMS device, it may send a SIP INVITE to its cellular carrier's network—e.g., through the visited network to the P-CSCF 203-b which may forward the SIP INVITE to the S-CSCF 207-b, which in turn may forward it to the third party eCall server 205-b, and then to the central service 210-b (in some cases via an ESInet). In some cases, central service 210-b may be connected to an ESRP and an ECRF (not shown in FIG. 2B).

In certain examples, terminal 110-b may be configured to initiate an emergency related call (e.g. an OTT eCall) to the e.g. emergency call server (eCall server) 205-b. The emergency related call may be initiated in response to manual input from a user or in response to one or more detected condition—e.g., deployed airbags, collision sensors, fire indicators, rollover, or other situation detection, or the like. The emergency related call may include a first set of signaling 217 related to a communication session (e.g., SIP) (that may include telematics information, for example) and a second set of signaling/data 219 related to and/or including communication media (e.g., voice/data). The first set of signaling 217 and the second set of signaling/data 219 may be similar to or the same as the first set of signaling 217 and the second set of signaling/data 219 described for FIG. 2A. The base station 105-c may route the first set of signaling 217 and the second set of signaling/data 219 to the serving gateway 255-b. The serving gateway 255-b may route the first set of signaling 217 and the second set of signaling/data 219 to the PDN gateway 265-c. The PDN gateway 265-c may route the second set of signaling/data 219 to the eCall server 205-b irrespective of how the first set of signaling 217 is routed. The first set of signaling 217 may be routed from the PDN Gateway 265-c to the eCall server 205-b according to three different embodiments. In a first embodiment, the PDN Gateway 265-c may route the first set of signaling 217 directly to the eCall server 205-b or possibly via a PDN or the Internet (not shown in FIG. 2B). In a second embodiment, the PDN Gateway 265-c may route the first set of signaling 217 directly (or via a PDN or the Internet) to a SIP Proxy Server 270-b which may route the first set of Signaling 217 to the eCall server 205-b (e.g. directly or via a PDN or the Internet). In a third embodiment, the PDN Gateway 265-c may route the first set of signaling 217 directly to P-CSCF 203-b which may then route the first set of signaling 217 to the S-CSCF 207-b. The S-CSCF 207-b may then route the first set of signaling 217 to the third party eCall server 205-b (e.g. directly or via a PDN or the Internet). The eCall server 205-b may relay information and communication received in the first set of signaling 217 (e.g. telematics data) and/or second set of signaling/data 219 (e.g. information obtained from voice or data) and possibly associated media streams for the second set of signaling/data 219 to the central service 210-b directly, or in some cases, a circuit switched connection (not shown) may be established between central service 210-b and terminal 110-b.

In some embodiments, terminal 110, base station 105, core network 120, HSS/PDG 140, eCall server 150, central service 160 and/or home network 104 in FIG. 1 may correspond, respectively, to terminal 110-b, base station 105-c, serving EPC 220-b, a PDN Gateway 265-c and HSS 266, emergency call server 205-b, central service 210-b and/or home EPC 220-c in FIG. 2B.

Figure 3A:
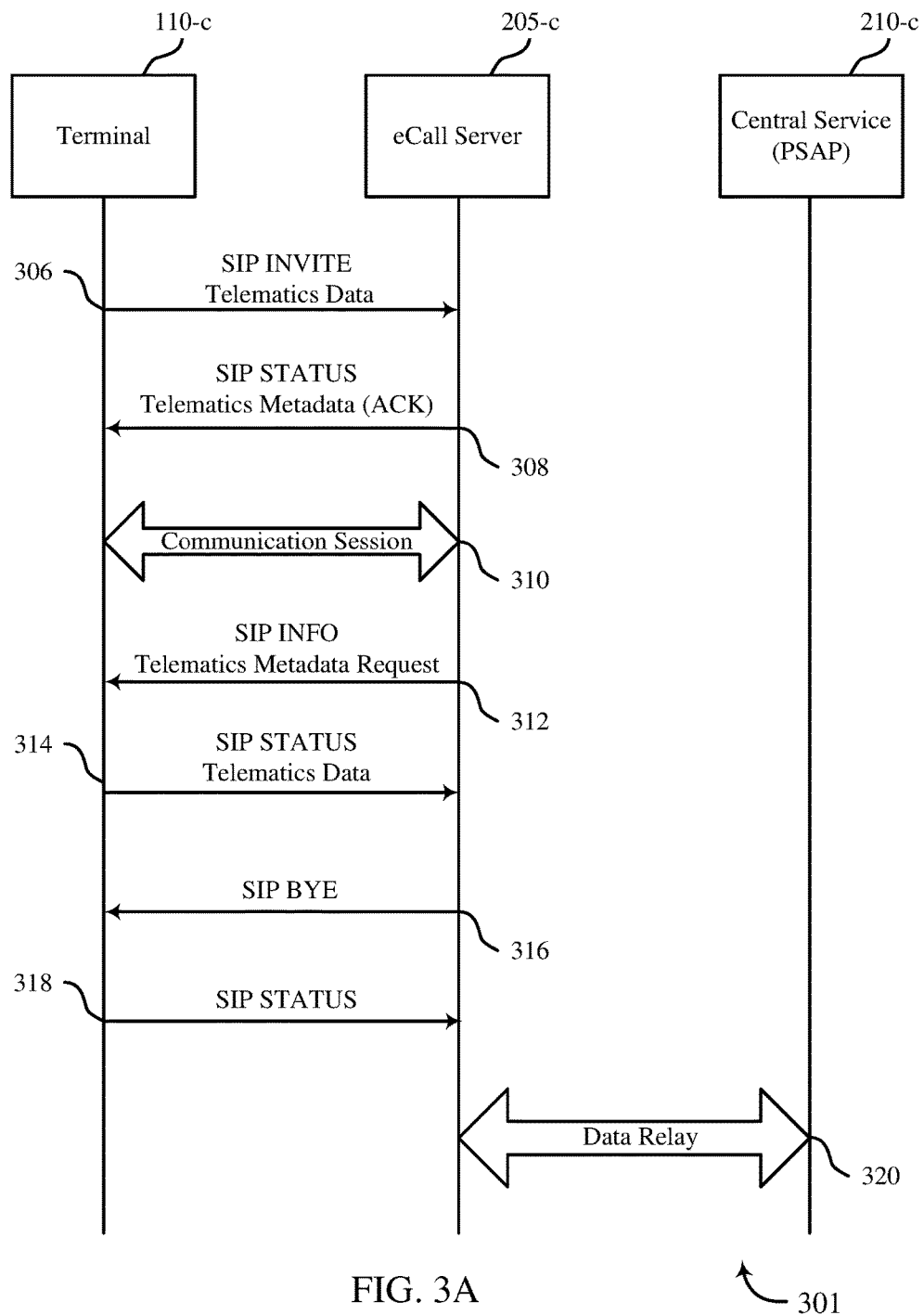
FIG. 3A illustrates an example of a process flow for emergency call Over-the-Top in accordance with various aspects of the present disclosure.

FIG. 3A depicts process flow 301 for eCall Over-the-Top, in accordance with various aspect of the present disclosure. Process flow 301 may include a terminal 110-c, an eCall server (also referred to herein as an emergency call server) 205-c, and a central service (also referred to as a PSAP) 210-c which may correspond, respectively, to a terminal 110, an eCall server 150 or 205 and a central service 160 or 210 described with reference to FIGS. 1-2. In certain examples, central service (PSAP) 210-c may be implemented by one or more servers. The eCall server 205-c may serve as an intermediary for information exchanges between terminal 110-c and PSAP 210-c—e.g., eCall server 205-c may handle the eCall from terminal 110-c forward the information to PSAP 210-c. Process flow 301 may facilitate communications sessions to both exchange telematics data and telematics metadata and communicate verbal indications of telematics information. Process flow 301 may employ a communication session, which may be a version of SIP used to carry telematics data and telematics metadata. In other examples, other communication sessions may be used.

At step 306, terminal 110-c may transmit a SIP INVITE message to eCall server 205-c. In certain examples, the SIP INVITE message may be an example of a modified SIP request message which carries both session data and telematics data. The SIP INVITE message may simultaneously invite eCall server 205-c to a proposed communication session having a proposed set of parameters and convey a set of telematics data from terminal 110-c to eCall server 205-c. In certain examples, terminal 110-c may be associated with a vehicle and may transmit the SIP INVITE message to eCall server 205-c in response to a detected condition at the vehicle or a manual request for an emergency call by an occupant of the vehicle. In certain examples, prior to transmitting the SIP INVITE message at step 306, terminal 110-c may obtain communication services from a serving network (not shown in FIG. 3A) such as visited network 102, EPC 220-a or serving EPC 220-b.

At step 308, eCall server 205-c may respond to the SIP INVITE message by transmitting a SIP STATUS message (e.g., a SIP 200 OK message) to terminal 110-c. The SIP STATUS message may simultaneously agree to the proposed communication session and convey telematics metadata to terminal 110-c acknowledging receipt of the telematics data by eCall server 205-c. At step 310, the communication session may be implemented by streaming packets of session data carrying voice or other media communications between terminal 110-c and eCall server 205-c according to parameters agreed to in the SIP INVITE and SIP STATUS messages.

At step 312, eCall server 205-c may transmit a SIP INFO message to terminal 110-c with additional telematics metadata. In one example, the additional telematics metadata may request additional telematics data beyond what was included in the initial SIP INVITE message at step 306. In another example, the additional telematics metadata may additionally include instructions for the terminal 110-c or vehicle to carry out. At step 314, terminal 110-c may transmit a SIP STATUS (e.g., a SIP 200 OK) or SIP INFO message to eCall server 205-c with the requested additional telematics data. In some embodiments, the SIP STATUS message at step 308 may carry telematics metadata that request additional telematics data and the SIP STATUS or SIP INFO message sent at step 314 may then be sent in response to step 308 and carry the requested additional telematics data; in this embodiment, the SIP INFO message at step 312 may not be sent.

At step 316, the communication session may be terminated by eCall server 205-c transmitting a SIP BYE message to terminal 110-c. Terminal 110-c may confirm the termination of the session at step 318 by transmitting a SIP STATUS response message (e.g. SIP 200 OK message) to eCall server 205-c. In other examples, terminal 110-c may initiate termination of the communication session, and eCall server 205-c may transmit the SIP STATUS response message to terminal 110-c. At step 320, eCall server 205-c may establish a communication session with PSAP 210-c. Step 320 may occur after step 318 or may occur prior to step 318 but after step 306.

The process flow 301 is an example of an OTT eCall. For an example of this type, in some cases, eCall server 205-c may receive a first signaling message (e.g., a set of telematics data or metadata) from terminal 110-c. The first signaling message may be received using a communication session. The first signaling message may include a set of session information related to a communication session (e.g., the communication session at step 310). The first signaling message may correspond to the SIP INVITE message at step 306. In some cases emergency call server 205-c may relay a portion of the telematics data or metadata to the PSAP 210-c at or following step 320. The terminal 110-c may generate a header for the first signaling message based on the communication session, the header including an indication that a portion of a body of the first signaling message includes the set of telematics data. In some examples the communication session includes at least one of: Session Initiation Protocol (SIP), Extensible Messaging and Presence Protocol (XMPP), web real-time communication (WebRTC), Google Talk, or Skype. In some examples the communication session includes a Voice over Internet Protocol (VoIP) call. In some examples, the communication session carries one or more of voice, character-at-a-time text, message-at-a-time text, video, and text messaging using at least one of streaming or non-streaming media.

Furthermore, eCall server 205-c may transmit a second signaling message to terminal 110-c. The transmissions may be sent using the communication session protocol used to receive the first signaling message, and the second signaling message may include metadata based at least in part on a reception status or a content of the first signaling message. The second signaling message may correspond to the SIP STATUS message at step 308 or the SIP INFO message at step 312. In some cases, a verbal message may be generated by eCall server 205-c. Accordingly, a portion of the first signaling message may be relayed to PSAP 210-c by sending the verbal message to PSAP 210-c—e.g. at step 320. The verbal message may be the result of a person parsing information received from terminal 110-c and verbally (e.g., orally or in writing) communicating relevant portions to PSAP 210-c (e.g., through a circuit-switched connection). Alternatively, an automated text-to-speech mechanism may be implemented to parse and relay the information received at eCall server 205-c to PSAP 210-c. In some examples, there may be a circuit-switched connection directly between terminal 110-c and PSAP 210-c—e.g., terminal 110-c and PSAP 210-c may communicate at least some information without the assistance of a proxy server such as eCall server 205-c.

In some examples, the second signaling message includes an instruction for the terminal 110-c to take at least one action based on the reception status or the content of a set of telematics data in the first signaling message, the instruction including the metadata based on the reception status or the content of the set of telematics data. In some examples the action includes gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking a door, activating a horn of a vehicle, activating an externally audible sound, activating lights of a vehicle, activating flashers of a vehicle, actuating a power window, playing a recorded message, rendering media, or displaying a text message.

Figure 3B:
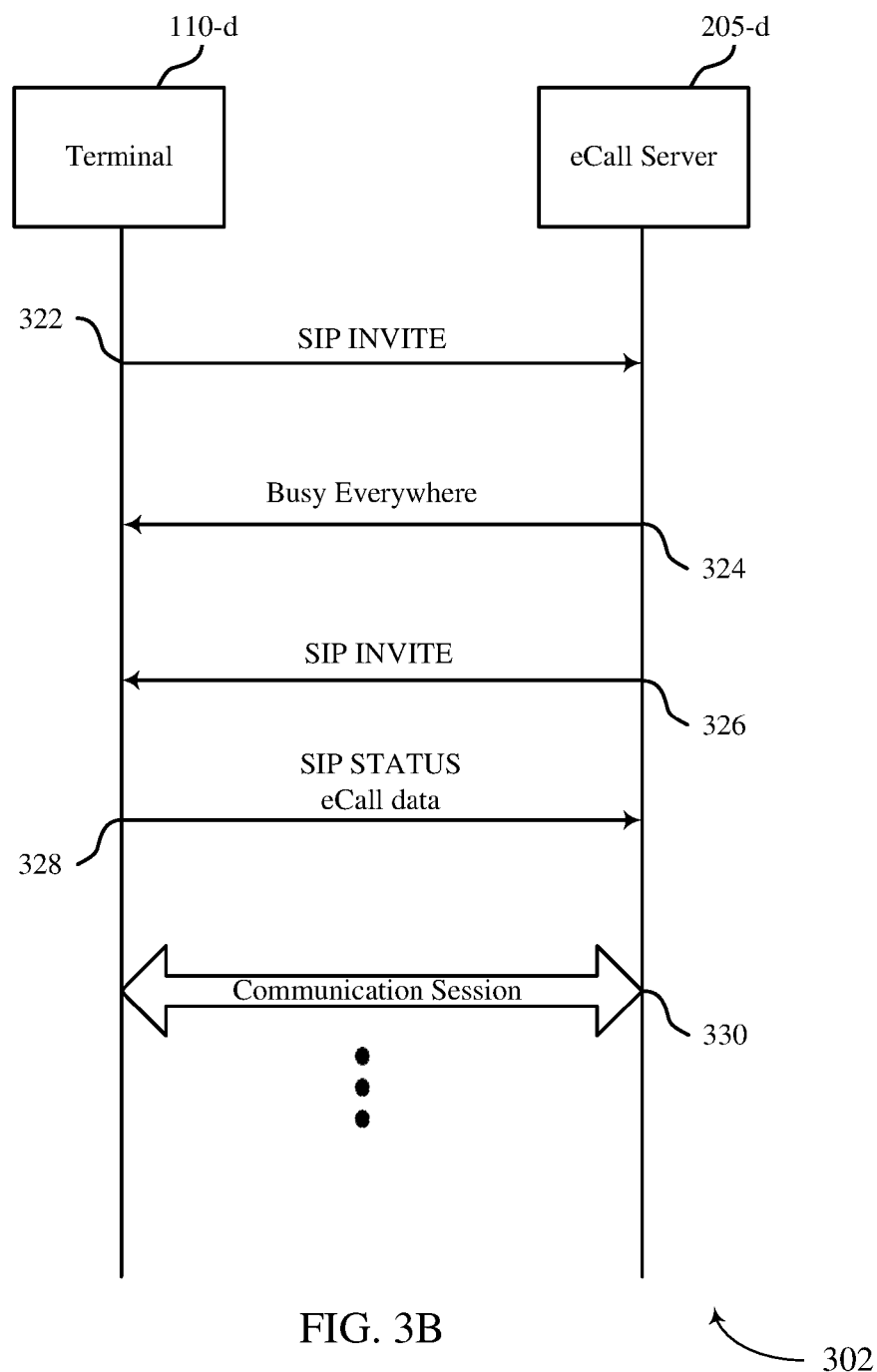
FIG. 3B illustrates an example of a process flow for emergency call Over-the-Top in accordance with various aspects of the present disclosure.

FIG. 3B depicts process flow 302 for eCall Over-the-Top in accordance with various aspect of the present disclosure. Process flow 302 may include a terminal 110-d and an eCall server 205-d which may correspond, respectively, to a terminal 110 and an eCall server 150 or 205 described with reference to FIGS. 1-3A. ECall server 205-d may serve as an intermediary for information exchanges between terminal 110-d and a PSAP 210 (e.g., eCall server 205-d may forward information, speech, data and/or communication session messages between terminal 110-d and a PSAP 210, and vice-versa). Process flow 302 may employ a communication session, which may be a version of SIP modified to carry telematics data and telematics metadata. In other examples, other communication sessions may be used.

At step 322, terminal 110-d may transmit a SIP INVITE message to eCall server 205-d. In certain examples, the SIP INVITE message may be an example of a modified SIP request message which carries both session data and telematics data. The SIP INVITE message may simultaneously invite eCall server 205-d to a proposed communication session having a proposed set of parameters and convey a set of telematics data from terminal 110-d to eCall server 205-d. In certain examples, terminal 110-d may be associated with a vehicle and may transmit the SIP INVITE message to eCall server 205-d in response to a detected condition at the vehicle or a manual request for an emergency call by an occupant of the vehicle. In certain examples, prior to transmitting the SIP INVITE message at step 322, terminal 110-d may obtain communication services from a serving network (not shown in FIG. 3B) such as visited network 102, EPC 220-a or serving EPC 220-b.

At step 324, eCall server 205-d may respond to the SIP INVITE message by transmitting a busy everywhere message (e.g., a SIP 600 busy everywhere message) to terminal 110-d. The busy everywhere message may indicate to terminal 110-d that eCall server 205-d is at capacity (e.g., handling other emergency calls) and is not able to serve terminal 110-d. The busy everywhere message may also indicate to terminal 110-d an alternative eCall server 205—e.g., in the event that eCall server 205-d is too busy to serve terminal 110-d, eCall server 205-d may refer terminal 110-d to another eCall server 205. The busy everywhere message may, additionally or alternately, indicate to terminal 110-d an estimated time period in which eCall server 205-d anticipates having the resources to serve terminal 110-d. In some cases the busy everywhere message may be sent along with eCall metadata or an acknowledgment regarding the receipt of the SIP INVITE and/or the telematics data.

At step 326, for instance, when eCall server 205-d has sufficient resources to handle terminal 110-d, eCall server 205-d may transmit a SIP INVITE to terminal 110-d. The SIP INVITE message may include information (e.g., an emergency call indication, an address of eCall server 205-d or some information or code included in the SIP INVITE message sent at step 322) that enables terminal 110-d to verify that the SIP INVITE message sent at step 326 was sent by eCall server 205-d and not by some other entity. At step 328, terminal 110-d may send a SIP STATUS message (e.g., a SIP 200 OK message) to eCall server 205-d. The SIP STATUS message may simultaneously agree to the proposed communication session and may convey telematics data to eCall server 205-d. For example, the telematics data (e.g., MSD or VEDS) may be conveyed if terminal 110-d is able to verify that the SIP INVITE sent at step 326 was sent by eCall server 205-d and not by some other entity, as described previously. In some cases, the SIP STATUS message may acknowledge the receipt of any telematics metadata sent by eCall server 205-d at step 326. According to the proposed and accepted session parameters, at step 330, a communication session may be implemented between terminal 110-d and eCall server 205-d by streaming packets of session data carrying voice and/or other media communications between terminal 110-d and eCall server 205-d. In some cases, the communication session may be implemented over a circuit-switched connection. In one example, the communication session may convey verbal messages (e.g., those generated by a person or a machine) from eCall server 205-d to terminal 110-d, and/or vice-versa.

Figure 3C:
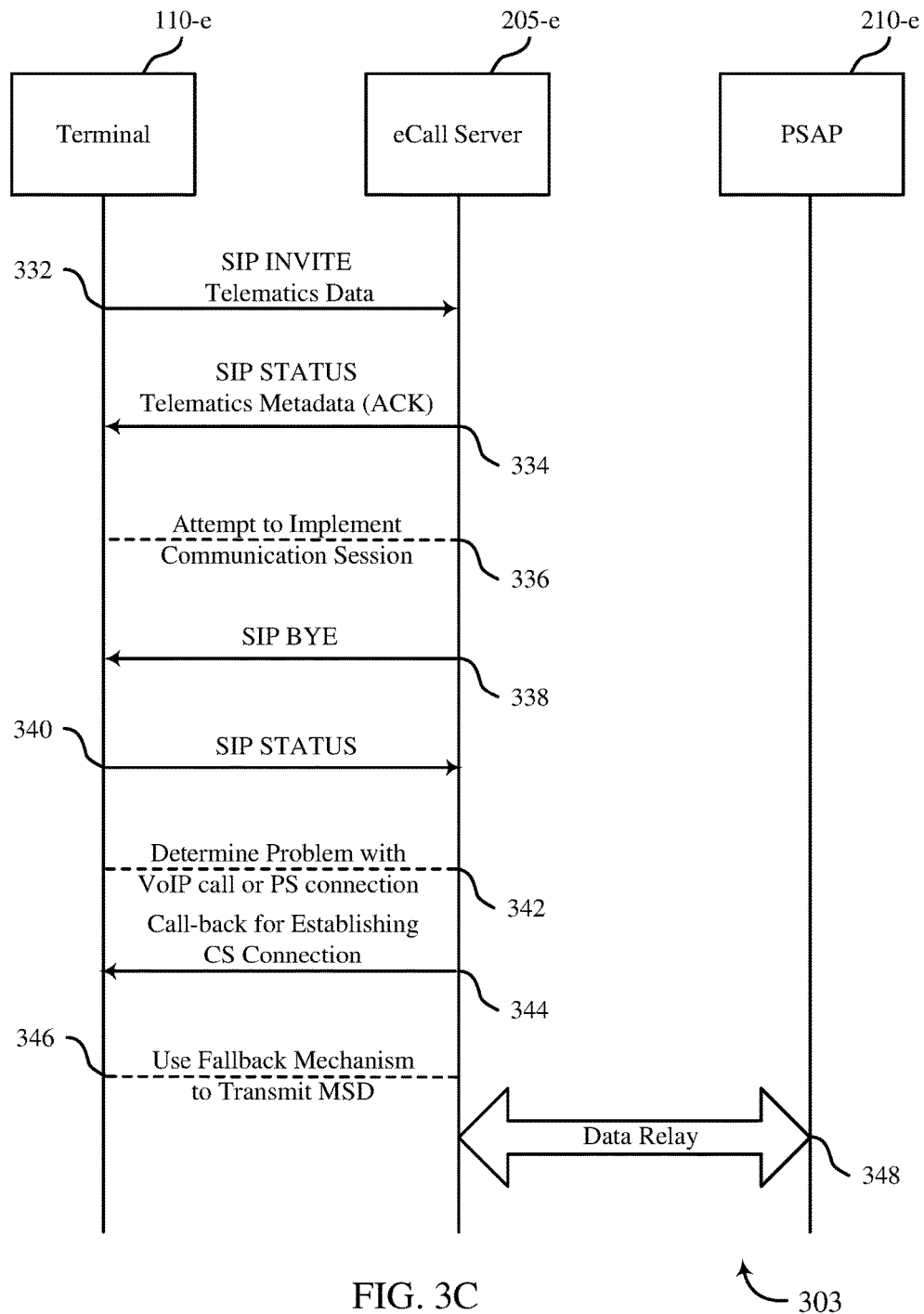
FIG. 3C illustrates an example of a process flow for emergency call Over-the-Top in accordance with various aspects of the present disclosure.

FIG. 3C depicts process flow 303 for eCall Over-the-Top (OTT eCall) in accordance with various aspects of the present disclosure. Process flow 303 may include a terminal 110-e, an eCall server 205-e, and a central service (or PSAP) 210-e, which may correspond, respectively, to a terminal 110, an eCall server 150 or 205 and a central service 160 or 210 described with reference to FIGS. 1-3B. In certain examples, PSAP 210-e may be implemented by one or more servers. The eCall server 205-e may serve as an intermediary for information exchanges between terminal 110-e and PSAP 210-e—e.g., eCall server 205-e may handle the eCall from terminal 110-e and forward information from terminal 110-e to PSAP 210-e (or vice versa). Process flow 303 may facilitate communication sessions to both exchange telematics data and telematics metadata and communicate verbal indications of telematics information. Process flow 303 may employ a communication session, which session may be established over a PS connection or a CS connection to carry telematics data and telematics metadata. In other examples, other communication sessions may be used.

At step 332, terminal 110-e may initiate a PS connection with eCall server 205-e. When initiating the PS connection, the terminal 110-e may transmit a first signaling message (e.g., a SIP INVITE message) to the eCall server 205-e. In certain examples, the SIP INVITE message may be an example of a modified SIP request message which carries both session data and telematics data. The SIP INVITE message may simultaneously invite eCall server 205-e to a proposed communication session having a proposed set of parameters and convey a call-back number (CBN) and/or other identity for terminal 110-e, and/or a set of telematics data (e.g., an MSD or VEDS), from terminal 110-e to eCall server 205-e. In certain examples, terminal 110-e may be associated with a vehicle and may transmit the SIP INVITE message to eCall server 205-e in response to a detected condition at the vehicle or a manual request for an emergency call by an occupant of the vehicle. In certain examples, prior to transmitting the SIP INVITE message at step 332, terminal 110-d may obtain communication services from a serving network (not shown in FIG. 3C) such as visited network 102, EPC 220-a or serving EPC 220-b.

At step 334, eCall server 205-e may attempt to respond to the SIP INVITE message by transmitting a second signaling message (e.g., a SIP STATUS message, such as a SIP 200 OK message) to terminal 110-e. The second signaling message (shown as a SIP STATUS message in FIG. 3C) may simultaneously agree to the proposed communication session and convey telematics metadata to terminal 110-e acknowledging receipt of the telematics data by eCall server 205-e. At step 336, and when (or shortly after) the second signaling message is received by terminal 110-e, the eCall server 205-e and terminal 110-e may attempt to implement the communication session by streaming packets of session data carrying voice or other media communications between terminal 110-e and eCall server 205-e according to parameters agreed to in the SIP INVITE and second signaling messages. In some embodiments, the communication session may not be implemented—e.g., may not be agreed by eCall server 205-e at step 334, may not be successfully established for other reasons or may be successfully established but may later fail due to inadequate bandwidth or lack of other resources.

At step 338, the PS connection may optionally be terminated by eCall server 205-e transmitting a termination message (e.g., a SIP BYE message) to terminal 110-e. Terminal 110-e may optionally confirm the termination of the PS connection at step 340 by transmitting a response message (e.g., a SIP STATUS message, such as a SIP 200 OK message) to eCall server 205-e. In other examples, terminal 110-e may initiate termination of the PS connection, and eCall server 205-e may transmit the SIP STATUS response message to terminal 110-e. In other examples, the PS connection may fail.

At step 342, which in some cases may be an alternative to steps 338 and 340 and not occur in combination with steps 338 and 340, the terminal 110-e may determine that a VoIP call between the terminal 110-e and the eCall server 205-e cannot be established, that the PS connection has failed, that the PS connection does not support a threshold quality or bandwidth for a VoIP call (e.g., that the PS connection lacks a threshold quality (e.g., QoS, packet loss, latency, or bandwidth), or that the PS connection has been terminated by the eCall server 205-e (e.g., because the PS connection was initiated without media data, or because the PS connection does not support a threshold quality or bandwidth).

At step 344, the terminal 110-*e* may receive a voice call-back from eCall server 205-*e* (or from the PSAP 210-*e* if the eCall server 205-*e* has communicated information received in the first signaling message at step 332 to the PSAP 210-*e* at step 348), for establishing a CS connection with the eCall server 205-*e* (or PSAP 210-*e*). The voice call-back may be based at least in part on a CBN or other address or identity for terminal 110-*e* provided by the terminal 110-*e* (e.g., in the first signaling message at step 332), a CBN (or other address or identity) for terminal 110-*e* stored at the eCall server 205-*e* as part of a subscription information for terminal 110-*e*, a CBN for terminal 110-*e* stored in a database accessible to the eCall server 205-*e* or the PSAP 210-*e*, or a CBN stored at the PSAP 210-*e*. The CBN may also be inferred or looked up by the eCall server 205-*e* or PSAP 210-*e* based at least in part on identifying information associated with the terminal 110-*e*, which identifying information may be received as part of step 332 or may otherwise be received or inferred from the terminal's attempt to establish a PS connection at step 332. The CS connection may be established for voice and/or media data.

At step 346, and when the telematics data (e.g., MSD or VEDS) is not received by the eCall server at step 332, the terminal 110-*e* may optionally transmit the telematics data to the eCall server 205-*e* or PSAP 210-*e* using a communication session over the CS connection established at step 344. The telematics data may be transmitted using a sequence of DTMF tones by terminal 110-*e* (as described below for the fallback mechanism) or by using an in-band modem to encode the data as a sequence of audio signals. In some cases, the telematics data may be transmitted in response to a request received from the eCall server 205-*e* or PSAP 210-*e* (e.g., where the request may be sent using a sequence of DTMF tones or by using an in-band modem to encode the request as a sequence of audio signals). In some cases, the telematics data may be transmitted using the fallback mechanism described herein. In some embodiments, the telematics data may only be transmitted by terminal 110-*e* to the eCall server 205-*e* (or PSAP 210-*e*) at step 346 if the voice call-back received from eCall server 205-*e* (or from PSAP 210-*e*) at step 344 enables terminal 110-*e* to verify that the voice call-back at step 344 was sent by eCall server 205-*e* (or by PSAP 210-*e*) and not by some other entity. As an example, the voice call-back at step 344 may include an identity (e.g., a CBN) of eCall server 205-*e* that terminal 110-*e* may compare to a pre-configured identity for eCall server 205-*e* (or an identity for eCall server 205-*e* received in the SIP STATUS message at step 334) to verify the voice call-back at step 344 was sent by eCall server 205-*e* if the two identities match. As another example of verification, the voice call-back may include an emergency indication that may imply to terminal 110-*e* that the voice call-back at step 344 was sent by a PSAP such as PSAP 210-*e*.

Figure 3D:
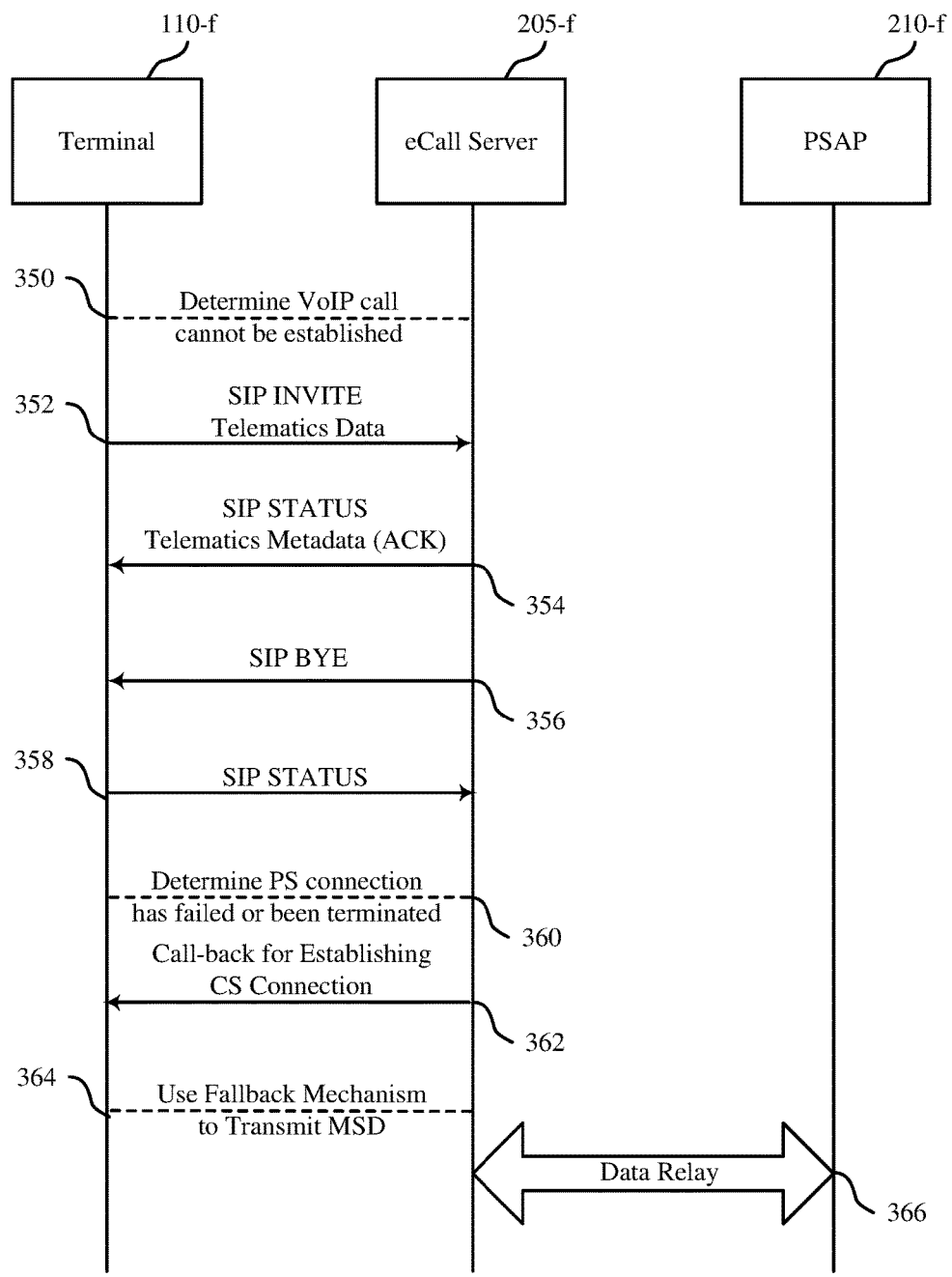
FIG. 3D illustrates an example of a process flow for emergency call Over-the-Top in accordance with various aspects of the present disclosure.

FIG. 3D depicts process flow 304 for eCall Over-the-Top (OTT eCall) in accordance with various aspects of the present disclosure. Process flow 304 may include a terminal 110-*f*, an eCall server 205-*f*, and a central service (or PSAP) 210-*f*, which may correspond, respectively, to a terminal 110, an eCall server 150 or 205 and a central service 160 or 210 described with reference to FIGS. 1-3C. In certain examples, PSAP 210-*f* may be implemented by one or more servers. The eCall server 205-*f* may serve as an intermediary for information exchanges between terminal 110-*f* and PSAP 210-*f*—e.g., eCall server 205-*f* may handle the eCall from terminal 110-*f* and forward information from terminal 110-*f* to PSAP 210-*f* (and/or vice versa). Process flow 304 may facilitate communication sessions to both exchange telematics data and telematics metadata and communicate verbal indications of telematics information. Process flow 304 may employ a communication session, which session may be established over a PS connection or a CS connection to carry telematics data and telematics metadata. In other examples, other communication sessions may be used.

At step 350, terminal 110-*f* may determine that a VoIP call between terminal 110-*f* and eCall server 205-*f* cannot be established (e.g., because a PS connection available for establishing the VoIP call does not support a threshold quality (e.g., QoS, packet loss, latency, or bandwidth) for the VoIP call). In some examples, the terminal 110-*f* may determine that the VoIP call cannot be established because of a prior VoIP call failure, or the size of a minimum transmission unit (MTU) being below a threshold, or poor latency in a prior transmission, or knowledge or an indication of a network's quality, or an indication that a network is not voice-capable.

At step 352, terminal 110-*f* may initiate a PS connection with eCall server 205-*f*. When initiating the PS connection, the terminal 110-*f* may transmit a first signaling message (e.g., a SIP INVITE message) to the eCall server 205-*f*. In certain examples, the SIP INVITE message may be an example of a modified SIP request message which carries both session data and telematics data (e.g., an MSD or VEDS). The SIP INVITE message may simultaneously invite eCall server 205-*f* to a proposed communication session having a proposed set of parameters and convey a CBN and/or other identity for terminal 110-*f*, and/or a set of telematics data (e.g., an MSD or VEDS), from terminal 110-*f* to eCall server 205-*f*. Because of the determination at step 350, the session information may not include a request (e.g., in a Session Description Protocol (SDP) block) to establish one or more media components (e.g., a VoIP call, text, video, etc.). In certain examples, terminal 110-*f* may be associated with a vehicle and may transmit the SIP INVITE message to eCall server 205-*f* in response to a detected condition at the vehicle or a manual request for an emergency call by an occupant of the vehicle. In certain examples, prior to transmitting the SIP INVITE message at step 352, terminal 110-*f* may obtain communication services from a serving network (not shown in FIG. 3D) such as visited network 102, EPC 220-*a* or serving EPC 220-*b*.

At step 354, eCall server 205-*f* may attempt to respond to the SIP INVITE message by transmitting a second signaling message (e.g., a SIP STATUS message, such as a SIP 200 OK message) to terminal 110-*f*. The second signaling message may simultaneously agree to the proposed communication session and convey telematics metadata to terminal 110-*f* acknowledging receipt of the telematics data by eCall server 205-*f*.

At step 356, the PS connection may optionally be terminated by eCall server 205-*f* transmitting a termination message (e.g., a SIP BYE message) to terminal 110-*f*. Terminal 110-*f* may optionally confirm the termination of the PS connection at step 358 by transmitting a response message (e.g., a SIP 200 OK message or other SIP STATUS message) to eCall server 205-*f*. In other examples, terminal 110-*f* may initiate termination of the PS connection, and eCall server 205-*f* may transmit the response message to terminal 110-*f*. In other examples, the PS connection may fail.

At step 360, the terminal 110-*f* may determine that the PS connection has failed or been terminated (e.g., because the PS connection was initiated without media data, or because the PS connection does not support a threshold quality such as bandwidth).

At step 362, the terminal 110-*f* may receive a voice call-back from eCall server 205-*f* (or from the PSAP 210-*f* if the eCall server 205-*f* has communicated information received in the first signaling message at step 352 to the PSAP 210-*f* at step 366), for establishing a CS connection with the eCall server 205-*f* (or PSAP 210-*f*). The voice call-back may be based at least in part on a CBN or other identity for terminal 110-*f* provided by the terminal 110-*f* (e.g., in the first signaling message at step 352), a CBN for terminal 110-*f* stored at the eCall server 205-*f*, a CBN for terminal 110-*f* stored in a database accessible to the eCall server 205-*f* or the PSAP 210-*f*, or a CBN for terminal 110-*f* stored at the PSAP 210-*f*. The CBN may also be inferred or looked up by the eCall server 205-*f* or PSAP 210-*f* based at least in part on identifying information associated with the terminal 110-*f*, which identifying information may be received or inferred from the terminal's attempt to establish a PS connection at step 352. The CS connection may be established for voice or media data (e.g., text).

At step 364, and when the telematics data (e.g., MSD or VEDS) is not received by the eCall server at step 352, the terminal 110-*f* may optionally transmit the telematics data to the eCall server 205-*f* or PSAP 210-*f* using a communication session over the CS connection. The telematics data may be transmitted using a sequence of DTMF tones by terminal 110-*f* (as described below for the fallback mechanism) or by using an in-band modem to encode the data as a sequence of audio signals. In some cases, the telematics data may be transmitted in response to a request received from the eCall server 205-*f* or PSAP 210-*f* (e.g., where the request may be sent using a sequence of DTMF tones or by using an in-band modem to encode the request as a sequence of audio signals). In some cases, the telematics data may be transmitted using the fallback mechanism described herein. In some embodiments, the telematics data may only be transmitted by terminal 110-*f* to the eCall server 205-*f* (or PSAP 210-*f*) at step 364 if the voice call-back received from eCall server 205-*f* (or from PSAP 210-*f*) at step 362 enables terminal 110-*f* to verify that the voice call-back at step 362 was sent by eCall server 205-*f* (or by PSAP 210-*f*) and not by some other entity. As an example, the voice call-back at step 362 may include an identity (e.g., a CBN) of eCall server 205-*f* that terminal 110-*f* may compare to a preconfigured identity for eCall server 205-*f* (or an identity for eCall server 205-*f* received in the SIP STATUS message at step 354) to verify the voice call-back at step 362 was sent by eCall server 205-*f* if the two identities match. As another example of verification, the voice call-back may include an emergency indication that may imply to terminal 110-*f* that the voice call-back at step 362 was sent by a PSAP such as PSAP 210-*f*.

Figure 3E:
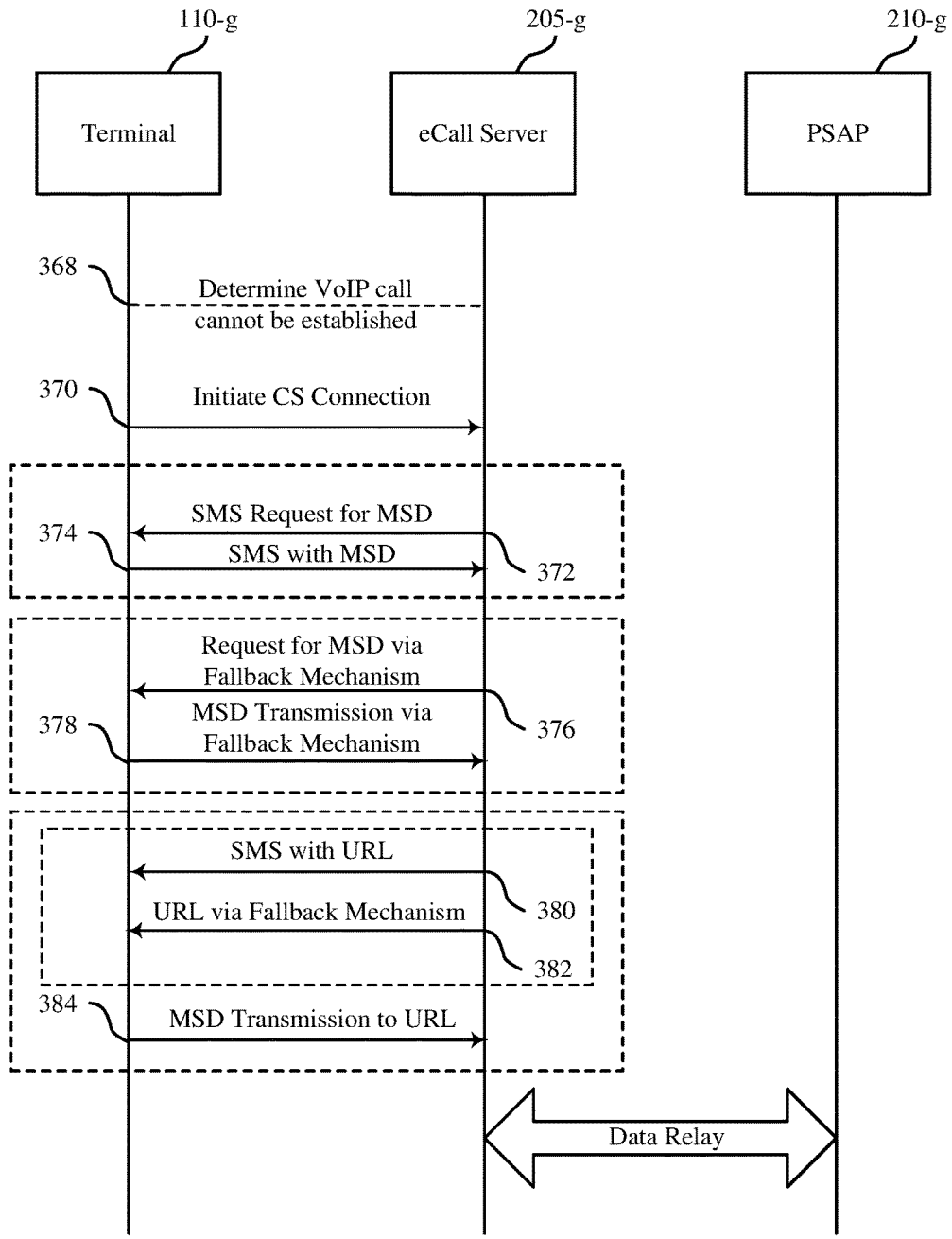
FIG. 3E illustrates an example of a process flow for emergency call Over-the-Top in accordance with various aspects of the present disclosure.

FIG. 3E depicts process flow 305 for eCall Over-the-Top (OTT eCall) in accordance with various aspects of the present disclosure. Process flow 305 may include a terminal 110-*g*, an eCall server 205-*g*, and a central service (or PSAP) 210-*g*, which may correspond, respectively, to a terminal 110, an eCall server 150 or 205 and a central service 160 or 210 described with reference to FIGS. 1-3D. In certain examples, PSAP 210-*g* may be implemented by one or more servers. The eCall server 205-*g* may serve as an intermediary for information exchanges between terminal 110-*g* and PSAP 210-*g*—e.g., eCall server 205-*g* may handle the eCall from terminal 110-*g* and forward information from terminal 110-*g* to PSAP 210-*g* (and/or vice versa). Process flow 305 may facilitate communication sessions to both exchange telematics data and telematics metadata and communicate verbal indications of telematics information. Process flow 305 may employ a communication session, which session may be established over a PS connection or a CS connection to carry telematics data and telematics metadata. In other examples, other communication sessions may be used.

At step 368, terminal 110-*g* may determine that a VoIP call or PS connection between terminal 110-*g* and eCall server 205-*g* cannot be established (e.g., because a PS connection available for establishing the VoIP call does not support a threshold quality (e.g., QoS, packet loss, latency, or bandwidth) for the VoIP call).

At step 370, terminal 110-*g* may initiate a CS connection with eCall server 205-*g*. When initiating the CS connection, the terminal 110-*g* (or a serving network switch, proxy or server acting on behalf of terminal 110-*g*) may transmit a first signaling message to the eCall server 205-*g*. The first signaling message may include a set of session information related to a communication session over the CS connection. In certain examples, terminal 110-*g* may be associated with a vehicle and may transmit the first signaling message to eCall server 205-*g* in response to a detected condition at the vehicle or a manual request for an emergency call by an occupant of the vehicle. In certain examples, prior to transmitting the first signaling message at step 370, terminal 110-*g* may obtain communication services from a serving network (not shown in FIG. 3E) such as visited network 102, EPC 220-*a* or serving EPC 220-*b*.

Following step 370, the terminal 110-*g* may transfer telematics data (e.g., MSD or VEDS) to the eCall server 205-*g* in various alternative ways—e.g., as described further down in relation to steps 372 to 384. The telematics data may be transmitted using a sequence of DTMF tones by terminal 110-*g* (as described below for the fallback mechanism) or by using an in-band modem to encode the data as a sequence of audio signals. In one example, the terminal 110-*g* may optionally receive an in-band eCall request from the eCall server 205-*g*, over the CS connection, to pull the telematics data from the terminal 110-*g*. The terminal 110-*g* may transmit the telematics data (e.g., MSD or VEDS) to the eCall server 205-*g* in-band over the CS connection (e.g., using an in-band modem to transmit the telematics data within a voice call path for the CS connection). In another example, the telematics data may be transmitted by terminal 110-*g* in response to some other request received from the eCall server 205-*g* or PSAP 210-*g* (e.g., where the request may be sent using a sequence of DTMF tones or by using an in-band modem to encode the request as a sequence of audio signals).

For one alternative way of transmitting the telematics data, at step 372, the eCall server 205-*g* may transmit to the terminal 110-*g* a Short Message Service (SMS) message requesting the telematics data (referred to as MSD in FIG. 3E). At step 374 (in response to the SMS message or proactively), the terminal 110-*g* may optionally transmit the MSD to the eCall server 205-*g*, over the CS connection, using SMS.

For another alternative way of transmitting the telematics data, at step 376, the eCall server 205-*g* may transmit to the terminal 110-*g*, over the CS connection initiated at step 370, a request for the telematics data (referred to as MSD in FIG. 3E). The request may be transmitted using the fallback mechanism described herein. At step 378 (in response to the request or proactively), the terminal 110-*g* may optionally transmit the MSD to the eCall server 205-*g*, over the CS connection, using the fallback mechanism.

For yet another alternative way of transmitting the telematics data, at step 380 or 382, the eCall server 205-g may optionally transmit a Universal Resource Locator (URL) to the terminal 110-g over the CS connection. The URL may be transmitted, for example, in an SMS message (at step 380) or via the fallback mechanism described herein (at step 382). Alternatively, the terminal 110-g may determine the URL from its configuration or from a discovery mechanism. At step 384, the terminal 110-g may optionally transmit the telematics data (referred to as MSD in FIG. 3E) to an entity identified by the URL. This entity may correspond to the eCall server 205-g (e.g., if the URL is an address for the eCall server 205-g) or PSAP 210-g (e.g., if the URL is an address for the PSAP 210-g). The telematics data may be transmitted using the Hypertext Transfer Protocol (HTTP) or another IP based protocol.

In another alternative, the eCall server 205-g may optionally send a SIP message (e.g., an INVITE message) to the terminal 110-g, in parallel with or prior to initiating the CS connection. The SIP message may be used to request (e.g., pull) the telematics from the terminal 110-g. In response to receiving the SIP message or proactively, the terminal 110-g may transmit the telematics to the eCall server 205-g using SIP.

In some embodiments, the telematics data may only be transmitted by terminal 110-g to the eCall server 205-g (or PSAP 210-g) at any of steps 374, 384 or using SIP if a corresponding request for telematics data at step 372, 380 or using SIP enables terminal 110-g to verify that the request was sent by eCall server 205-g (or by PSAP 210-g) and not by some other entity. As an example, the request for telematics data may include an address of eCall server 205-g that terminal 110-g may compare to a pre-configured address for eCall server 205-g to verify the request was sent by eCall server 205-g if the two addresses match. The address may be an SMS source address in the case of an SMS request at either step 372 or step 380 or may be a public user SIP identity in the case of a SIP request. In the case of telematics data transfer at step 378 in response to a request at step 376 or at step 384 in response to a request at step 382, terminal 110-g may know that the request comes from eCall server 205-g due to being sent using the CS connection initiated by terminal 110-g to eCall server 205-g at step 370.

In some cases, a PS connection established in accordance with the process flow 303 or 304, described with reference to FIG. 3C or 3D, may be so poor that the eCall server 205 cannot receive the telematics data (e.g. MSD or VEDS) over the PS connection. In other cases, a PS connection may not be established (e.g., as described with reference to FIG. 3E and the process flow 305). In any of these cases, or others, the telematics data (e.g., MSD or VEDS) may be transferred from the terminal 110 to the eCall server 205 using a "fallback mechanism." The fallback mechanism may include a framework for transmitting the telematics data over a CS connection. In some examples, the fallback mechanism may include the transmission of dual-tone multi-frequency (DTMF) tones between the terminal 110 and the eCall server 205. The use of DTMF tones can avoid the need to use an in-band modem. In some embodiments, a first sequence of DTMF tones (or digits) may be transmitted by the eCall server 205 to request the telematics data from the terminal 110, and a second sequence of DTMF tones may be transmitted by the terminal 110 to transmit the telematics data to the eCall server 205. Optionally, a secret key pair may be used to cipher and validate the telematics data and authenticate the terminal 110 with the eCall server 205 (e.g., via a keyed-hash message authentication code (HMAC)).

In scenarios in which a PS connection is not established, or the established PS connection is so poor that a SIP INVITE cannot be received by the eCall server 205, the eCall server 205 may match an incoming CS call (for establishing a CS connection) to an account's CBN to recognize that the call is from an eCall capable terminal 110, thereby enabling telematics data to be requested and received from the terminal 110. Alternatively, the terminal 110 may transmit the CBN using a sequence of DTMF tones.

Process flows 301-305 as described previously in association with FIGS. 3A-3E provide different examples of supporting and implementing an OTT eCall between a terminal 110, an eCall server 205 and, in some cases, a PSAP 210. Common aspects and optional additional aspects of these process flows are now described. A terminal 110 (which may be an example of a wireless device) and may correspond to any of terminals 110 in FIGS. 1-3 may transmit a first signaling message to an eCall server 205, which may be an example of an OTT eCall server, a third party emergency call server and/or may correspond to any of eCall servers 150 and 205 in FIGS. 1-3. The transmission may use or establish a communication session and the first signaling message may include a set of session information related to the communication session and a set of telematics data for the terminal 110. The first signaling message may correspond to any of steps 306, 322, 332, 352 or 370. In some cases, the terminal 110 may then receive a second signaling message using the communication session, the second signaling message including metadata based at least in part on a reception status or a content of the set of telematics data transmitted in the first signaling message. The second signaling message may correspond to any of steps 308, 324, 334 or 354. In order to send the first message, the terminal 110 may identify an address of the eCall server 205 or a home network call server associated with the eCall server 205 based on a discovery process. The discovery process may be based on a domain name service (DNS) query, a location-to-service translation (LoST) query, and/or on data configured in the terminal 110. In some cases (e.g. as at steps 336-340, 342, 350 or 368), the terminal 110 may determine that a media (e.g., audio such as VoIP) stream to the eCall server 205 cannot be established or does not support a threshold bandwidth (e.g., a bandwidth above the threshold bandwidth), or threshold QoS (e.g., a QoS above the threshold QoS), or threshold packet loss (e.g., a packet loss below the threshold packet loss), or threshold latency (e.g., a latency below the threshold latency). The terminal 110 may then instigate, or cause eCall server 205 to instigate, a circuit switched (CS) voice call-back from the eCall server 205 or a public safety answering point (PSAP) 210 to the terminal 110—e.g., as at step 344 or 362. For example, terminal 110 may send a SIP INVITE that does not contain any media parameters (e.g., as at step 352), and eCall server 205 may treat the SIP INVITE as a request to instigate a CS voice call-back (e.g., as at step 362). In some examples, the first signaling message includes a call-back number (CBN) for the terminal 110, and the CS voice call-back may be based on the call-back number. In some examples, the CS voice call-back is based on a call-back number stored with the eCall server 205.

In some cases, the terminal 110 may establish an IP connection to the eCall server 205 (e.g., as at step 306, 322, 332 or 352) and transmitting the first signaling message may be based on the IP connection. The term "IP connection" is a general one and includes communication using IP with a "connectionless" protocol as well as a connection-oriented protocol. In some examples, the eCall server 205 is a SIP Proxy. In some examples, the eCall server 205 is managed by a home network operator for the terminal 110. In still other examples, the eCall server 205 is part of a home network operator IMS subsystem. The IP connection may, for instance, be based on at least one of an Internet Protocol (IP), a transmission control protocol (TCP), a user datagram protocol (UDP), a transport layer security (TLS) protocol or an Internet protocol security (IPsec) protocol. The terminal 110 may establish or attempt to establish a media path from the terminal 110 to the eCall server 205 based on the IP connection (e.g., as at step 310, 330 or 336). In some examples, the first signaling message includes a request for voice media, a callback number and a standardized set of telematics data, such as a minimum set of data (MSD). The terminal 110 may transfer an identity of the terminal 110 to the eCall server 205. The terminal 110 may then authenticate the identity to the eCall server 205.

The terminal 110 may receive an authentication request from the eCall server 205 (not shown in FIGS. 3A-3E). The terminal 110 may transmit an authentication response to the eCall server 205 (not shown in FIGS. 3A-3E). In some examples, the terminal 110 may be a wireless device, such as an IVS. Additionally or alternatively, the eCall server 205 may be configured to relay communication from the terminal 110 to a PSAP 210. In some examples, receiving the second signaling message includes receiving an indication of whether the set of telematics data was received or satisfactorily received at the eCall server 205 (e.g., whether the set of telematics data was received, partially received or badly formed, or missing), the indication including the metadata based on the reception status or the content of the set of telematics data. Or, receiving the second signaling message may include receiving a request with respect to the set of telematics data, the request including the metadata based on the reception status or the content of the set of telematics data. In some examples, the request includes a request for the terminal 110 to retransmit the set of telematics data, a request to transmit an updated version of telematics data (e.g., a set with more current values, or an expanded or updated version of the set), or a request to transmit a different set of telematics data. In some examples, the second signaling message includes a second set of session information related to the communication session.

The terminal 110 may determine from a header of the second signaling message that a portion of a body of the second signaling message includes the metadata. In some examples, the set of session information includes at least one of a request to initiate the communication session or information associated with the communication session. The terminal 110 may transmit a third signaling message to the eCall server 205 over the communication session (e.g., as at step 314), the third signaling message including a response to the request received with respect to the set of telematics data.

The eCall server 205 may receive a first signaling message from a terminal 110 (e.g., as at step 306, 322, 332 or 352) using a communication session, the first signaling message including a set of session information related to a communication session and a set of telematics data for the terminal 110. The eCall server 205 may relay a portion of the first signaling message to a PSAP 210. The eCall server 205 may transmit a second signaling message to the terminal 110 using the communication session (e.g., as at step 308, 324, 334 or 354), the second signaling message including metadata based on a reception status or a content of the set of telematics data transmitted in the first signaling message.

The eCall server 205 may generate a verbal message based on the first signaling message. In some examples relaying at least a portion of the first signaling message to the PSAP 210 includes sending the verbal message to the PSAP 210. The eCall server 205 may receive a response from the PSAP 210 and relay the response to the terminal 110. The eCall server 205 may authenticate the terminal 110. The eCall server 205 may send an authentication indication to the PSAP 210. In some examples the eCall server 205 may be a SIP proxy.

In some embodiments of the process flows 301, 302, 303, 304 and 305, an eCall server 205 may need to authenticate the identity of the terminal 110. The identity of the terminal 110 may comprise an IMSI, IMEI, MSISDN or public SIP user ID or some other identity and may be conveyed in the first signaling message (e.g. the SIP INVITE sent at step 306 or step 322) sent by terminal 110 to the eCall server 205. The eCall server 205 may perform the authentication in a variety of manners. In one embodiment, the eCall server may return a SIP error message to the terminal 110 and include a request for the terminal 110 to resend the first signaling message together with authentication data. The SIP error message may include data and/or instructions related to the authentication data that is required—e.g. may contain a random value (or nonce) that the terminal 110 needs to transform into authentication data using a secret key configured in the terminal 110 or in a SIM or USIM card for the terminal 110. This embodiment may be supported by the SIP protocol and/or may be similar to or the same as authentication used to register a terminal in a home network for 3GPP IMS usage. In another embodiment, the eCall server may perform authentication using some other protocol—e.g. HTTP such as using the HTTP digest method defined in IETF RFC 2617 or Transport Layer Security (TLS).

In some embodiments, the signaling depicted in the process flow 301 and/or the signaling depicted in the process flow 302 and/or the authentication described above may be the same as or similar to process flows performed between a terminal 110 and either an eCall server 205 or a PSAP 210 in the case that a terminal 110 instigates an NG eCall to either the eCall server 205 or the PSAP 210. In these embodiments, impacts to the terminal 110 and to either the eCall server 205 or the PSAP 210 to support an NG eCall may be similar to or the same as impacts to these entities to support an OTT eCall.

In some cases (e.g., as in process flows 303, 304 and 305), a terminal 110 may determine that a VoIP call between the terminal 110 and an eCall server 205 cannot be established, that a PS connection with the eCall server 205 has failed, that the PS connection does not support a threshold quality or bandwidth for a VoIP call (e.g., that the PS connection lacks a threshold quality (e.g., QoS, packet loss, latency, or bandwidth), or that the PS connection has been terminated (e.g., because the PS connection was initiated without media data, or because the PS connection does not support the threshold quality or bandwidth). In these cases, the terminal 110 may establish a CS connection between the terminal 110 and the eCall server 205 or a PSAP 210. The CS connection may be established for voice or media data. In scenarios in which the terminal 110 is able to establish a prior PS connection with the eCall server 205, but a VoIP call cannot be established between the terminal 110 and the eCall server 205, or the PS connection fails, or does not support a threshold quality or bandwidth for a VoIP call, or has been terminated, the CS connection between the terminal 110 and the eCall server 205 may be initiated by a voice call-back from the eCall server 205 (or by a voice call-back from the PSAP 210 with which the eCall server 205 communicates). In these scenarios (e.g., as in process flows 303 and 304), the eCall server 205 may initiate the voice call-back to the terminal 110 using an address or identity for the terminal 110 (e.g., a telephone number) to route the voice call-back to the correct terminal 110. The address or identity for the terminal 110 may have been provided by terminal 110 during or after establishment of the prior PS connection with the eCall server 205 and may then be a CBN or may have been obtained by the eCall server 205 from subscription information for terminal 110 that may be configured in the eCall server 205. In the case of obtaining the address or identity for the terminal 110 from subscription information for terminal 205, the terminal 110 may provide some other address or identity for the terminal 110 (e.g., a public user ID or a private user ID) during or after establishment of the prior PS connection with the eCall server 205 that may be used by the eCall server 205 to identify terminal 110 and obtain the subscription information for terminal 110 configured in the eCall server 205.

In scenarios in which the terminal 110 is unable to establish a prior PS connection with the eCall server 205, the CS connection between the terminal 110 and the eCall server 205 may be initiated by the terminal 110 (e.g., as in process flow 305). In certain examples, the terminal 110 may transmit a first signaling message to the eCall server 205. The first signaling message may include a set of session information related to a communication session over the CS connection, an MSD, or a set of telematics data for the terminal 110.

Figure 4:
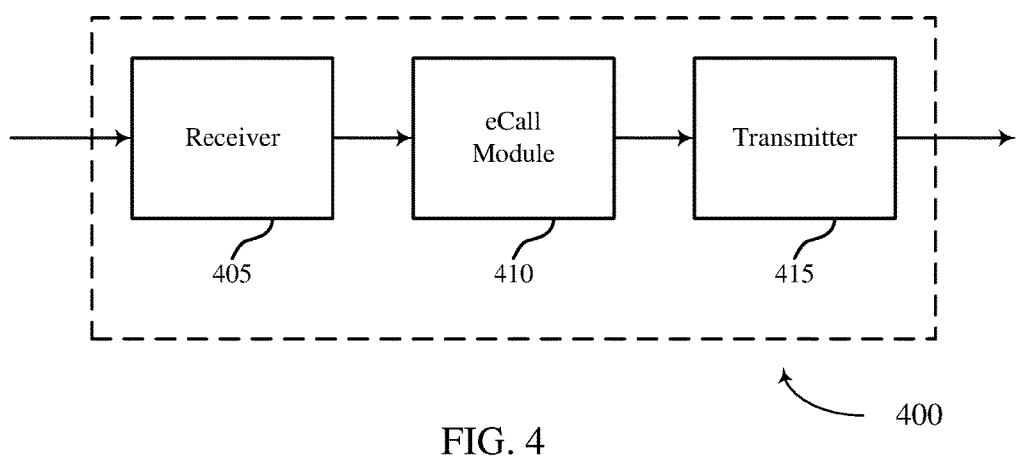
FIG. 4 shows a block diagram of a wireless device configured for emergency call Over-the-Top in accordance with various aspects of the present disclosure.

FIG. 4 shows a block diagram of a wireless device 400 configured for eCall Over-the-Top (eCall OTT), in accordance with various aspects of the present disclosure. Wireless device 400 may be an example of aspects of a terminal 110 described with reference to FIGS. 1-3. Wireless device 400 may include a receiver 405, an eCall module 410, and/or a transmitter 415. Wireless device 400 may also include a processor (not shown in FIG. 4). Each of these components may be in communication with each other. In some examples, the wireless device 400 may be an IVS.

The components of wireless device 400 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 405 may receive information such as packets, user data, media (e.g., voice, text, video), control information associated with various information channels (e.g., control channels, data channels, and information related to eCall Over-the-Top, etc.). Received information may be passed on to the eCall module 410, and to other components of wireless device 400. In some embodiments, the receiver 405 may receive information over a PS connection or a CS connection. In some cases, the receiver 405 may also enable collection of telematics data. The receiver 405 may include a single antenna, or it may include a plurality of antennas.

The eCall module 410 may transmit a first signaling message to a third party emergency call server (eCall server) such as eCall server 205 using a communication session, the first signaling message including a set of session information related to a communication session and a set of telematics data for the wireless device 400. The eCall module 410 may also receive a second signaling message using the communication session, the second signaling message including metadata based on a reception status or a content of the set of telematics data transmitted in the first signaling message.

The transmitter 415 may transmit signals received from other components of wireless device 400 (e.g. eCall module 410). In some embodiments, the transmitter 415 may transmit information over a PS connection or a CS connection. In some embodiments, the transmitter 415 may be collocated with the receiver 405 in a transceiver module. The transmitter 415 may include a single antenna, or it may include a plurality of antennas. The antenna or antennas may be shared with receiver 405.

Figure 5:
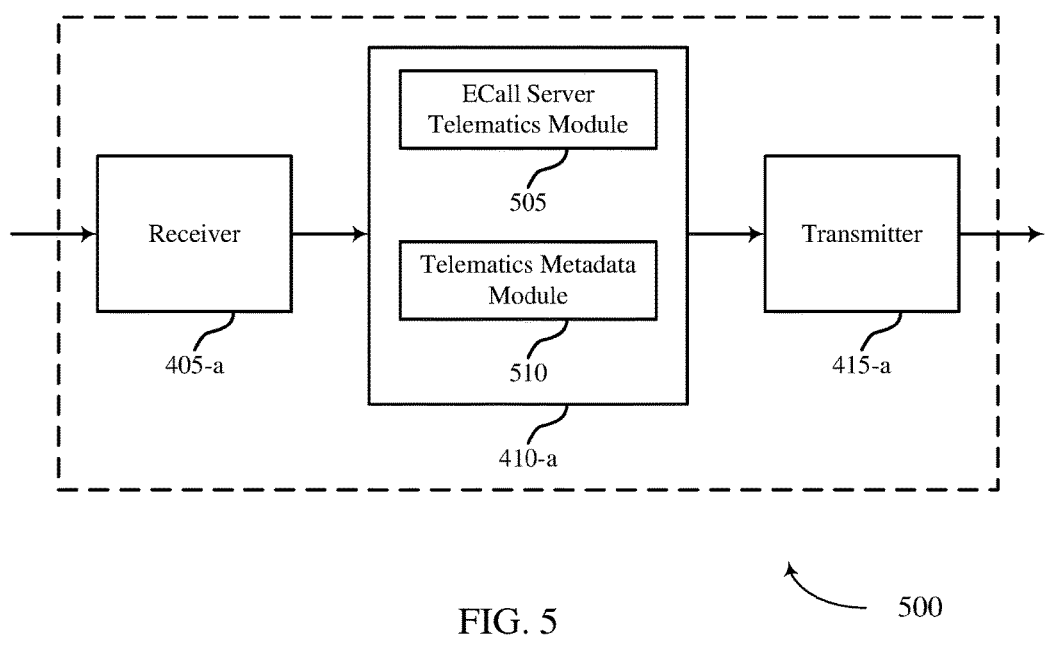
FIG. 5 shows a block diagram of a wireless device configured for emergency call Over-the-Top in accordance with various aspects of the present disclosure.

FIG. 5 shows a block diagram of a wireless device 500 configured for eCall Over-the-Top, in accordance with various aspects of the present disclosure. Wireless device 500 may be an example of aspects of the wireless device 400 or a terminal 110 described with reference to FIGS. 1-4. Wireless device 500 may include a receiver 405-*a*, an eCall module 410-*a*, or a transmitter 415-*a*. Wireless device 500 may also include a processor (not shown in FIG. 5). Each of these components may be in communication with each other. The eCall module 410-*a* may include an eCall server telematics module 505 and a telematics metadata module 510. In some examples, the wireless device 500 may be an IVS.

The components of wireless device 500 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 405-*a* may receive information which may be passed to eCall module 410-*a*, and to other components of wireless device 500. The eCall module 410-*a* may perform the operations described above with reference to FIG. 4. The transmitter 415-*a* may transmit signals received from other components of wireless device 500.

The eCall server telematics module 505 may transmit a first signaling message to a third party emergency call server (eCall server) such as eCall server 205 using a communication session, the first signaling message including a set of session information related to a communication session and a set of telematics data (e.g., an MSD) for the wireless device 500, as described above with reference to FIGS. 2-3. The first signaling message may also include a request for media (e.g., voice media) or a callback number. In some examples, the third party emergency call server may be configured to relay communication from the wireless device to a PSAP. In some examples, the set of session information may include at least one of a request to initiate the communication session or information associated with the communication session. The eCall server telematics module 505 may also generate a header for the first signaling message based on the communication session, the header including an indication that a portion of a body of the first signaling message includes the set of telematics data. In some examples, the communication session includes at least one of Session Initiation Protocol (SIP), Extensible Messaging and Presence Protocol (XMPP), web real-time communication (WebRTC), Google Talk, or Skype. In some examples, the communication session includes a Voice over Internet Protocol (VoIP) call. In some examples, the communication session carries one or more of voice, character-at-a-time text, message-at-a-time text, video, and text messaging using at least one of streaming or non-streaming media. In some examples, the communication session comprises a signaling session or a signaling channel. In some examples, the communication session comprises a media session or a media channel. When some or all of the information included in the first signaling message cannot be transmitted over a PS connection, some of the information included in the first signaling message may be transmitted over a CS connection.

The telematics metadata module 510 may receive a second signaling message using the communication session, the second signaling message including metadata based on a reception status or a content of the set of telematics data transmitted in the first signaling message, as described above with reference to FIGS. 2-3. In some examples, receiving the second signaling message over the communication session includes receiving an indication of whether the set of telematics data was received or satisfactorily received at the third party emergency call server, the indication including the metadata based on the reception status or the content of the set of telematics data. In some examples, receiving the second signaling message over the communication session further includes receiving a request with respect to the set of telematics data, the request including the metadata based on the reception status or the content of the set of telematics data. In some examples, the request includes at least one of a request to retransmit the set of telematics data, a request to transmit an updated version of telematics data (e.g., a set with more current values, or an expanded or updated version of the set), or a request to transmit a different set of telematics data. In some examples, the second signaling message includes a second set of session information related to the communication session.

The telematics metadata module 510 may also determine from a header of the second signaling message that a portion of a body of the second signaling message includes the metadata. The telematics metadata module 510 may also transmit a third signaling message from the wireless device to the third party emergency call server over the communication session, the third signaling message including a response to the request received with respect to the set of telematics data. In some examples, receiving the second signaling message over the communication session further includes receiving an instruction to take at least one action based on the reception status or the content of the set of telematics data, the instruction including the metadata based on the reception status or the content of the set of telematics data. In some examples, the at least one action includes at least one of gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking a door, activating a horn of a vehicle, activating an externally audible sound, activating lights of a vehicle, activating flashers of a vehicle, actuating a power window, playing a recorded message, rendering media, or displaying a text message.

Figure 6:
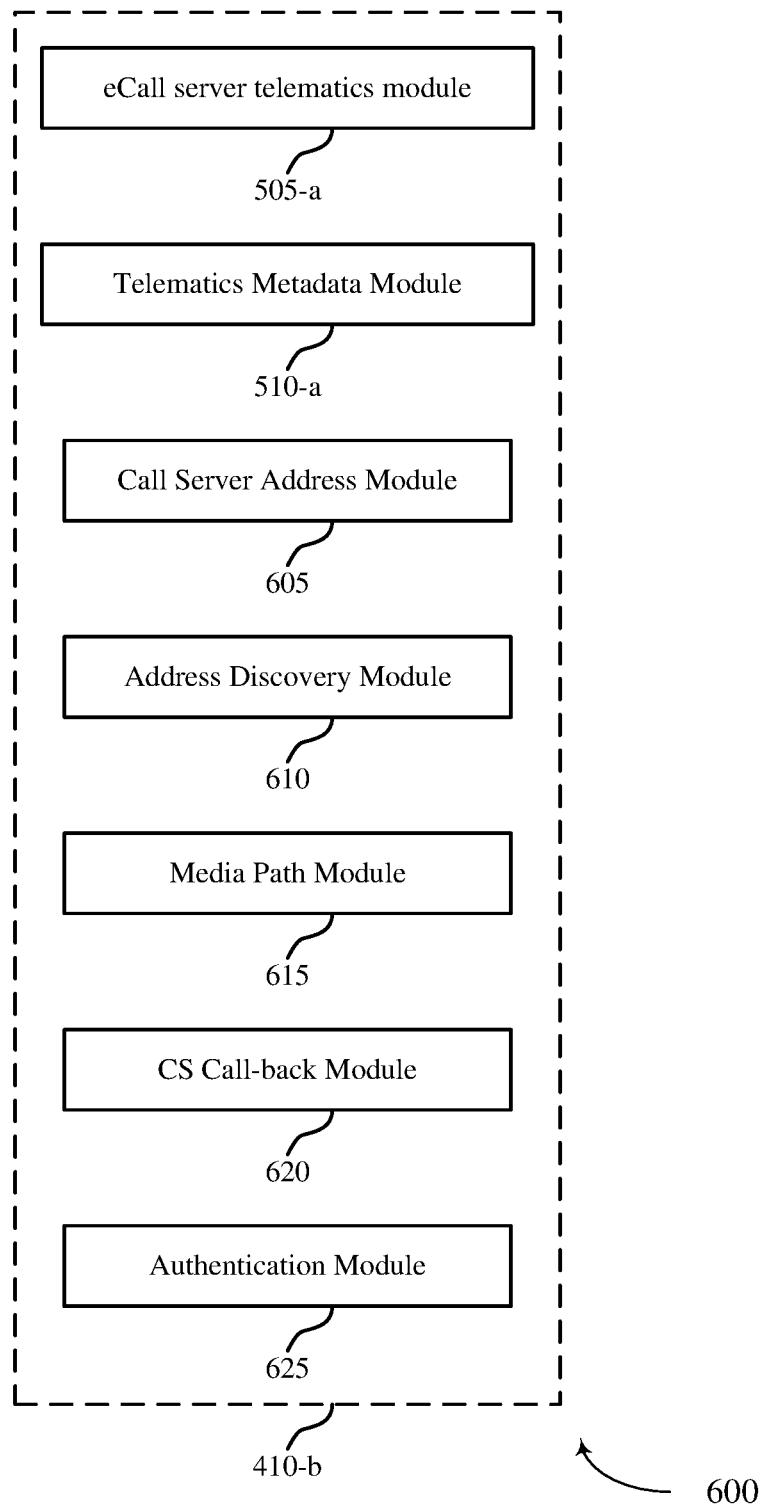
FIG. 6 shows a block diagram of an eCall module configured for emergency call Over-the-Top in accordance with various aspects of the present disclosure.

FIG. 6 shows a block diagram 600 of an eCall module 410-b which may be a component of the wireless device 400 or the wireless device 500 for eCall Over-the-Top, in accordance with various aspects of the present disclosure. The eCall module 410-b may be an example of aspects of an eCall module 410 described with reference to FIGS. 4-5. The eCall module 410-b may include an eCall server telematics module 505-a and a telematics metadata module 510-a. Each of these modules may perform the functions described above with reference to FIG. 5. The eCall module 410-b may also include a call server address module 605, an address discovery module 610, a media path module 615, a CS call-back module 620, and an authentication module 625.

The components of the eCall module 410-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The call server address module 605 may identify or determine an address of a third party emergency call server (e.g., eCall server 205) or a home network call server associated with the third party emergency call server based on a discovery process as described above with reference to FIGS. 2-3. In some examples, the discovery process may be based on data configured in the wireless device 400 or 500.

The address discovery module 610 may be configured such that the discovery process employed by all server address module 605 may be based on a domain name service (DNS) query (e.g., a service (SRV) query; or via a DDDS of DNS, which uses NAPTR records), as described above with reference to FIGS. 2-3. In some examples, the discovery process may be based on a location-to-service translation (LoST) query.

The media path module 615 may determine that a media path between the wireless device 400 or 500 and a third party emergency call server (e.g., eCall server 205) cannot be established or does not support a threshold quality (e.g., QoS, packet loss, latency, or bandwidth) as described above with reference to FIGS. 2-3. The media path module 615 may also establish a CS connection for voice or media data based on the determination.

The CS call-back module 620 may receive a CS voice call-back from a third party emergency call server (e.g., eCall server 205) or a public safety answering point (e.g., PSAP 210) as described above with reference to FIGS. 2-3. In some examples, the first signaling message includes a call-back number for the wireless device 400 or 500 and wherein the CS voice call-back may be based on the call-back number. In some examples, the CS voice call-back may be based on a call-back number stored with the third party emergency call server.

The authentication module 625 may transfer an identity of the wireless device 400 or 500 to an eCall server (e.g., eCall server) as described above with reference to FIGS. 2-3. The authentication module 625 may also authenticate the identity to the eCall server. The authentication module 625 may also receive an authentication request from the eCall server. The authentication module 625 may also transmit an authentication response to the eCall server.

Figure 7:
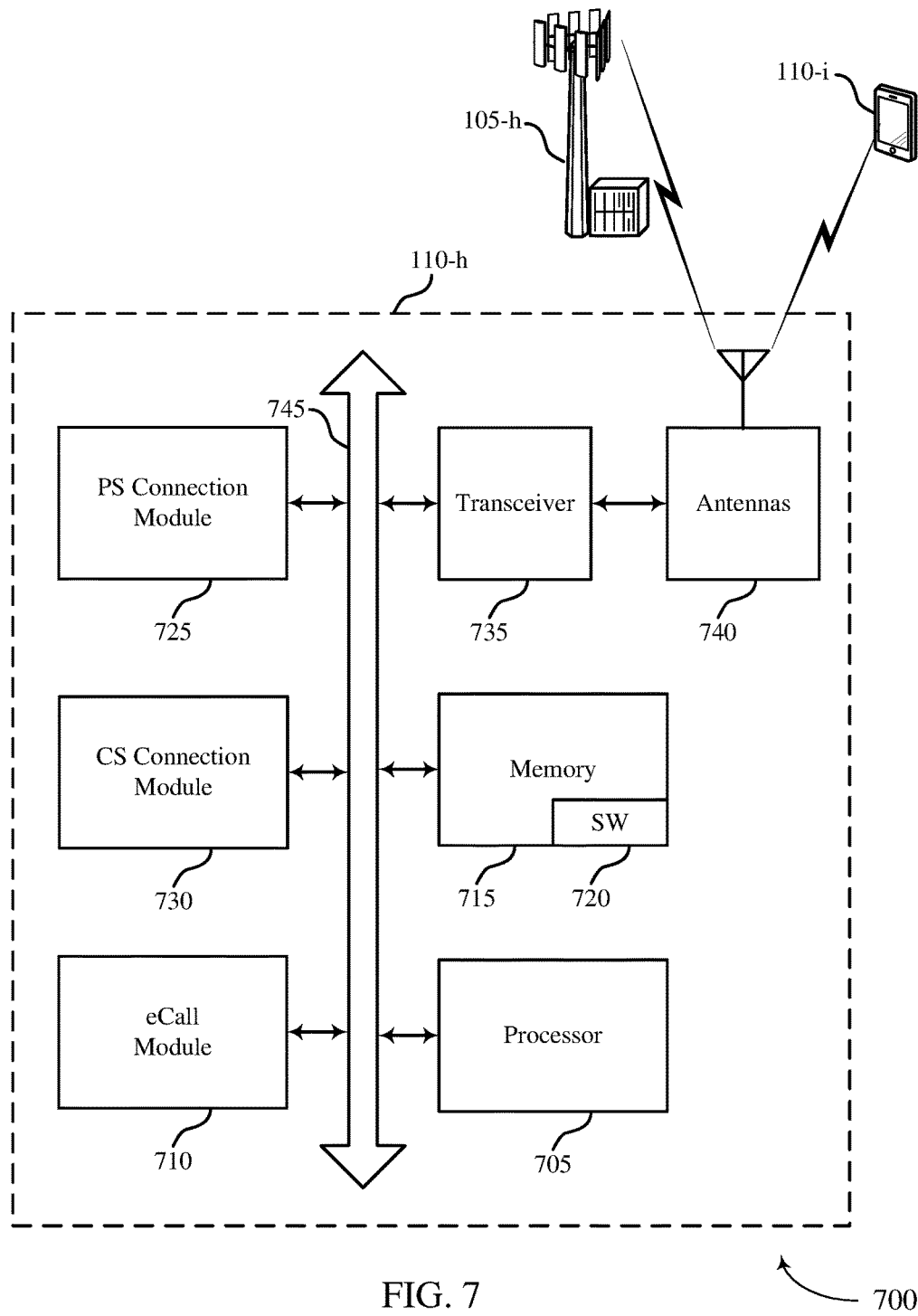
FIG. 7 illustrates a block diagram of a system including a terminal configured for emergency call Over-the-Top in accordance with various aspects of the present disclosure.

FIG. 7 shows a diagram of a system 700 configured for eCall Over-the-Top, in accordance with various aspects of the present disclosure. System 700 may include a terminal 110-*h*, which may be an example of a wireless device 400, a wireless device 500, or a terminal 110 described above with reference to FIGS. 1, 2 and 4-6. Terminal 110-*h* may include an eCall module 710, which may be an example of an eCall module 410 described with reference to FIGS. 4-6. Terminal 110-*h* may also include a PS connection module 725 and a CS connection module 730. Terminal 110-*h* may also include components for bi-directional voice and data communications including components for transmitting communications and components for receiving communications. For example, terminal 110-*h* may communicate bi-directionally with a base station 105-*h* (and thus, to a wireless network) or with a terminal 110-*i*.

The PS connection module 725 may establish a PS connection (e.g., an IP connection) to an eCall server (e.g., eCall server 205), wherein transmitting the first signaling message is based on the PS connection as described above with reference to FIGS. 2-3. In some examples, the eCall server may be a Session Initiation Protocol (SIP) Proxy. In some examples, the eCall server may be managed by a home network operator for the wireless device. In some examples, the eCall server may be part of a home network operator IMS subsystem. In some examples, the PS connection may be based on at least one of an IP, a transmission control protocol (TCP), a user datagram protocol (UDP), a transport layer security (TLS) protocol or an Internet protocol security (IPsec) protocol. The PS connection module 725 may also establish a media path from the terminal 110-*h* to the eCall server based on the PS connection.

The CS connection module 730 may establish a CS connection to an eCall server (e.g., eCall server 205), wherein transmitting the first signaling message is based on the CS connection as described above with reference to FIGS. 2-3. In establishing the CS connection to the eCall server, the establishment may be initiated by the terminal 110-*h* (e.g., as in step 370 of process flow 305) or may be initiated by the eCall server via a call-back (e.g. as in step 344 of process flow 303 or step 362 of process flow 304).

Terminal 110-*h* may also include a processor module 705, memory 715 (including software (SW) 720), a transceiver module 735, and one or more antenna(s) 740, each of which may communicate, directly or indirectly, with one another (e.g., via buses 745). The transceiver module 735 may communicate bi-directionally, via the antenna(s) 740 or wired or wireless links, with one or more networks, as described above. For example, the transceiver module 735 may communicate bi-directionally with a base station 105-*h* or another terminal 110-*i*. The transceiver module 735 may include a modem to modulate the packets and provide the modulated packets to the antenna(s) 740 for transmission, and to demodulate packets received from the antenna(s) 740. While terminal 110-*h* may include a single antenna 740, terminal 110-*h* may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor module 705 to perform various functions described herein (e.g., eCall Over-the-Top, etc.). Alternatively, the software/firmware code 720 may not be directly executable by the processor module 705 but cause a computer (e.g., when compiled and executed) to perform functions described herein. The processor module 705 may include an intelligent hardware device, (e.g., a central processing unit (CPU), a microcontroller, an ASIC, etc.)

Figure 8:
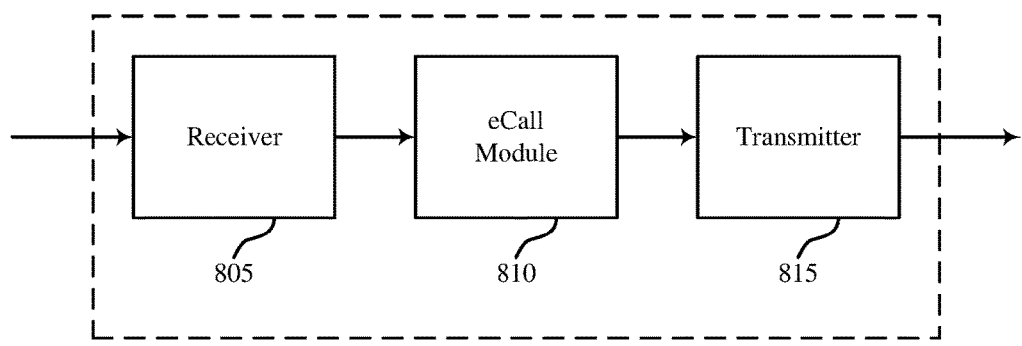
FIG. 8 shows a block diagram of a device configured for emergency call Over-the-Top in accordance with various aspects of the present disclosure.

FIG. 8 shows a block diagram of a device 800 for eCall Over-the-Top, in accordance with various aspects of the present disclosure. Device 800 may be an example of aspects of an eCall server 205 described with reference to FIGS. 1-7. Device 800 may include a receiver 805, an eCall module 810, or a transmitter 815. Device 800 may also include a processor (not shown in FIG. 8). Each of these components may be in communication with each other.

The components of device 800 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 805 may receive information such as packets, user data, media (e.g., voice, video or text) or control information associated with various information channels (e.g., control channels, data channels, and information related to eCall Over-the-Top, etc.). Received information may be passed on to the eCall module 810, and to other components of wireless device 800. In some embodiments, the receiver 805 may receive information over a PS connection or a CS connection. In some examples, the receiver 805 may receive a response from a PSAP such as a PSAP 210.

The eCall module 810 may receive a first signaling message from a wireless device (e.g., a terminal 110) using a communication session, the first signaling message including a set of session information related to a communication session and a set of telematics data for the wireless device, relay a portion of the first signaling message to a public safety answering point (e.g., a PSAP 210), and transmit a second signaling message to the wireless device using the communication session, the second signaling message including metadata based on a reception status or a content of the set of telematics data transmitted in the first signaling message.

The transmitter 815 may transmit signals received from other components of device 800 (e.g., eCall module 810). In some embodiments, the transmitter 815 may transmit information over a PS connection or a CS connection. In some embodiments, the transmitter 815 may be collocated with the receiver 805 in a transceiver module. The transmitter 815 and receiver 805 may transmit and receive information, respectively, using a network such as visited network 102, third party network 106, EPC 220-*a*, serving EPC 220-*b* or home EPC 220-*c*, to which the device 800 may be connected (e.g. via wireline or wireless means) or may be part of. In some examples, the transmitter 815 may relay a response from a PSAP to the wireless device.

Figure 9:
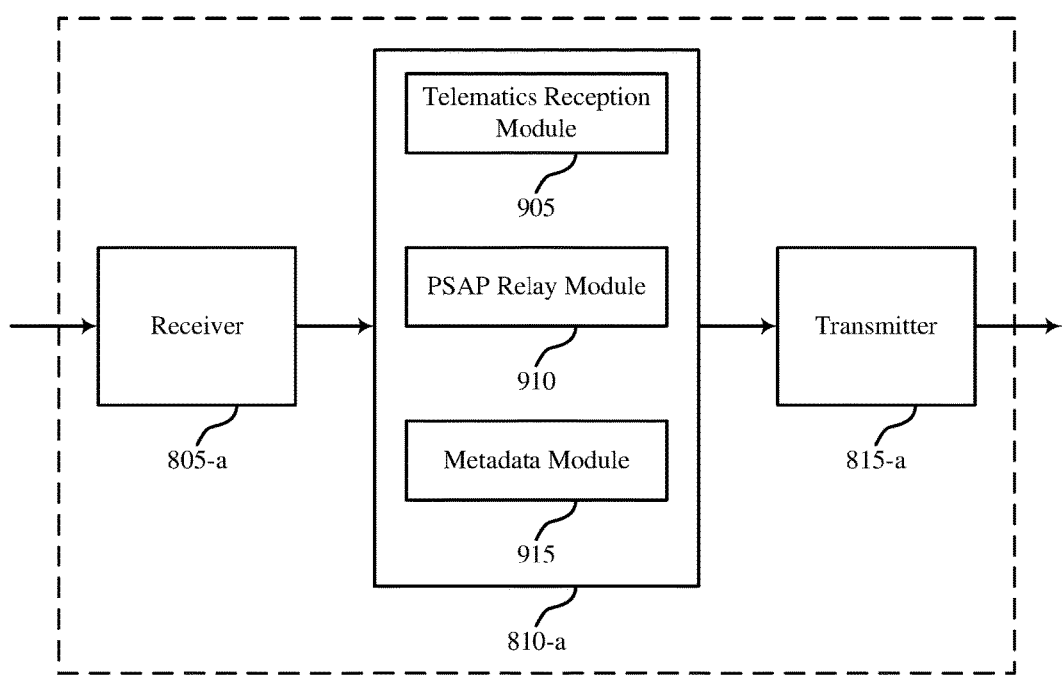
FIG. 9 shows a block diagram of a device configured for emergency call Over-the-Top in accordance with various aspects of the present disclosure.

FIG. 9 shows a block diagram of a device 900 for eCall Over-the-Top, in accordance with various aspects of the present disclosure. Device 900 may be an example of aspects of the wireless device 800 or an eCall server 205 described with reference to FIGS. 1-8. Device 900 may include a receiver 805-*a*, an eCall module 810-*a*, and a transmitter 815-*a*. Device 900 may also include a processor (not shown in FIG. 9). Each of these components may be in communication with each other. The eCall module 810-*a* may include a telematics reception module 905, a PSAP relay module 910, and a metadata module 915.

The components of wireless device 900 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 805-*a* may receive information which may be passed to eCall module 810-*a*, and to other components of device 900. The eCall module 810-*a* may perform the operations described above with reference to FIG. 8. The transmitter 815-*a* may transmit signals received from other components of wireless device 900.

The telematics reception module 905 may receive a first signaling message from a wireless device (e.g., a terminal 110) using a communication session, the first signaling message including a set of session information related to a communication session and a set of telematics data for the wireless device as described above with reference to FIGS. 2-3. When some or all of the information included in the first signaling message cannot be received over a PS connection, some of the information included in the first signaling message may be received, and in some cases requested, over a CS connection. In some examples, the device 900 may be a Session Initiation Protocol (SIP) proxy.

The PSAP relay module 910 may relay a portion of the first signaling message to a PSAP (e.g., a PSAP 210) as described above with reference to FIGS. 2-3. In some examples, relaying at least a portion of the first signaling message to the PSAP includes sending a verbal message to the PSAP.

The metadata module 915 may transmit a second signaling message to the wireless device using the communication session, the second signaling message including metadata based on a reception status or a content of the set of telematics data transmitted in the first signaling message as described above with reference to FIGS. 2-3.

Figure 10:
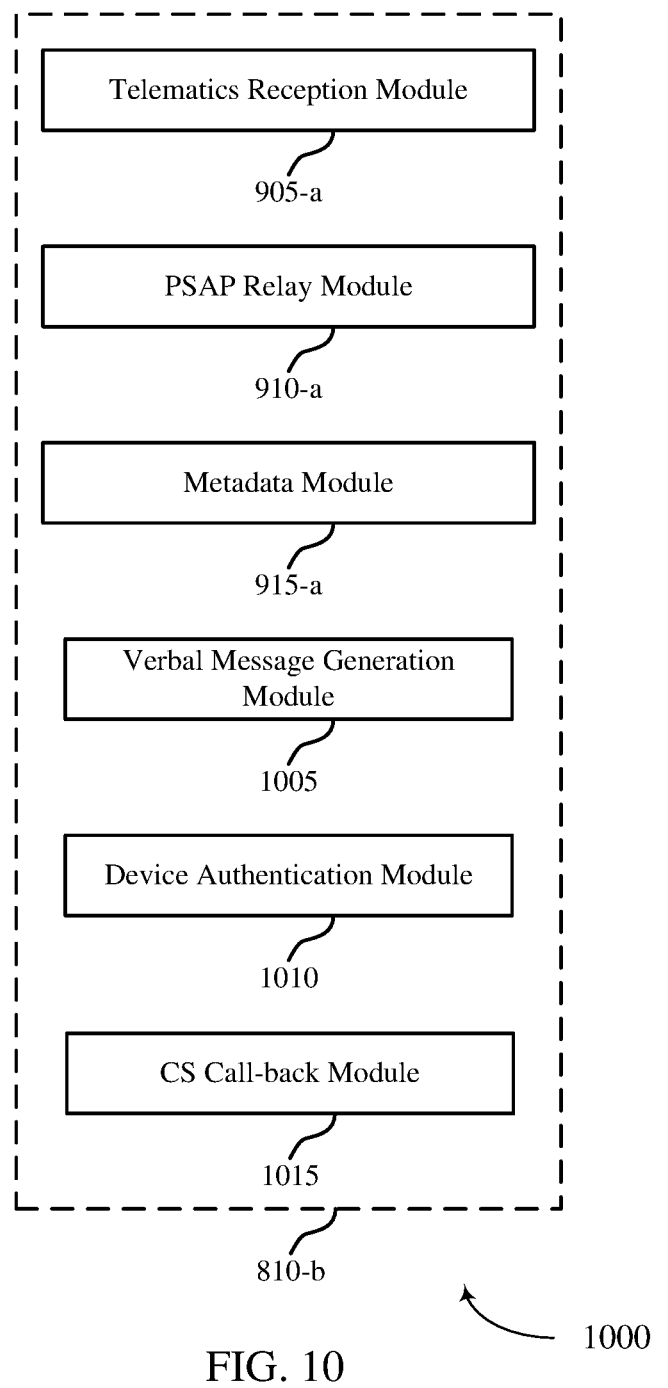
FIG. 10 shows a block diagram of an emergency call module configured for emergency call Over-the-Top in accordance with various aspects of the present disclosure.

FIG. 10 shows a block diagram 1000 of an eCall module 810-*b* which may be a component of the device 800 or the device 900 for eCall Over-the-Top, in accordance with various aspects of the present disclosure. The eCall module 810-*b* may be an example of aspects of an eCall module 810 described with reference to FIGS. 8-9. The eCall module 810-*b* may include a telematics reception module 905-*a*, a PSAP relay module 910-*a*, and a metadata module 915-*a*. Each of these modules may perform the functions described above with reference to FIG. 9. The eCall module 810-*b* may also include a verbal message generation module 1005, a device authentication module 1010, and a CS call-back module 1015.

The components of the eCall module 810-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The verbal message generation module 1005 may generate a verbal message based on a first signaling message as described above with reference to FIGS. 2-3.

The device authentication module 1010 may authenticate a wireless device (e.g., a terminal 110) as described above with reference to FIGS. 2-3. The device authentication module 1010 may also send an authentication indication to a PSAP (e.g., a PSAP 210).

The CS call-back module 1015 may initiate a CS voice call-back to a wireless device (e.g., a terminal 110) as described above with reference to FIGS. 2-3. In some examples, the first signaling message includes a call-back number for the wireless device and the CS voice call-back may be based on the call-back number. In some examples, the CS voice call-back may be based on a call-back number stored with the device 800 or 900.

Figure 11:
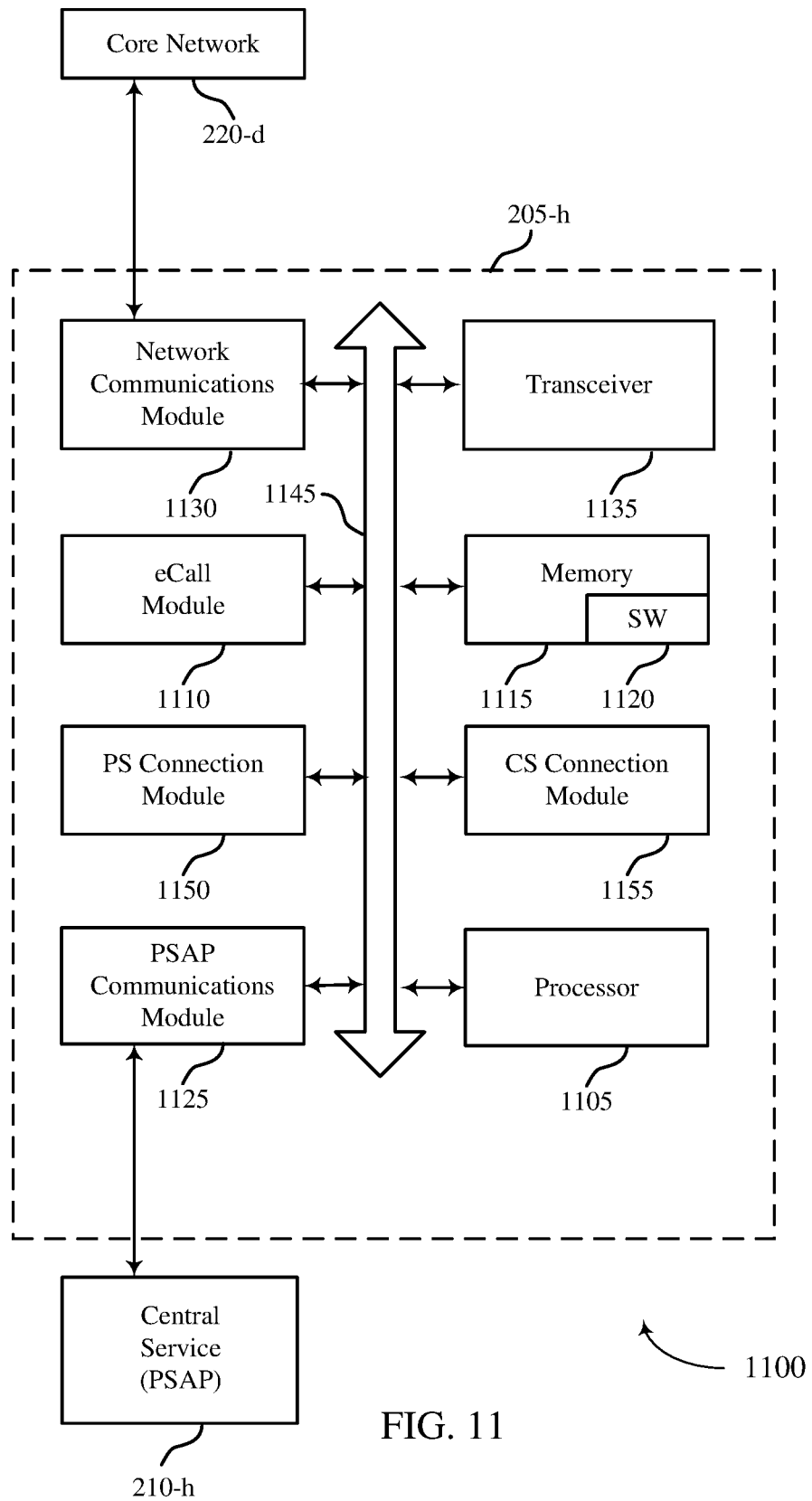
FIG. 11 illustrates a block diagram of a system including an emergency call server for emergency call Over-the-Top in accordance with various aspects of the present disclosure.

FIG. 11 shows a diagram of a system 1100 configured for eCall Over-the-Top, in accordance with various aspects of the present disclosure. System 1100 may include eCall server 205-*h*, which may be an example of a wireless device 800, a wireless device 900, or an eCall server 205 described above with reference to FIGS. 1, 2 and 8-10. ECall server 205-*h* may include an eCall module 1110, which may be an example of an eCall module 810 described with reference to FIGS. 8-10. ECall server 205-*h* may also include a PS connection module 1150 and a CS connection module 1155. ECall server 205-*h* may also include components for bi-directional voice and data communications including components for transmitting communications and components for receiving communications.

In some cases, eCall server 205-*h* may have one or more wired backhaul links. ECall server 205-*h* may have a wired backhaul link to a core network 220-*d* which may correspond to EPC 220-*a*, 220-*b* or 220-*c* in FIGS. 2A-2B. ECall server 205-*h* may also communicate with a central service 210-*h* (e.g., a PSAP which may correspond to a PSAP 210 in FIGS. 2-3) utilizing PSAP communications module 1125. In some embodiments, eCall server 205-*h* may communicate with base stations 105 (not shown in FIG. 11) through core network 220-*d*. In some cases, eCall server 205-*h* may communicate with the core network 220-*d* through network communications module 1130.

The PS connection module 1150 may establish a PS connection (e.g., an IP connection) to a wireless device (e.g., a terminal 110), wherein receiving a first signaling message is based on the PS connection as described above with reference to FIGS. 2-3. In some examples, the PS connection may be based on at least one of an IP, a TCP, a UDP, a TLS protocol, or an IPsec protocol. A media path may be established between the wireless device and the eCall server 205-*h* based on the PS connection.

The CS connection module 1155 may establish a CS connection to the wireless device, wherein transmitting the first signaling message is based on the CS connection as described above with reference to FIGS. 2-3. In establishing the CS connection to the wireless device, the establishment may be initiated by the wireless device (e.g., as in step 370 of process flow 305) or may be initiated by the eCall server 205-*h* via a call-back (e.g., as in step 344 of process flow 303 or step 362 of process flow 304).

The eCall server 205-*h* may include a processor module 1105, memory 1115 (including software (SW) 1120), and transceiver module 1135, which each may be in communication, directly or indirectly, with one another (e.g., over bus system 1145). The transceiver modules 1135 may be configured to communicate bi-directionally, with the terminals 110, which may be multi-mode devices. The transceiver module 1135 (or other components of the eCall server 205-*h*) may also be configured to communicate bi-directionally, with one or more central services 210-*h*. The transceiver module 1135 may include a modem configured to modulate and demodulate the communication content. The eCall server 205-*h* may include multiple transceiver modules 1135. The transceiver module 1135 may be an example of a combined receiver 805 and transmitter 815 of FIG. 8. In some cases, some aspects of the transceiver module 1135 may be performed by a person, for example, in relaying verbal data from a telematics message to a central service 210-*h*.

The memory 1115 may include RAM and ROM. The memory 1115 may also store computer-readable, computer-executable software code 1120 containing instructions that are configured to, when executed, cause the processor module 1105 to perform various functions described herein (e.g., eCall Over-the-Top, call processing, database management, message routing, etc.). Alternatively, the software 1120 may not be directly executable by the processor module 1105 but be configured to cause the processor module 1105, e.g., when compiled and executed, to perform functions described herein. The processor module 1105 may include an intelligent hardware device, e.g., a CPU, a microcontroller, an ASIC, etc. The processor module 1105 may include various special purpose processors such as encoders, queue processing modules, base band processors, radio head controllers, digital signal processor (DSPs), and the like.

The PSAP communications module 1125 may manage communications with a central service 210-*h*. The PSAP communications module 1125 may include a controller or scheduler for relaying communications between a terminal 110 and a central service 210-*h*.

Figure 12:
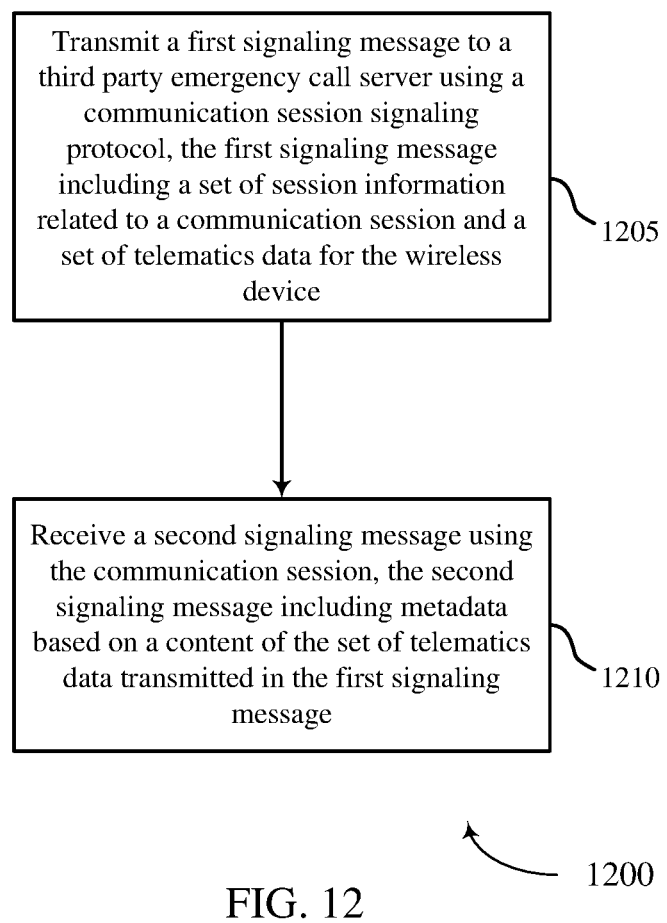
FIG. 12 shows a flowchart illustrating a method for emergency call Over-the-Top in accordance with various aspects of the present disclosure.

FIG. 12 shows a flowchart illustrating a method 1200 for eCall Over-the-Top, in accordance with various aspects of the present disclosure. The operations of method 1200 may be implemented by a terminal 110 or its components as described with reference to FIGS. 1-11. For example, the operations of method 1200 may be performed by the eCall module 410 as described with reference to FIGS. 4-7. In some examples, a terminal 110 may execute a set of codes to control the functional elements of the terminal 110 to perform the functions described below. Additionally or alternatively, the terminal 110 may perform aspects the functions described below using special-purpose hardware.

At block 1205, the terminal 110 may transmit a first signaling message to a third party emergency call server (e.g., an eCall server 205) using a communication session, the first signaling message including a set of session information related to a communication session and a set of telematics data for the wireless device as described above with reference to FIGS. 2-3. In certain examples, the operations of block 1205 may be performed by the eCall server telematics module 505 as described above with reference to FIG. 5.

At block 1210, the terminal 110 may receive a second signaling message using the communication session, the second signaling message including metadata based on a reception status or a content of the set of telematics data transmitted in the first signaling message as described above with reference to FIGS. 2-3. In certain examples, the operations of block 1210 may be performed by the telematics metadata module 510 as described above with reference to FIG. 5.

Figure 13:
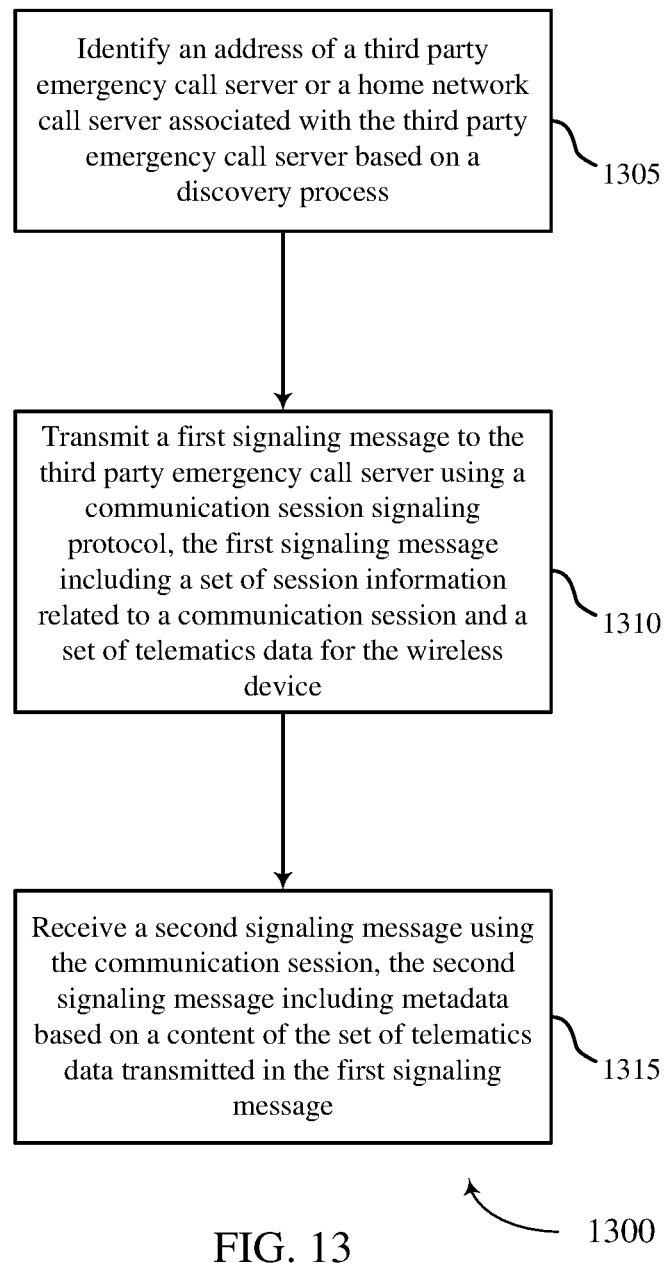
FIG. 13 shows a flowchart illustrating a method for emergency call Over-the-Top in accordance with various aspects of the present disclosure.

FIG. 13 shows a flowchart illustrating a method 1300 for eCall Over-the-Top, in accordance with various aspects of the present disclosure. The operations of method 1300 may be implemented by a wireless device such as a terminal 110 or its components as described with reference to FIGS. 1-11. For example, the operations of method 1300 may be performed by the eCall module 410 as described with reference to FIGS. 4-7. In some examples, a terminal 110 may execute a set of codes to control the functional elements of the terminal 110 to perform the functions described below. Additionally or alternatively, the terminal 110 may perform aspects the functions described below using special-purpose hardware. The method 1300 may also incorporate aspects of method 1200 of FIG. 12.

At block 1305, the wireless device may identify an address of a third party emergency call server (e.g., an eCall server 205) or a home network call server associated with the third party emergency call server based on a discovery process as described above with reference to FIGS. 2-3. In certain examples, the operations of block 1305 may be performed by the call server address module 605 as described above with reference to FIG. 6.

At block 1310, the wireless device may transmit a first signaling message to the third party emergency call server using a communication session, the first signaling message including a set of session information related to a communication session and a set of telematics data for the wireless device as described above with reference to FIGS. 2-3. In certain examples, the operations of block 1310 may be performed by the eCall server telematics module 505 as described above with reference to FIG. 5.

At block 1315, the wireless device may receive a second signaling message using the communication session, the second signaling message including metadata based on a reception status or a content of the set of telematics data transmitted in the first signaling message as described above with reference to FIGS. 2-3. In certain examples, the operations of block 1315 may be performed by the telematics metadata module 510 as described above with reference to FIG. 5.

Figure 14:
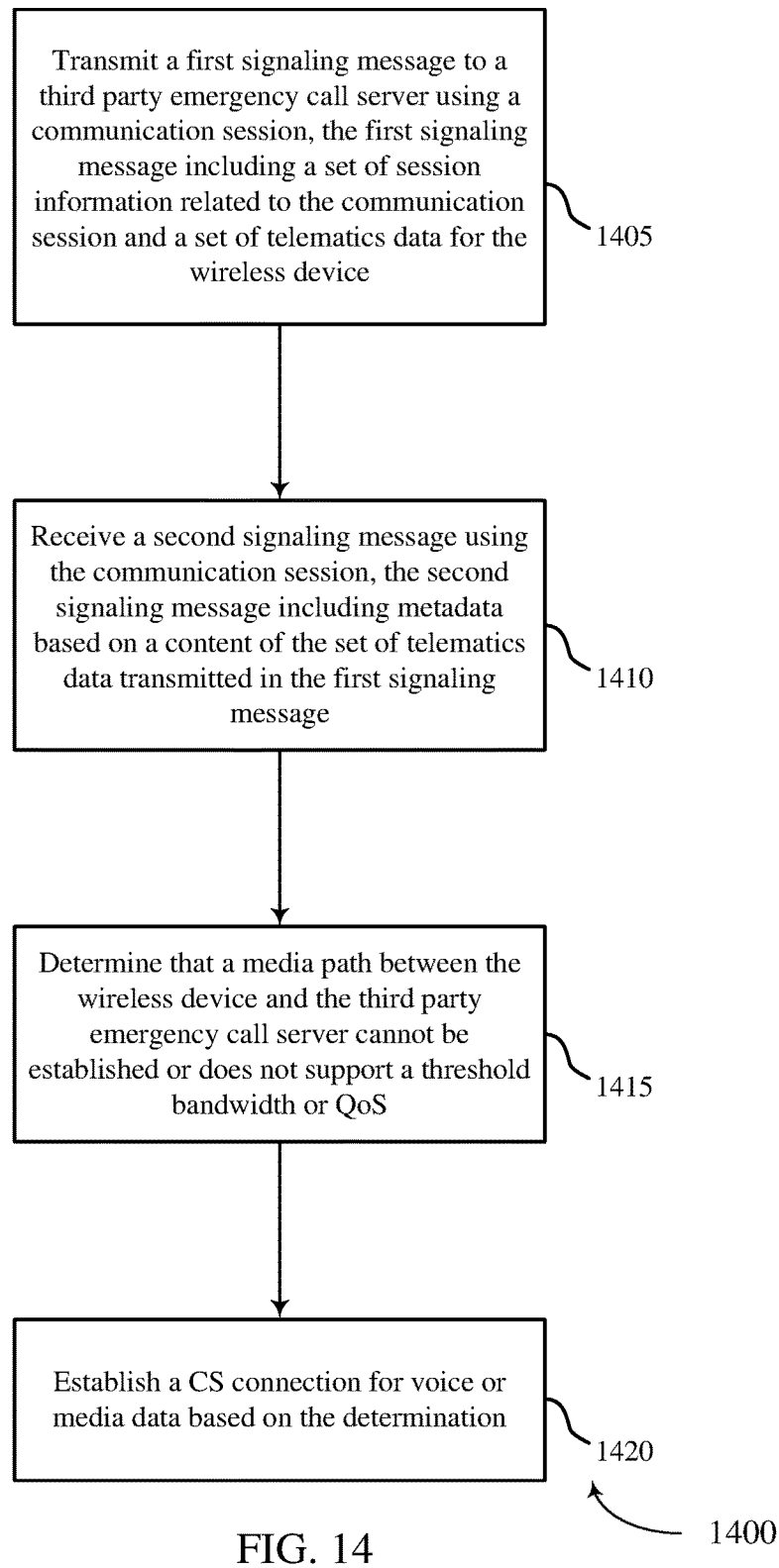
FIG. 14 shows a flowchart illustrating a method for emergency call Over-the-Top in accordance with various aspects of the present disclosure.

FIG. 14 shows a flowchart illustrating a method 1400 for eCall Over-the-Top, in accordance with various aspects of the present disclosure. The operations of method 1400 may be implemented by a wireless device such as a terminal 110 or its components as described with reference to FIGS. 1-11. For example, the operations of method 1400 may be performed by the eCall module 410 as described with reference to FIGS. 4-7. In some examples, a terminal 110 may execute a set of codes to control the functional elements of the terminal 110 to perform the functions described below. Additionally or alternatively, a terminal 110 may perform aspects the functions described below using special-purpose hardware. The method 1400 may also incorporate aspects of methods 1200, and 1300 of FIGS. 12 and 13.

At block 1405, the wireless device may transmit a first signaling message to a third party emergency call server (e.g., an eCall server 205) using a communication session, the first signaling message including a set of session information related to a communication session and a set of telematics data for the wireless device as described above with reference to FIGS. 2-3. In certain examples, the operations of block 1405 may be performed by the eCall server telematics module 505 as described above with reference to FIG. 5.

At block 1410, the wireless device may receive a second signaling message using the communication session, the second signaling message including metadata based on a reception status or a content of the set of telematics data transmitted in the first signaling message as described above with reference to FIGS. 2-3. In certain examples, the operations of block 1410 may be performed by the telematics metadata module 510 as described above with reference to FIG. 5.

At block 1415, the wireless device may determine that a media path between the wireless device and the third party emergency call server cannot be established or does not support a threshold bandwidth, threshold QoS, threshold packet loss, or threshold latency, as described above with reference to FIGS. 2-3. In certain examples, the operations of block 1415 may be performed by the media path module 615 as described above with reference to FIG. 6.

At block 1420, the wireless device may establish a CS connection for voice or media data based on the determination as described above with reference to FIGS. 2-3. In certain examples, the operations of block 1420 may be performed by the media path module 615 as described above with reference to FIG. 6. The CS connection establishment may be initiated by the wireless device or may be initiated (e.g., via call-back) by the third party emergency call server.

Figure 15:
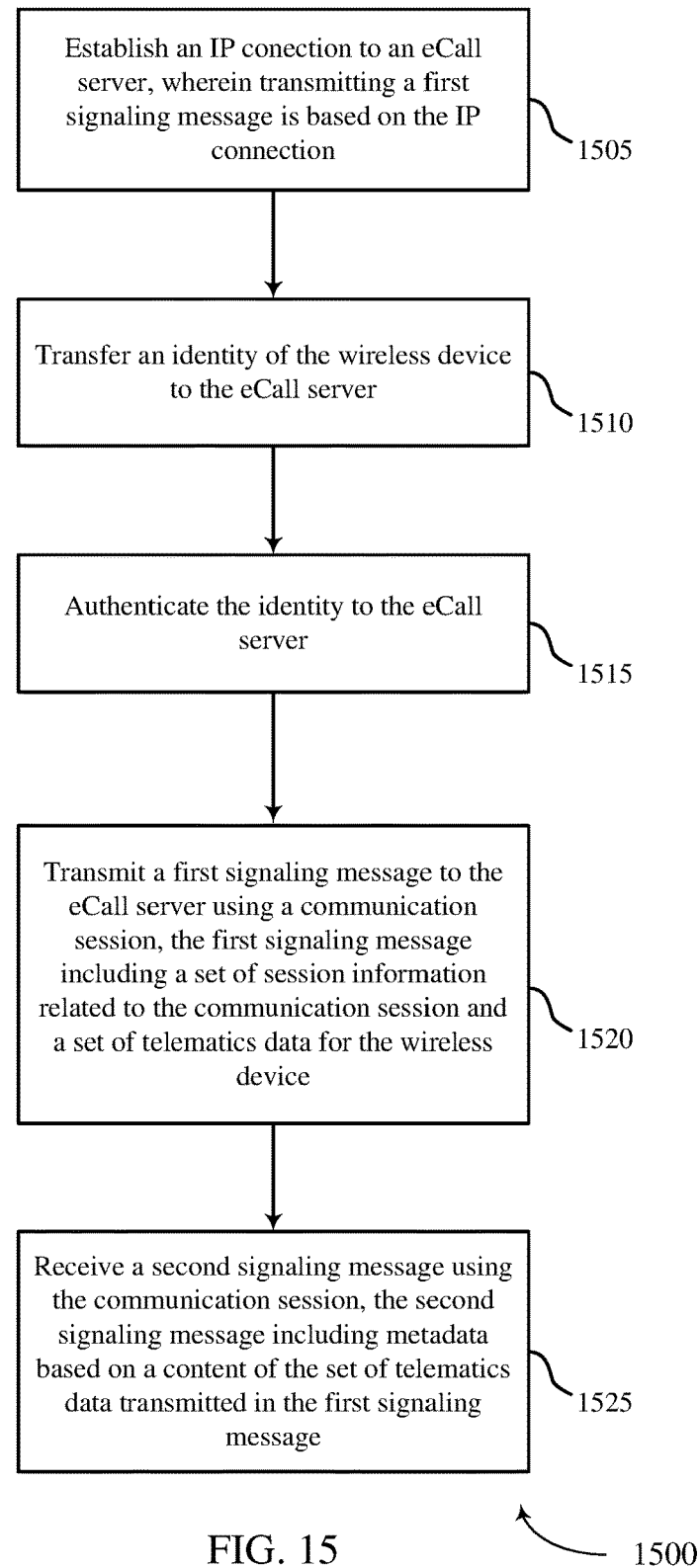
FIG. 15 shows a flowchart illustrating a method for emergency call Over-the-Top in accordance with various aspects of the present disclosure.

FIG. 15 shows a flowchart illustrating a method 1500 for eCall Over-the-Top, in accordance with various aspects of the present disclosure. The operations of method 1500 may be implemented by a wireless device such as a terminal 110 or its components as described with reference to FIGS. 1-11. For example, the operations of method 1500 may be performed by the eCall module 410 as described with reference to FIGS. 4-7. In some examples, a terminal 110 may execute a set of codes to control the functional elements of the terminal 110 to perform the functions described below. Additionally or alternatively, the terminal 110 may perform aspects the functions described below using special-purpose hardware. The method 1500 may also incorporate aspects of methods 1200, 1300, and 1400 of FIGS. 12-14.

At block 1505, the wireless device may establish an IP connection to an eCall server (e.g., an eCall server 205), wherein transmitting a first signaling message is based on the IP connection as described above with reference to FIGS. 2-3. In certain examples, the operations of block 1505 may be performed by the PS connection module 725 as described above with reference to FIG. 7.

At block 1510, the wireless device may transfer an identity of the wireless device to the eCall server as described above with reference to FIGS. 2-3. In certain examples, the operations of block 1520 may be performed by the authentication module 625 as described above with reference to FIG. 6.

At block 1515, the wireless device may authenticate the identity to the eCall server as described above with reference to FIGS. 2-3. In certain examples, the operations of block 1515 may be performed by the authentication module 625 as described above with reference to FIG. 6.

At block 1520, the wireless device may transmit the first signaling message to the eCall server using a communication session, the first signaling message including a set of session information related to a communication session and a set of telematics data for the wireless device as described above with reference to FIGS. 2-3. In certain examples, the operations of block 1520 may be performed by the eCall server telematics module 505 as described above with reference to FIG. 5.

At block 1525, the wireless device may receive a second signaling message using the communication session, the second signaling message including metadata based on a reception status or a content of the set of telematics data transmitted in the first signaling message as described above with reference to FIGS. 2-3. In certain examples, the operations of block 1525 may be performed by the telematics metadata module 510 as described above with reference to FIG. 5.

Figure 16:
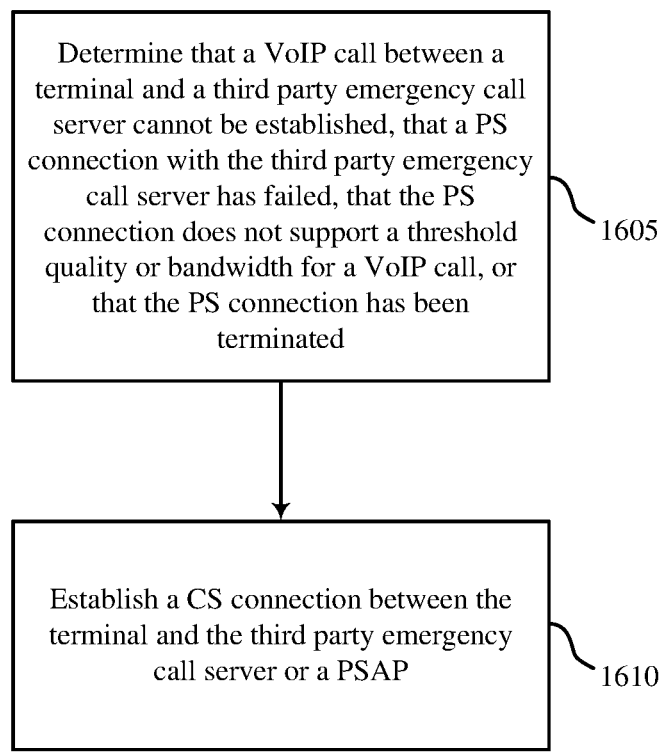
FIG. 16 shows a flowchart illustrating a method for emergency call Over-the-Top in accordance with various aspects of the present disclosure.

FIG. 16 shows a flowchart illustrating a method 1600 for eCall Over-the-Top in accordance with various aspects of the present disclosure. The operations of method 1600 may be implemented by a terminal 110 or its components as described with reference to FIGS. 1-11. For example, the operations of method 1600 may be performed by the eCall module 410 as described with reference to FIGS. 4-7. In some examples, a terminal 110 may execute a set of codes to control the functional elements of the terminal 110 to perform the functions described below. Additionally or alternatively, the terminal 110 may perform aspects of the functions described below using special-purpose hardware.

At block 1605, a terminal 110 may determine that a VoIP call between the terminal 110 and a third party emergency call server (e.g., an eCall server 205) cannot be established, that a PS connection with the third party emergency call server has failed, that the PS connection does not support a threshold quality or bandwidth for a VoIP call (e.g., that the PS connection lacks a threshold quality (e.g., QoS, packet loss, latency, or bandwidth)), or that the PS connection has been terminated (e.g., because the PS connection was initiated without media data, or because the PS connection does not support the threshold quality or bandwidth), as described above with reference to FIG. 3.

At block 1610, the terminal 110 may establish a CS connection between the terminal 110 and the third party emergency call server or a PSAP. The CS connection may be established for voice or media data, and may be established subsequent to the determination made at block 1605, as described above with reference to FIG. 3. In scenarios in which the terminal 110 is able to establish a prior PS connection with the third party emergency call server, but a VoIP call cannot be established or maintained between the terminal 110 and the third party emergency call server or lacks sufficient media quality (e.g., due to high loss, latency, etc.), or the PS connection fails, or does not support a threshold quality or bandwidth for a VoIP call, or has been terminated, the CS connection between the terminal 110 and the third party emergency call server may be initiated by a voice call-back from the third party emergency call server (or by a voice call-back from a PSAP with which the third party emergency call server communicates). In scenarios in which the terminal 110 is unable to establish a prior PS connection with the third party emergency call server, the CS connection between the terminal 110 and the third party emergency call server may be initiated by the terminal 110. In certain examples, the terminal 110 may transmit a first signaling message to the third party emergency call server. The first signaling message may include a set of session information related to a communication session over the CS connection or a set of telematics data (e.g., an MSD or VEDS) for the terminal 110, as described above with reference to FIG. 3. In certain examples, the operations of blocks 1605 and 1610 may be performed by the eCall module 410 described above with reference to FIG. 4.

Figure 17:
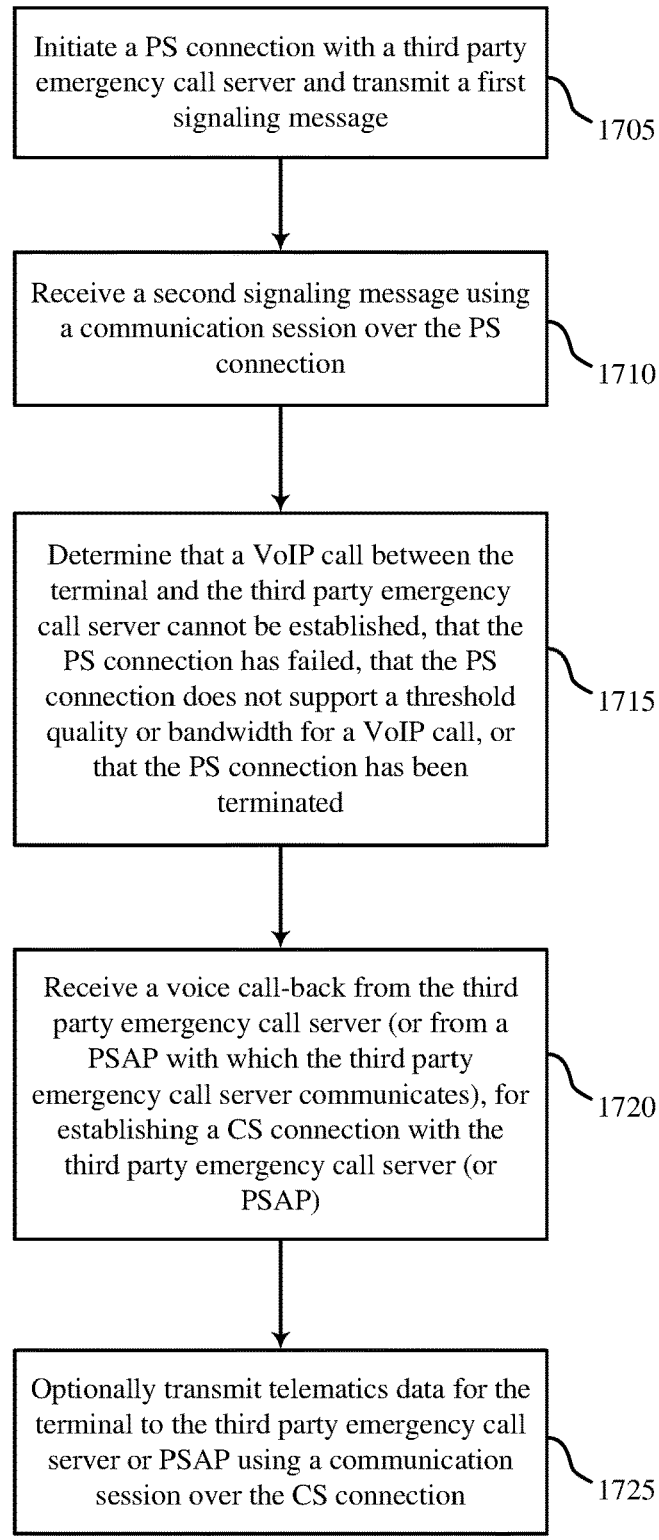
FIG. 17 shows a flowchart illustrating a method for emergency call Over-the-Top in accordance with various aspects of the present disclosure.

FIG. 17 shows a flowchart illustrating a method 1700 for eCall Over-the-Top in accordance with various aspects of the present disclosure. The operations of method 1700 may be implemented by a terminal 110 or its components as described with reference to FIGS. 1-11. For example, the operations of method 1700 may be performed by the eCall module 410 as described with reference to FIGS. 4-7. In some examples, a terminal 110 may execute a set of codes to control the functional elements of the terminal 110 to perform the functions described below. Additionally or alternatively, the terminal 110 may perform aspects of the functions described below using special-purpose hardware. The method 1700 may also incorporate aspects of method 1600 of FIG. 16.

At block 1705, a terminal 110 may initiate a PS connection with a third party emergency call server (e.g., an eCall server 205). When initiating the PS connection, the terminal 110 may transmit a first signaling message (e.g., a SIP INVITE) to the third party emergency call server. The first signaling message may include a set of session information related to a communication session over the PS connection, as described above with reference to FIG. 3. The first signaling message may also include a CBN or a set of telematics data (e.g., an MSD or VEDS) for the terminal 110. In some cases, the session information may include a request to establish one or more media components (e.g., a VoIP call, text, video, etc.).

At block 1710, the terminal 110 may receive a second signaling message using the communication session over the PS connection. The second signaling message may include metadata based on a reception status or a content of the set of telematics data transmitted in the first signaling message, as described above with reference to FIG. 3.

At block 1715, the terminal 110 may determine that a VoIP call between the terminal 110 and the third party emergency call server cannot be established, that the PS connection has failed, that the PS connection does not support a threshold quality or bandwidth for a VoIP call (e.g., that the PS connection lacks a threshold quality (e.g., QoS, packet loss, latency, or bandwidth)), or that the PS connection has been terminated (e.g., because the PS connection was initiated without media data, or because the PS connection does not support a threshold quality or bandwidth), as described above with reference to FIG. 3.

At block 1720, the terminal 110 may receive a voice call-back from the third party emergency call server (or from a PSAP with which the third party emergency call server communicates), for establishing a CS connection with the third party emergency call server (or PSAP). The voice call-back may be based at least in part on a CBN provided by the terminal 110 (e.g., in the first signaling message), a CBN stored at the third party emergency call server, a CBN stored in a database accessible to the third party emergency call server or the PSAP, or a CBN stored at the PSAP. The CBN may also be inferred or looked up based at least in part on identifying information associated with the terminal 110, which identifying information may be received or inferred from the terminal's attempt to establish a PS connection. The CS connection may be established for voice or media data (e.g., text).

At block 1725, and when the telematics data was not received by the third party emergency call server at block 1705, the terminal 110 may optionally transmit the telematics data to the third party emergency call server or PSAP using a communication session over the CS connection. In some cases, the telematics data may be transmitted in response to a request received from the third party emergency call server or PSAP. In some cases, the telematics data may be transmitted using the fallback mechanism described herein. In certain examples, the operations of blocks 1705, 1710, 1715, 1720, and 1725 may be performed by the eCall module 410 described above with reference to FIG. 4.

Figure 18:
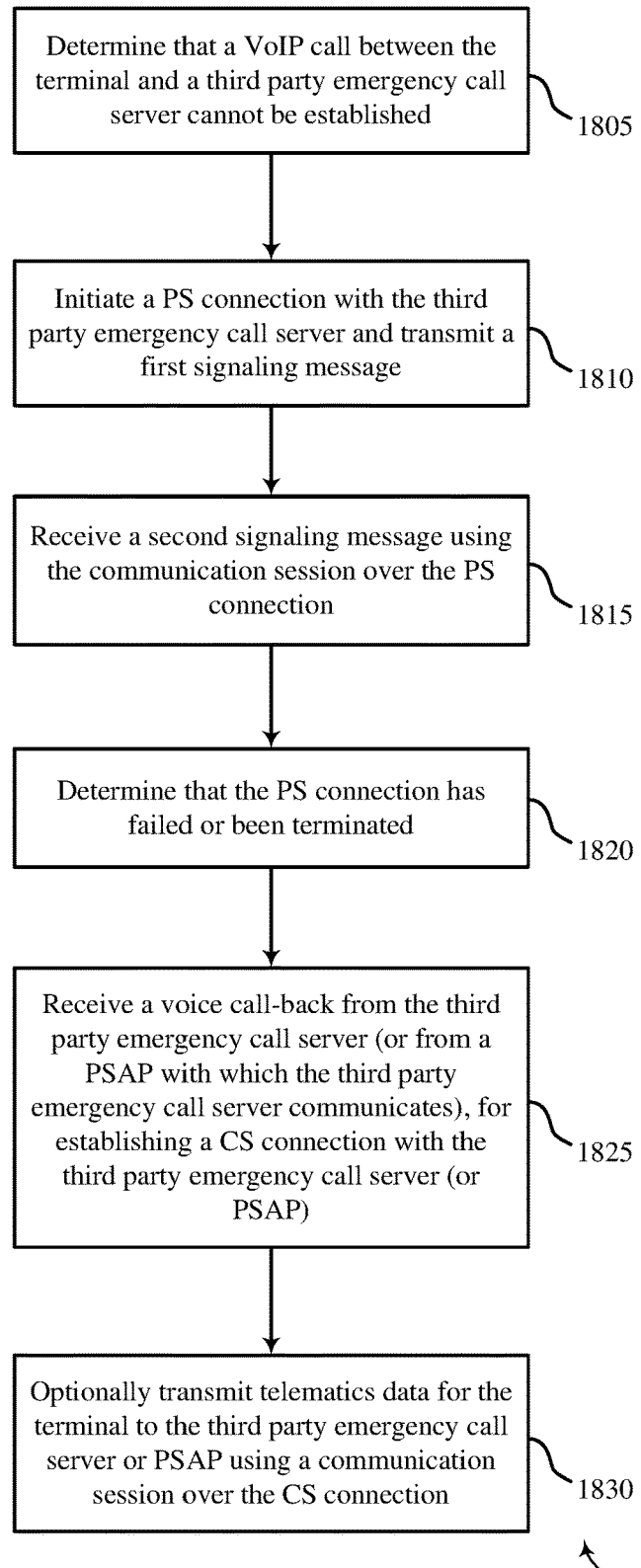
FIG. 18 shows a flowchart illustrating a method for emergency call Over-the-Top in accordance with various aspects of the present disclosure.

FIG. 18 shows a flowchart illustrating a method 1800 for eCall Over-the-Top in accordance with various aspects of the present disclosure. The operations of method 1800 may be implemented by a terminal 110 or its components as described with reference to FIGS. 1-11. For example, the operations of method 1800 may be performed by the eCall module 410 as described with reference to FIGS. 4-7. In some examples, a terminal 110 may execute a set of codes to control the functional elements of the terminal 110 to perform the functions described below. Additionally or alternatively, the terminal 110 may perform aspects of the functions described below using special-purpose hardware. The method 1800 may also incorporate aspects of method 1600 of FIG. 16.

At block 1805, a terminal 110 may determine that a VoIP call between the terminal 110 and a third party emergency call server (e.g., an eCall server 205) cannot be established (e.g., because a PS connection available for establishing the VoIP call does not support a threshold quality (e.g., QoS, packet loss, latency, or bandwidth) for the VoIP call), as described above with reference to FIG. 3.

At block 1810, the terminal 110 may initiate a PS connection with the third party emergency call server. When initiating the PS connection, the terminal 110 may transmit a first signaling message (e.g., a SIP INVITE) to the third party emergency call server. The first signaling message may include a set of session information related to a communication session over the PS connection, as described above with reference to FIG. 3. The first signaling message may also include a CBN and/or a set of telematics data (e.g., an MSD or VEDS) for the terminal 110. Because of the determination at block 1805, the session information may not include a request to establish one or more media components (e.g., a VoIP call, text, video, etc.).

At block 1815, the terminal 110 may receive a second signaling message using the communication session over the PS connection. The second signaling message may include metadata based on a reception status or a content of the set of telematics data transmitted in the first signaling message, as described above with reference to FIG. 3. In certain examples, the second signaling message may include a PS connection termination message.

At block 1820, the terminal 110 may determine that the PS connection has failed or been terminated (e.g., because the PS connection was initiated without media data, or because the PS connection does not support a threshold quality or bandwidth), as described above with reference to FIG. 3.

At block 1825, the terminal 110 may receive a voice call-back from the third party emergency call server (or from a PSAP with which the third party emergency call server communicates), for establishing a CS connection with the third party emergency call server (or PSAP). The voice call-back may be based at least in part on a CBN provided by the terminal 110 (e.g., in the first signaling message), a CBN stored at the third party emergency call server, a CBN stored in a database accessible to the third party emergency call server or the PSAP, or a CBN stored at the PSAP. The CBN may also be inferred or looked up based at least in part on identifying information associated with the terminal 110, which identifying information may be received or inferred from the terminal's attempt to establish a PS connection. The CS connection may be established for voice or media data (e.g., text).

At block 1830, and when the telematics data was not received by the third party emergency call server at block 1810, the terminal 110 may optionally transmit the telematics data to the third party emergency call server or PSAP using a communication session over the CS connection. In some cases, the telematics data may be transmitted in response to a request received from the third party emergency call server or PSAP. In some cases, the telematics data may be transmitted using the fallback mechanism described herein. In certain examples, the operations of blocks 1805, 1810, 1815, 1820, 1825, and 1830 may be performed by the eCall module 410 described above with reference to FIG. 4.

Figure 19:
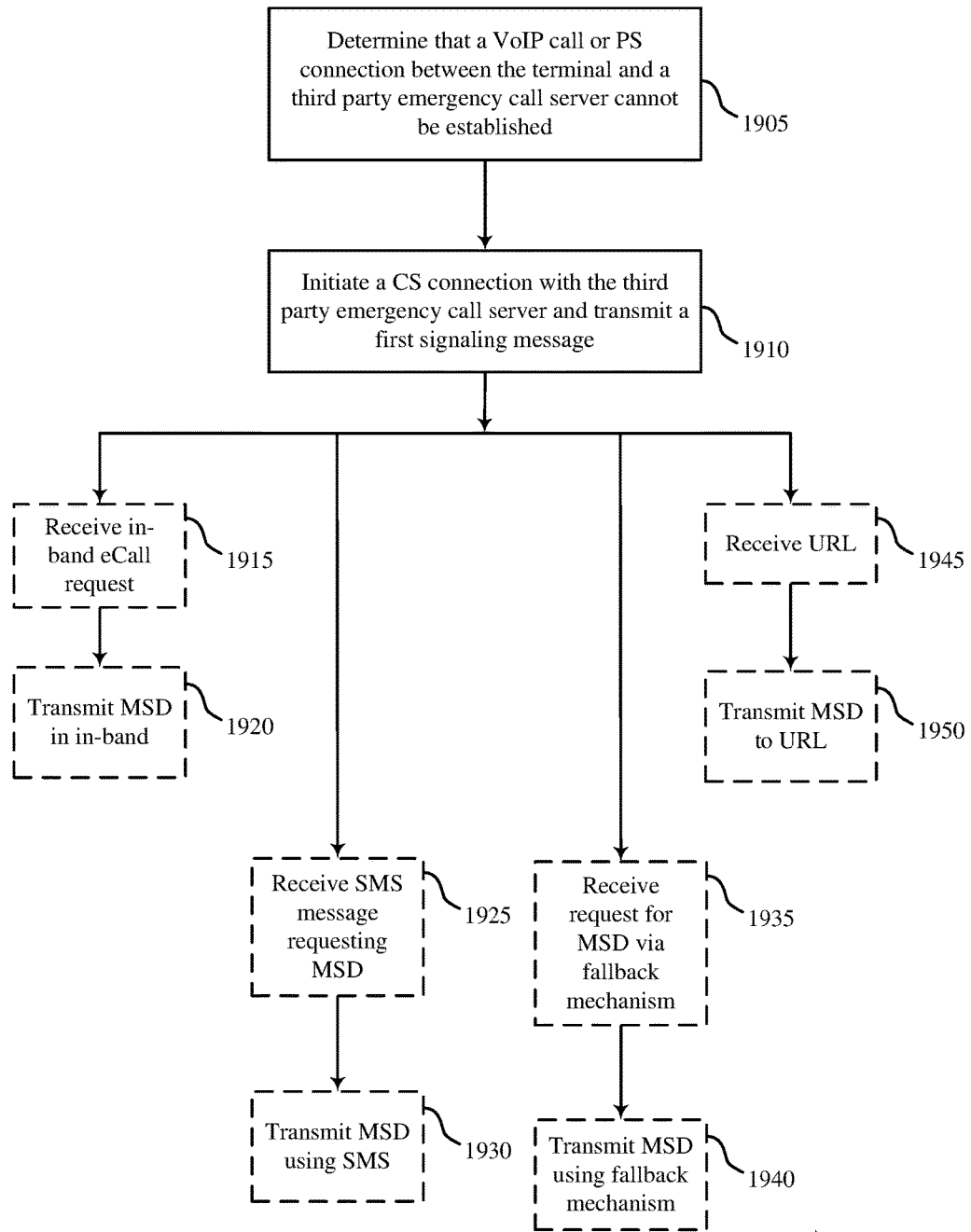
FIG. 19 shows a flowchart illustrating a method for emergency call Over-the-Top in accordance with various aspects of the present disclosure.

FIG. 19 shows a flowchart illustrating a method 1900 for eCall Over-the-Top, in accordance with various aspects of the present disclosure. The operations of method 1900 may be implemented by a terminal 110 or its components as described with reference to FIGS. 1-11. For example, the operations of method 1900 may be performed by the eCall module 410 as described with reference to FIGS. 4-7. In some examples, a terminal 110 may execute a set of codes to control the functional elements of the terminal 110 to perform the functions described below. Additionally or alternatively, the terminal 110 may perform aspects of the functions described below using special-purpose hardware. The method 1900 may also incorporate aspects of method 1600 of FIG. 16.

At block 1905, a terminal 110 may determine that a VoIP call or PS connection between the terminal 110 and a third party emergency call server (e.g., an eCall server 205) cannot be established (e.g., because a PS connection available for establishing the VoIP call does not support a threshold quality (e.g., QoS, packet loss, latency, or bandwidth) for the VoIP call), as described above with reference to FIG. 3.

At block 1910, the terminal 110 may initiate a CS connection with the third party emergency call server. When initiating the CS connection, the terminal 110 may transmit a first signaling message to the third party emergency call server. The first signaling message may include a set of session information related to a communication session over the CS connection, as described above with reference to FIG. 3.

Following the operations of block 1910, the method 1900 may perform the operations at block 1915, 1920, 1925, 1930, 1935, 1940, 1945, and/or 1950.

At block 1915, the terminal 110 may receive an in-band eCall request from the third party emergency call server, over the CS connection, to pull telematics data (e.g., an MSD) from the terminal 110. At block 1920, the terminal 110 may transmit telematics data (e.g., MSD) to the third party emergency call server by in-band means over the CS connection.

At block 1925, the terminal 110 may receive from the third party emergency call server an SMS message requesting the MSD. At block 1930 (in response to the SMS message or proactively), the terminal 110 may transmit telematics data (e.g., MSD) to the third party emergency call server using SMS.

At block 1935, the terminal 110 may optionally receive from the third party emergency call server, over the CS connection, a request for telematics data (e.g., MSD). The request may be received via the fallback mechanism described herein. At block 1940 (in response to the request or proactively), the terminal 110 may transmit the telematics data (e.g., MSD) to the third party emergency call server, over the CS connection, using the fallback mechanism.

At block 1945, the terminal 110 may optionally receive a URL from the third party emergency call server over the CS connection. The URL may be an address for the third party emergency call server or for a PSAP (e.g., a PSAP 210) with which the third party emergency call server may be in communication. The URL may be received, for example, in an SMS message or via the fallback mechanism. Alternatively, the terminal 110 may determine the URL from its configuration or from a discovery mechanism. At block 1950, the terminal 110 may transmit the telematics data (e.g., MSD) to the entity identified by the URL.

In another alternative, the terminal 110 may optionally receive a SIP message (e.g., an INVITE message) from the third party emergency call server, in parallel with or prior to initiating the CS connection. The SIP message may be used to pull the telematics data (e.g. MSD) from the terminal 110. In response to receiving the SIP message or proactively, the terminal 110 may transmit the telematics data (e.g., MSD) to the third party emergency call server using SIP. In certain examples, the operations of blocks 1905, 1910, 1915, 1920, 1925, 1930, 1935, 1940, 1945, and 1950 may be performed by the eCall module 410 described above with reference to FIG. 4.

Figure 20:
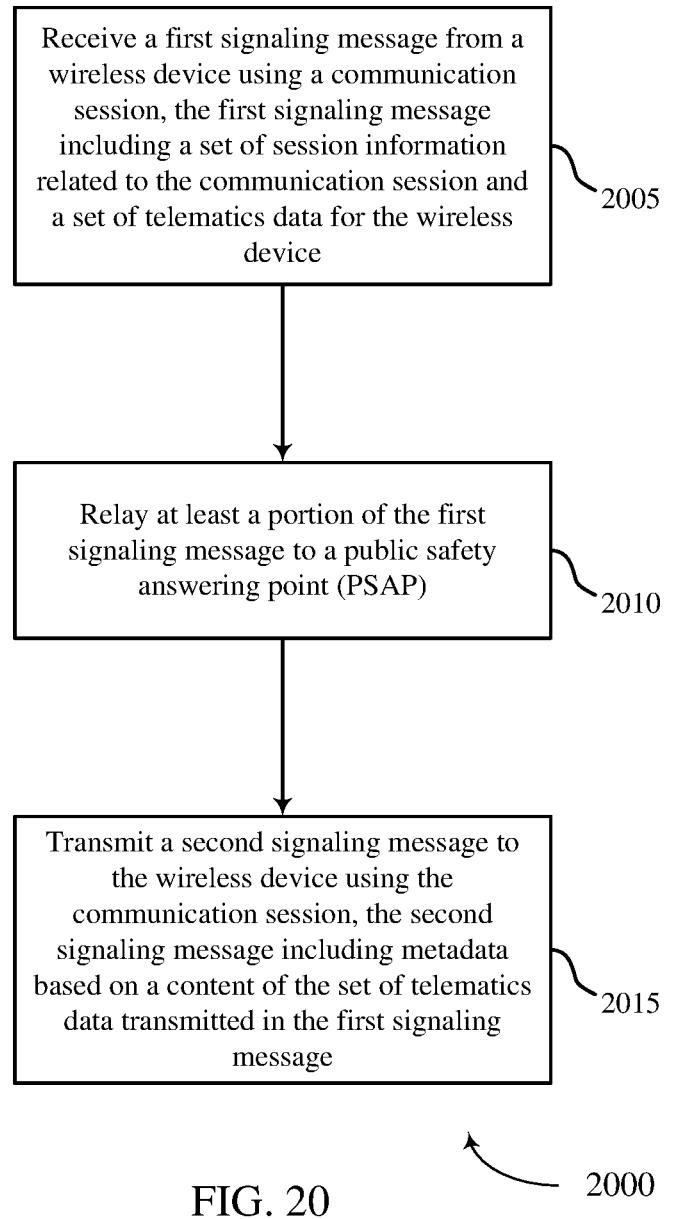
FIG. 20 shows a flowchart illustrating a method for emergency call Over-the-Top in accordance with various aspects of the present disclosure.

FIG. 20 shows a flowchart illustrating a method 2000 for eCall Over-the-Top in accordance with various aspects of the present disclosure. The operations of method 2000 may be implemented by an eCall server 205 or its components as described with reference to FIGS. 1-11. For example, the operations of method 2000 may be performed by the eCall module 810 as described with reference to FIGS. 8-11. In some examples, an eCall server 205 may execute a set of codes to control the functional elements of the eCall server 205 to perform the functions described below. Additionally or alternatively, the eCall server 205 may perform aspects the functions described below using special-purpose hardware.

At block 2005, an eCall server 205 may receive a first signaling message from a wireless device (e.g., a terminal 110) using a communication session, the first signaling message including a set of session information related to a communication session and a set of telematics data for the wireless device as described above with reference to FIGS. 2-3. In certain examples, the operations of block 2005 may be performed by the telematics reception module 905 as described above with reference to FIG. 9.

At block 2010, the eCall server 205 may relay a portion of the first signaling message to a public safety answering point (e.g. a PSAP 210) as described above with reference to FIGS. 2-3. In certain examples, the operations of block 2010 may be performed by the PSAP relay module 910 as described above with reference to FIG. 9.

At block 2015, the eCall server 205 may transmit a second signaling message to the wireless device using the communication session, the second signaling message including metadata based on a reception status or a content of the set of telematics data transmitted in the first signaling message as described above with reference to FIGS. 2-3. In certain examples, the operations of block 2015 may be performed by the metadata module 915 as described above with reference to FIG. 9.

Figure 21:
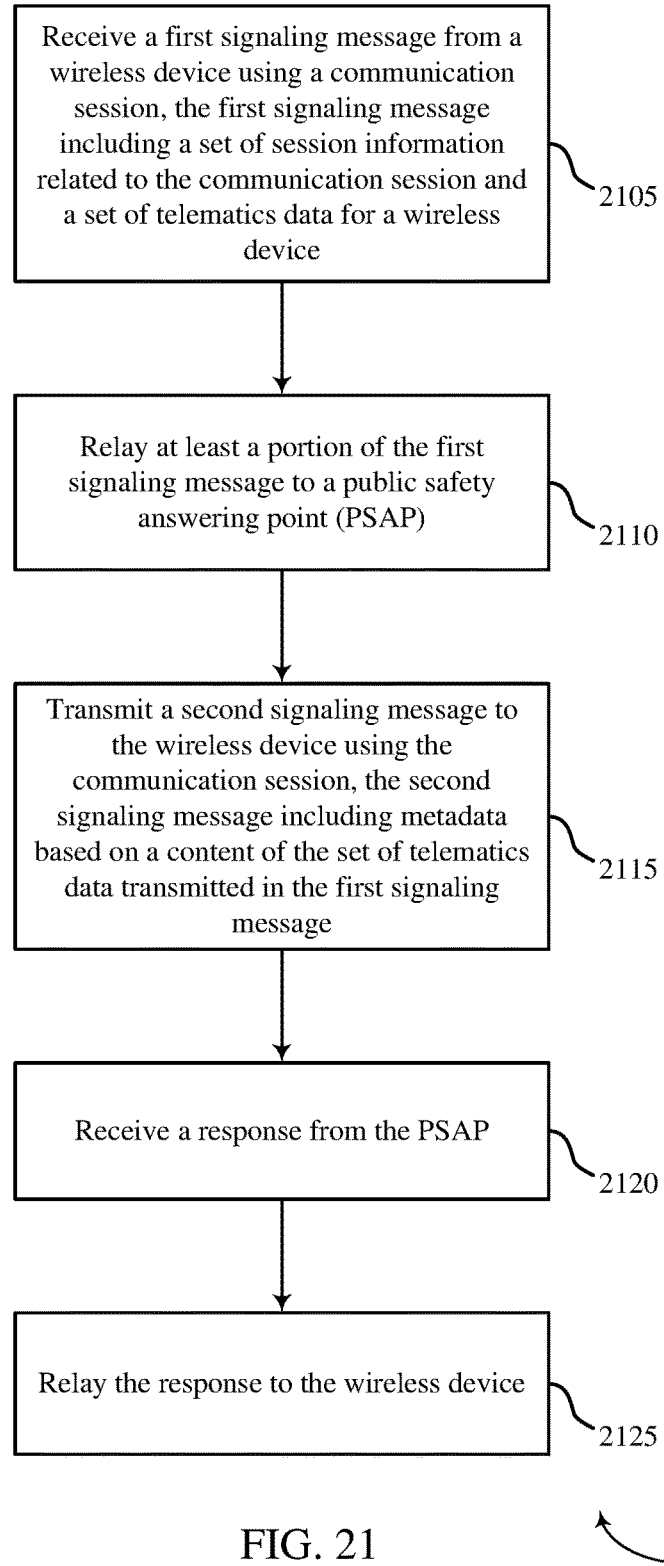
FIG. 21 shows a flowchart illustrating a method for emergency call Over-the-Top in accordance with various aspects of the present disclosure.

FIG. 21 shows a flowchart illustrating a method 2100 for eCall Over-the-Top in accordance with various aspects of the present disclosure. The operations of method 2100 may be implemented by an eCall server 205 or its components as described with reference to FIGS. 1-11. For example, the operations of method 2100 may be performed by the eCall module 810 as described with reference to FIGS. 8-11. In some examples, an eCall server 205 may execute a set of codes to control the functional elements of the eCall server 205 to perform the functions described below. Additionally or alternatively, the eCall server 205 may perform aspects of the functions described below using special-purpose hardware. The method 2100 may also incorporate aspects of method 2000 of FIG. 20.

At block 2105, the eCall server 205 may receive a first signaling message from a wireless device (e.g., a terminal 110) using a communication session, the first signaling message including a set of session information related to a communication session and a set of telematics data for the wireless device as described above with reference to FIGS. 2-3. In certain examples, the operations of block 2105 may be performed by the telematics reception module 905 as described above with reference to FIG. 9.

At block 2110, the eCall server 205 may relay a portion of the first signaling message to a public safety answering point (e.g., a PSAP 210) as described above with reference to FIGS. 2-3. In certain examples, the operations of block 2110 may be performed by the PSAP relay module 910 as described above with reference to FIG. 9.

At block 2115, the eCall server 205 may transmit a second signaling message to the wireless device using the communication session, the second signaling message including metadata based on a reception status or a content of the set of telematics data transmitted in the first signaling message as described above with reference to FIGS. 2-3. In certain examples, the operations of block 2115 may be performed by the metadata module 915 as described above with reference to FIG. 9.

At block 2120, the eCall server 205 may receive a response from the PSAP as described above with reference to FIGS. 2-3. In certain examples, the operations of block 2120 may be performed by the receiver 805 as described above with reference to FIG. 8.

At block 2125, the eCall server 205 may relay the response received at block 2120 to the wireless device as described above with reference to FIGS. 2-3. In certain examples, the operations of block 2125 may be performed by the transmitter 815 as described above with reference to FIG. 8.

Figure 22:
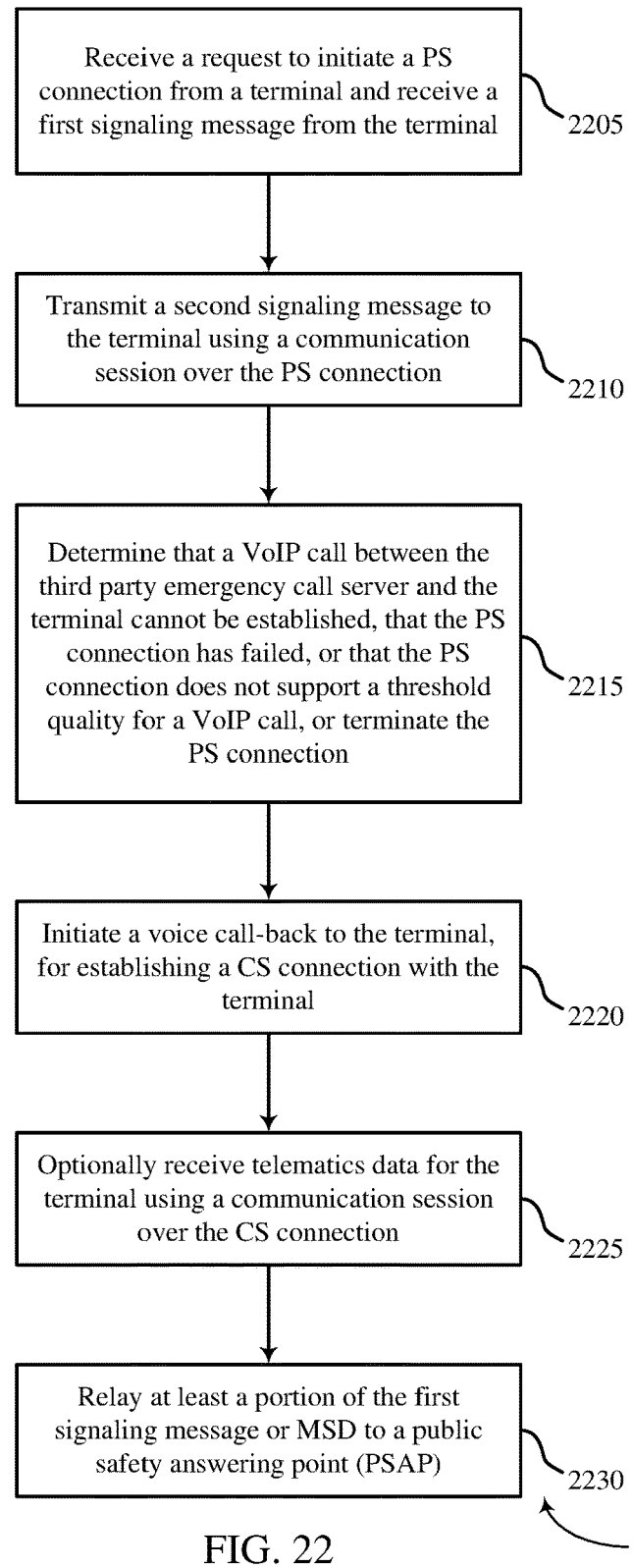
FIG. 22 shows a flowchart illustrating a method for emergency call Over-the-Top in accordance with various aspects of the present disclosure.

FIG. 22 shows a flowchart illustrating a method 2200 for eCall Over-the-Top in accordance with various aspects of the present disclosure. The operations of method 2200 may be implemented by an eCall server 205 or its components as described with reference to FIGS. 1-11. For example, the operations of method 2200 may be performed by the eCall module 810 as described with reference to FIGS. 8-11. In some examples, an eCall server 205 may execute a set of codes to control the functional elements of the eCall server 205 to perform the functions described below. Additionally or alternatively, the eCall server 205 may perform aspects the functions described below using special-purpose hardware.

At block 2205, a third party emergency call server (e.g., an eCall server 205) may receive a request to initiate a PS connection from a terminal 110 (or wireless device). When receiving the request to initiate the PS connection, the third party emergency call server may receive a first signaling message (e.g., a SIP INVITE) from the terminal 110. The first signaling message may include a set of session information related to a communication session over the PS connection, as described above with reference to FIG. 3. The first signaling message may also include a CBN and/or a set of telematics data (e.g., an MSD or VEDS) for the terminal 110. In some cases, the session information may include a request to establish one or more media components (e.g., a VoIP call, text, video, etc.).

At block 2210, the third party emergency call server may transmit a second signaling message using the communication session over the PS connection. The second signaling message may include metadata based on a reception status or a content of the set of telematics data transmitted in the first signaling message, as described above with reference to FIG. 3.

At block 2215, the third party emergency call server may determine that a VoIP call between the third party emergency call server and the terminal 110 cannot be established, that the PS connection has failed, or that the PS connection does not support a threshold quality or bandwidth for a VoIP call (e.g., that the PS connection lacks a threshold quality (e.g., QoS, packet loss, latency, or bandwidth)), as described above with reference to FIG. 3. The third party emergency call server may alternatively terminate the PS connection (e.g., because the PS connection was initiated without media data, or because the PS connection does not support a threshold quality or bandwidth), as described above with reference to FIG. 3.

At block 2220, the third party emergency call server may initiate a voice call-back to the terminal 110, for establishing a CS connection with the terminal 110. The voice call-back may be based at least in part on a CBN provided by the terminal 110 (e.g., in the first signaling message), a CBN stored at the third party emergency call server, a CBN stored in a database accessible to the third party emergency call server or a PSAP, or a CBN stored at the PSAP. The CBN may also be inferred or looked up based at least in part on identifying information associated with the terminal 110, which identifying information may be received or inferred from the terminal's attempt to establish a PS connection. The CS connection may be established for voice or media data (e.g., text).

At block 2225, and when the telematics data was not received by the third party emergency call server at block 2205, the third party emergency call server may optionally receive the telematics data from the terminal 110 using a communication session over the CS connection. In some cases, the third party emergency call server may request the telematics data over the CS connection. In some cases, the telematics data may be received using the fallback mechanism described herein.

At block 2230, the third party emergency call server may relay at least a portion of the first signaling message or telematics data (e.g., MSD) to a PSAP (e.g., a PSAP 210). In some examples, the operation(s) at block 2230 may be performed prior to one or more of blocks 2210, 2215, 2220, or 2225. In certain examples, the operations of blocks 2205, 2210, 2215, 2220, 2225, and 2230 may be performed by the eCall module 810 described above with reference to FIGS. 8-10, or the eCall module 1110 described with reference to FIG. 11.

Figure 23:
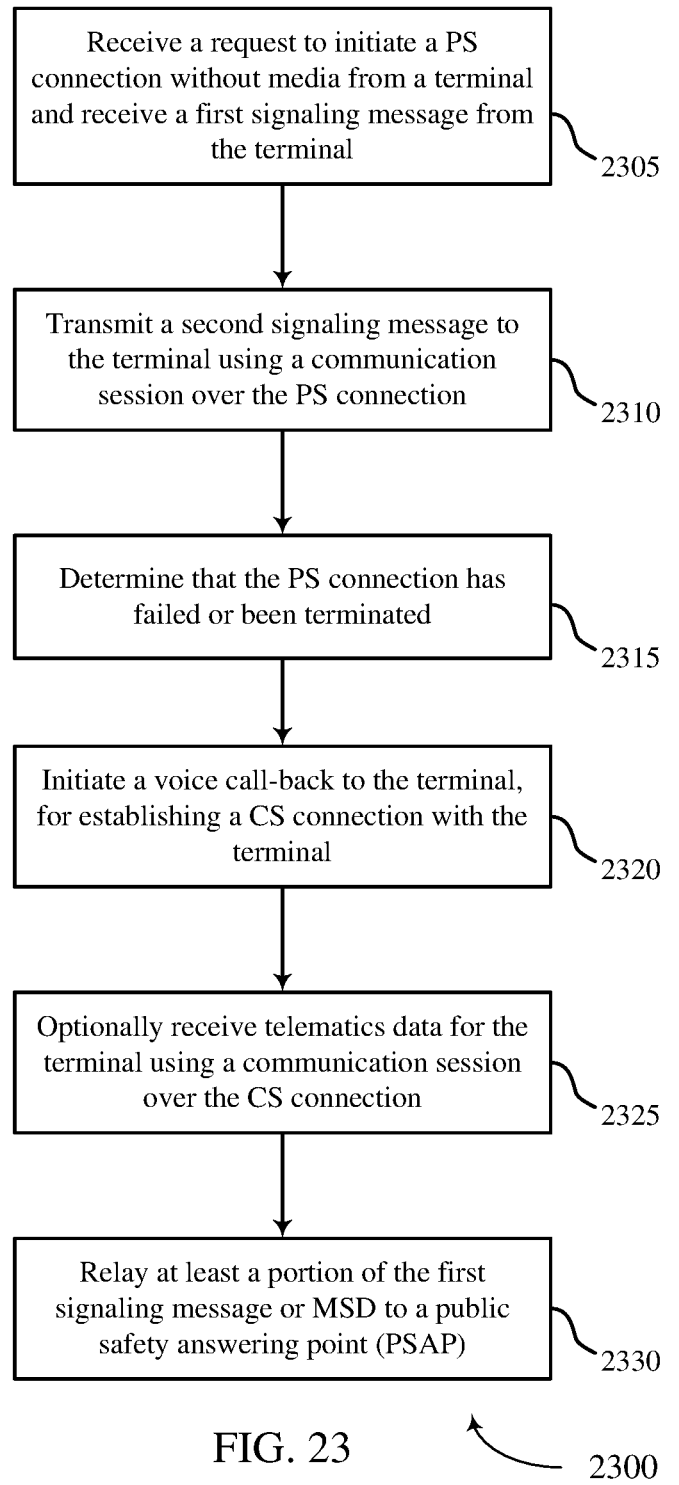
FIG. 23 shows a flowchart illustrating a method for emergency call Over-the-Top in accordance with various aspects of the present disclosure.

FIG. 23 shows a flowchart illustrating a method 2300 for eCall Over-the-Top in accordance with various aspects of the present disclosure. The operations of method 2300 may be implemented by an eCall server 205 or its components as described with reference to FIGS. 1-11. For example, the operations of method 2300 may be performed by the eCall module 810 as described with reference to FIGS. 8-11. In some examples, an eCall server 205 may execute a set of codes to control the functional elements of the eCall server 205 to perform the functions described below. Additionally or alternatively, the eCall server 205 may perform aspects the functions described below using special-purpose hardware.

At block 2305, a third party emergency call server may receive a request from a terminal 110 to initiate a PS connection without any media (e.g., without voice). For example, the terminal 110 may have previously determined that a VoIP call between the terminal 110 and the third party emergency call server cannot be established because of (i) an inability to support a threshold quality (e.g., QoS, packet loss, latency, or bandwidth) for the VoIP call, (ii) a prior VoIP call failure, (iii) the size of a minimum transmission unit (MTU) being below a threshold, (iv) poor latency in a prior transmission, (v) knowledge or an indication of a network's quality, or (vi) an indication that a network is not voice-capable. Upon receiving the request to initiate the PS connection, the third party emergency call server may receive a first signaling message (e.g., a SIP INVITE) from the terminal 110. The first signaling message may include a set of session information related to a communication session over the PS connection, as described above with reference to FIG. 3. The first signaling message may also include a CBN or a set of telematics data (e.g., an MSD or VEDS) for the terminal 110. In some cases, the session information may not include a request to establish one or more media components (e.g., a VoIP call, text, video, etc.).

At block 2310, the third party emergency call server may transmit a second signaling message using the communication session over the PS connection. The second signaling message may include metadata based on a reception status or a content of the set of telematics data transmitted in the first signaling message, as described above with reference to FIG. 3. In certain examples, the second signaling message may include a PS connection termination message.

At block 2315, the third party emergency call server may determine that the PS connection has failed or been terminated (e.g., because the PS connection was initiated without media data, or because the PS connection does not support a threshold quality or bandwidth), as described above with reference to FIG. 3.

At block 2320, the third party emergency call server may initiate a voice call-back to the terminal 110, for establishing a CS connection with the terminal 110. The voice call-back may be based at least in part on a CBN provided by the terminal 110 (e.g., in the first signaling message), a CBN stored at the third party emergency call server, a CBN stored in a database accessible to the third party emergency call server or a PSAP, or a CBN stored at the PSAP. The CBN may also be inferred or looked up based at least in part on identifying information associated with the terminal 110, which identifying information may be received or inferred from the terminal 110's attempt to establish a PS connection. The CS connection may be established for voice or media data (e.g., text).

At block 2325, and when the telematics data was not received by the third party emergency call server at block 2305, the third party emergency call server may optionally receive the telematics data from the terminal 110 using a communication session over the CS connection. In some cases, the third party emergency call server may request the telematics data over the CS connection. In some cases, the telematics data may be received using the fallback mechanism described herein.

At block 2330, the third party emergency call server may relay at least a portion of the first signaling message or telematics data (e.g., MSD) to a PSAP (e.g., a PSAP 210). In some examples, the operation(s) at block 2330 may be performed prior to one or more of blocks 2310, 2315, 2320, or 2325. In certain examples, the operations of blocks 2305, 2310, 2315, 2320, 2325, and 2330 may be performed by the eCall module 810 described above with reference to FIGS. 8-10, or the eCall module 1110 described with reference to FIG. 11.

Figure 24:
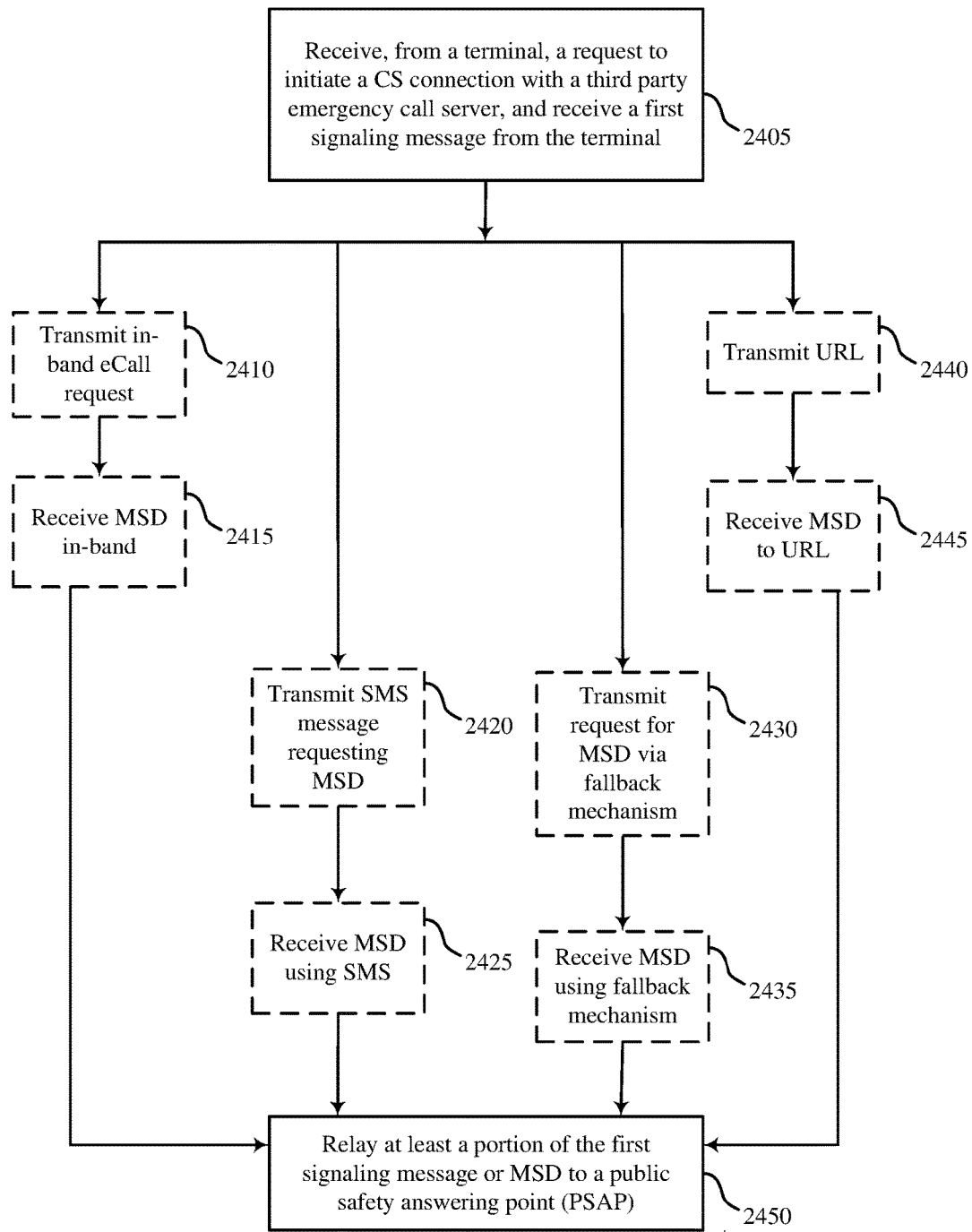
FIG. 24 shows a flowchart illustrating a method for emergency call Over-the-Top in accordance with various aspects of the present disclosure.

FIG. 24 shows a flowchart illustrating a method 2400 for eCall Over-the-Top in accordance with various aspects of the present disclosure. The operations of method 2400 may be implemented by an eCall server 205 or its components as described with reference to FIGS. 1-11. For example, the operations of method 2400 may be performed by the eCall module 810 as described with reference to FIGS. 8-11. In some examples, an eCall server 205 may execute a set of codes to control the functional elements of the eCall server 205 to perform the functions described below. Additionally or alternatively, the eCall server 205 may perform aspects the functions described below using special-purpose hardware.

At block 2405, a third party emergency call server (e.g., an eCall server 205) may receive a request to initiate a CS connection from a terminal 110 (or wireless device). When receiving the request to initiate the CS connection, the third party emergency call server may receive a first signaling message from the terminal 110. The first signaling message may include a set of session information related to a communication session over the CS connection, as described above with reference to FIG. 3.

Following the operations of block 2405, the method 2400 may perform the operations at block 2410, 2415, 2420, 2425, 2430, 2435, 2440, 2445, and/or 2450.

At block 2410, the third party emergency call server may transmit an in-band eCall request to the terminal 110, over the CS connection, to pull telematics data (e.g., an MSD) from the terminal 110. At block 2415, the third party emergency call server may receive telematics data (e.g., MSD) from the terminal 110 by in-band means over the CS connection.

At block 2420, the third party emergency call server may transmit, to the terminal 110, an SMS message requesting the MSD. At block 2425 (in response to the SMS message or proactively), the third party emergency call server may receive telematics data (e.g., MSD) from the terminal 110 via SMS.

At block 2430, the third party emergency call server may optionally transmit, to the terminal 110 and over the CS connection, a request for telematics data (e.g., MSD). The request may be transmitted via the fallback mechanism described herein. At block 2435 (in response to the request or proactively), the third party emergency call server may receive the telematics data (e.g., MSD) from the terminal 110, over the CS connection, using the fallback mechanism.

At block 2440, the third party emergency call server may optionally transmit a URL to the terminal 110. The URL may be an address for the third party emergency call server or for a PSAP (e.g., a PSAP 210) with which the third party emergency call server may be in communication. The URL may be transmitted, for example, in an SMS message or via the fallback mechanism over the CS connection initiated at block 2405. Alternatively, the third party emergency call server may not transmit the URL, and the terminal 110 may determine the URL from its configuration or from a discovery mechanism. At block 2445, the third party emergency call server may receive the telematics data (e.g., MSD) from (or at) the entity identified by the URL.

At block 2450, the third party emergency call server may relay at least a portion of the first signaling message or telematics data (e.g., MSD) to a PSAP (e.g., a PSAP 210). In some examples, the operation(s) at block 2450 may be performed prior to one or more of blocks 2410, 2415, 2420, 2425, 2430, 2435, 2440, or 2445.

In another alternative, the third party emergency call server may optionally transmit a SIP message (e.g., an INVITE message) to the terminal 110, in parallel with or prior to the terminal 110 initiating the CS connection at block 2405. The SIP message may be used to pull the telematics data (e.g. MSD) from the terminal 110. In response to transmitting the SIP message, the third party emergency call server may receive the telematics data (e.g., MSD) from the terminal 110 using SIP. In certain examples, the operations of blocks 2405, 2410, 2415, 2420, 2425, 2430, 2435, 2440, 2445, and 2450 may be performed by the eCall module 810 described above with reference to FIGS. 8-10, or the eCall module 1110 described with reference to FIG. 11.

The methods 1200, 1300, 1400, 1500, 1600, 1700, 1800, 1900, 2000, 2100, 2200, 2300, and 2400 may provide for eCall Over-the-Top. It should be noted that methods 1200, 1300, 1400, 1500, 1600, 1700, 1800, 1900, 2000, 2100, 2200, 2300, and 2400 describe possible implementation, and that the operations and the steps may be rearranged or otherwise modified such that other implementations are possible. In some examples, aspects from two or more of the methods 1200, 1300, 1400, 1500, 1600, 1700, 1800, and 1900 may be combined, or aspects from the methods 2000, 2100, 2200, 2300, and 2400 may be combined.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE/LTE-A system for purposes of example, and LTE/LTE-A terminology is used in much of the description above, although the techniques are applicable beyond LTE/LTE-A applications.

What is claimed is:

1. A method of communication at a wireless device, comprising:
   transmitting a first Session Initiation Protocol (SIP) message to a third party emergency call server while establishing a communication session, the first SIP message comprising at least a set of session information related to the communication session and a set of telematics data for the wireless device;
   receiving, at a receiver of the wireless device, a second SIP message while establishing the communication session, the second SIP message comprising metadata based at least in part on a reception status or a content of the set of telematics data transmitted in the first SIP message; and
   receiving a circuit switched (CS) voice call-back from the third party emergency call server or a public safety answering point (PSAP) based at least in part on determining that a media path between the wireless device and the third party emergency call server cannot be established or does not support at least one of: a threshold bandwidth, or a threshold quality of service (QoS), or a threshold packet loss, or a threshold latency.

2. The method of claim 1, further comprising:
   identifying an address of the third party emergency call server or a home network call server associated with the third party emergency call server based at least in part on a discovery process.

3. The method of claim 2, wherein the discovery process is based at least in part on:
   a domain name service (DNS) query, or a location-to-service translation (LoST) query, or data configured in the wireless device or in a module or entity connected to the wireless device.

4. The method of claim 1, wherein the first SIP message comprises a call-back number for the wireless device and wherein the CS voice call-back is based at least in part on the call-back number.

5. The method of claim 1, wherein the CS voice call-back is based at least in part on a call-back number stored with the third party emergency call server.

6. The method of claim 1, further comprising:
   establishing a CS connection for voice or media data to the third party emergency call server based at least in part on the determination.

7. The method of claim 1, further comprising:
   establishing an internet protocol (IP) connection to a call server, wherein transmitting the first SIP message is based at least in part on the IP connection.

8. An apparatus for communication at a wireless device, comprising:
   a processor;
   memory in electronic communication with the processor; and
   instructions stored in the memory and executable by the processor to cause the apparatus to:
   transmit a first Session Initiation Protocol (SIP) message to a third party emergency call server using a communication session, the first SIP message comprising at least a set of session information related to a communication session and a set of telematics data for the wireless device;
   receive, at a receiver of the wireless device, a second SIP message using the communication session, the second SIP g message comprising metadata based at least in part on a reception status or a content of the set of telematics data transmitted in the first SIP message; and
   receive a circuit switched (CS) voice call-back from the third party emergency call server or a public safety answering point (PSAP) based at least in part on determining that a media path between the wireless device and the third party emergency call server cannot be established or does not support at least one of: a threshold bandwidth, or a threshold quality of service (QoS), or a threshold packet loss, or a threshold latency.

9. The apparatus of claim 8, wherein the instructions are further executable by the processor to cause the apparatus to:
   identify an address of the third party emergency call server or a home network call server associated with the third party emergency call server based at least in part on a discovery process.

10. The apparatus of claim 9, wherein the discovery process is based at least in part on:
    a domain name service (DNS) query, or a location-to-service translation (LoST) query, or data configured in the wireless device or in a module connected to the wireless device.

11. The apparatus of claim 8, wherein the first SIP message comprises a call-back number for the wireless device and wherein the CS voice call-back is based at least in part on the call-back number.

12. The apparatus of claim 8, wherein the CS voice call-back is based at least in part on a call-back number stored with the third party emergency call server.

13. The apparatus of claim 8, wherein the instructions are further executable by the processor to cause the apparatus to:
    establish a CS connection for voice or media data to the third party emergency call server based at least in part on determining that the media path between the wireless device and the third party emergency call server cannot be established or does not support at least one of: the threshold bandwidth, or the threshold quality of service (QoS), or the threshold packet loss, or the threshold latency.

14. The apparatus of claim 8, wherein the instructions are further executable by the processor to cause the apparatus to:
establish an internet protocol (IP) connection to a call server, wherein transmitting the first SIP message is based at least in part on the IP connection.

15. The apparatus of claim 14, wherein the call server is at least one of:
the third party emergency call server, or different than the third party emergency call server, or a Session Initiation Protocol (SIP) Proxy, or managed by a home network operator for the wireless device, or part of a home network operator internet protocol (IP) multimedia subsystem (IMS) subsystem.

16. The apparatus of claim 8, wherein the first SIP message comprises a request for voice media, a callback number and a standardized set of data.

17. The apparatus of claim 8, wherein the instructions to receive the second SIP message over the communication session are executable by the processor to cause the apparatus to:
receive an indication of whether the set of telematics data was received or satisfactorily received at the third party emergency call server, the indication comprising the metadata based at least in part on the reception status or the content of the set of telematics data.

18. The apparatus of claim 8, wherein the instructions to receive the second SIP message over the communication session are executable by the processor to cause the apparatus to:
receive a request with respect to the set of telematics data, the request comprising the metadata based at least in part on the reception status or the content of the set of telematics data.

19. The apparatus of claim 18, wherein the request comprises at least one of:
a request to retransmit the set of telematics data, a request to transmit an updated set of telematics data, or a request to transmit a different set of telematics data.

20. The apparatus of claim 8, wherein the instructions to receive the second SIP message over the communication session are executable by the processor to cause the apparatus to:
receive an instruction to take at least one action based at least in part on the reception status or the content of the set of telematics data, the instruction comprising the metadata based at least in part on the reception status or the content of the set of telematics data.

21. The apparatus of claim 20, wherein the at least one action comprises at least one of:
gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking a door, activating a horn of a vehicle, activating an externally audible sound, activating lights of a vehicle, activating flashers of a vehicle, actuating a power window, playing a recorded message, rendering media, or displaying a text message.

22. An apparatus for communication at a call service node, comprising:
a processor;
memory in electronic communication with the processor; and
instructions stored in the memory and executable by the processor to cause the apparatus to:
receive a first Session Initiation Protocol (SIP) message from a wireless device using a communication session, the first SIP message comprising at least a set of session information related to a communication session and a set of telematics data for the wireless device;
relay at least a portion of the first SIP message to a public safety answering point (PSAP); and
transmit a second SIP message to the wireless device using the communication session, the second SIP message comprising metadata based at least in part on a reception status or a content of the set of telematics data transmitted in the first SIP message; and
transmit a circuit switched (CS) voice call-back to the wireless device or the PSAP based at least in part on determining that a media path between the wireless device and the third party emergency call server cannot be established or does not support at least one of: a threshold bandwidth, or a threshold quality of service (QoS), or a threshold packet loss, or a threshold latency.

23. The apparatus of claim 22, wherein the instructions are further executable by the processor to cause the apparatus to:
generate a verbal message based at least in part on the first SIP message; and
wherein the instructions to relay at least a portion of the first SIP message to the PSAP are executable by the processor to cause the apparatus to:
send the verbal message to the PSAP.

24. The apparatus of claim 22, wherein the instructions are further executable by the processor to cause the apparatus to:
receive a response from the PSAP; and
relay the response to the wireless device.

25. An apparatus for communication at a wireless device, comprising:
a processor;
memory in electronic communication with the processor; and
instructions stored in the memory and executable by the processor to cause the apparatus to:
initiate a packet switched (PS) connection, with or without one or more media components, to the third party emergency call server based on the communication session:
transmit a first Session Initiation Protocol (SIP) message to a third party emergency call server using a communication session over at least one of an Internet Protocol Multimedia Systems (IMS) service and an internet protocol (IP) connection, the first SIP message comprising at least a set of session information related to a communication session and a set of telematics data for the wireless device; and
receive a voice call-back over a circuit switched (CS) connection from the third party emergency call server or a public safety answering point (PSAP) when the PS call fails, the PS call is initiated with no media or the one or more media components lack sufficient quality.

26. The apparatus of claim 25, wherein the voice call-back is based at least in part on a call-back number (CBN) selected from the group consisting of provided by the wireless device, stored with the third party emergency call server, stored in a database accessible to the third party emergency call server, and stored with the PSAP.

27. The apparatus of claim 25, wherein the first SIP message comprises a call-back number (CBN) for the wireless device and a set of data.

28. The apparatus of claim 27, wherein the instructions are further executable by the processor to cause the apparatus to:

transmit the set of data over the CS connection when a transfer of the set of data via the first SIP message fails.

29. The apparatus of claim 28, wherein transmitting the set of data is performed using signaling selected from the group consisting of single tone, multi-tone, dual-tone multi-frequency (DTMF), and varying tone.

30. The apparatus of claim 25, wherein the instructions are further executable by the processor to cause the apparatus to:

determine at least one of a lack of suitable quality or a lack of suitable bandwidth for a voice over IP (VoIP) call;

wherein the first SIP message is transmitted without initiating a VoIP call based on the determination.

\* \* \* \* \*